(12) United States Patent
Soule, III et al.

(10) Patent No.: US 7,367,514 B2
(45) Date of Patent: May 6, 2008

(54) REPROGRAMMING SYSTEM INCLUDING REPROGRAMMING SYMBOL

(75) Inventors: Robert M. Soule, III, Harrisburg, NC (US); Daniel D. Yeakley, Monroe, NC (US); Aldo Mario Caballero, Charlotte, NC (US); James T. Sauerwein, Charlotte, NC (US); Guy H. Berthiaume, Charlotte, NC (US); Jeffrey Dean Harper, Charlotte, NC (US); Adam E. Meggitt, Charlotte, NC (US); Larry K. Hooks, Jr., Indian Trail, NC (US); Brian V. Conti, Matthews, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 301 days.

(21) Appl. No.: 10/669,894

(22) Filed: Sep. 23, 2003

(65) Prior Publication Data
US 2005/0039092 A1    Feb. 17, 2005

Related U.S. Application Data

(60) Provisional application No. 60/504,557, filed on Sep. 18, 2003, provisional application No. 60/484,755, filed on Jul. 3, 2003.

(51) Int. Cl.
*G06K 19/06* (2006.01)
(52) U.S. Cl. .............. 235/494; 235/462.01; 341/50
(58) Field of Classification Search ............ 235/494, 235/462.01; 341/22, 28, 50; 382/181, 232
See application file for complete search history.

(56) References Cited

U.S. PATENT DOCUMENTS

| 4,091,270 | A | 5/1978 | Musch et al. |
|---|---|---|---|
| 4,654,514 | A | 3/1987 | Watson et al. |
| 4,721,849 | A | 1/1988 | Davis et al. |
| 4,761,544 | A | 8/1988 | Poland |
| 4,774,715 | A | 9/1988 | Messenger |
| 4,825,058 | A | 4/1989 | Poland |
| 4,841,132 | A | 6/1989 | Kajitani et al. |
| 4,864,302 | A | 9/1989 | Bowers |
| 4,868,375 | A | 9/1989 | Blanford |
| 4,945,216 | A | 7/1990 | Tanabe et al. |
| 4,964,167 | A | 10/1990 | Kunizawa et al. |

(Continued)

FOREIGN PATENT DOCUMENTS

WO    WO 2004/092853 A2    10/2004

OTHER PUBLICATIONS

U.S. Appl. No. 10/669,896, filed Sep. 23, 2003, Meggitt et al.

(Continued)

*Primary Examiner*—Uyen-Chau N Le
(74) *Attorney, Agent, or Firm*—Marjama Muldoon Blasiak & Sullivan LLP

(57) ABSTRACT

A symbol generator can be configured to receive various user input data, and can encode one or more programming bar codes based on the input data. Such input data can include designators for files. The input data can also include commands to be executed by a device reading the one or more programming bar codes.

37 Claims, 30 Drawing Sheets

U.S. PATENT DOCUMENTS

| | | | |
|---|---|---|---|
| 5,046,066 | A | 9/1991 | Messenger |
| 5,101,406 | A | 3/1992 | Messenger |
| 5,120,943 | A * | 6/1992 | Benz .......................... 235/375 |
| 5,185,514 | A | 2/1993 | Wike, Jr. et al. |
| 5,206,881 | A | 4/1993 | Messenger et al. |
| 5,208,449 | A | 5/1993 | Eastman et al. |
| 5,256,865 | A | 10/1993 | Wike, Jr. et al. |
| 5,317,136 | A | 5/1994 | Hasegawa et al. |
| 5,347,113 | A | 9/1994 | Reddersen et al. |
| 5,389,917 | A | 2/1995 | LaManna et al. |
| 5,488,223 | A | 1/1996 | Austin et al. |
| 5,510,606 | A | 4/1996 | Worthington et al. |
| 5,532,692 | A | 7/1996 | Tatsuya |
| 5,557,095 | A | 9/1996 | Clark et al. |
| 5,579,487 | A | 11/1996 | Meyerson et al. |
| 5,602,377 | A * | 2/1997 | Beller et al. ........... 235/462.15 |
| 5,610,595 | A | 3/1997 | Garrabrant et al. |
| 5,640,684 | A | 6/1997 | Konosu et al. |
| 5,644,601 | A | 7/1997 | Kawaguchi |
| 5,646,389 | A | 7/1997 | Bravman et al. |
| 5,668,803 | A | 9/1997 | Tymes et al. |
| 5,744,788 | A | 4/1998 | Metlitsky et al. |
| 5,748,904 | A * | 5/1998 | Huang et al. ............... 345/544 |
| 5,754,587 | A | 5/1998 | Kawaguchi |
| 5,764,774 | A * | 6/1998 | Liu ............................ 235/435 |
| 5,777,315 | A | 7/1998 | Wilz et al. |
| 5,793,903 | A | 8/1998 | Lopresti et al. |
| 5,794,145 | A | 8/1998 | Milam |
| 5,802,179 | A | 9/1998 | Yamamoto |
| 5,804,802 | A | 9/1998 | Card et al. |
| 5,805,779 | A | 9/1998 | Christopher et al. |
| 5,815,811 | A | 9/1998 | Pinard et al. |
| 5,818,032 | A * | 10/1998 | Sun et al. ................... 235/494 |
| 5,837,986 | A | 11/1998 | Barile et al. |
| 5,838,720 | A | 11/1998 | Morelli |
| 5,848,064 | A | 12/1998 | Cowan |
| 5,859,970 | A | 1/1999 | Pleso |
| 5,869,819 | A * | 2/1999 | Knowles et al. ............ 235/375 |
| 5,905,251 | A | 5/1999 | Knowles |
| 5,912,921 | A | 6/1999 | Warren et al. |
| 5,924,040 | A | 7/1999 | Trompower |
| 5,945,660 | A | 8/1999 | Nakasuji et al. |
| 5,946,344 | A | 8/1999 | Warren et al. |
| 5,965,863 | A | 10/1999 | Parker et al. |
| 5,973,681 | A | 10/1999 | Tanigawa et al. |
| 5,992,752 | A * | 11/1999 | Wilz et al. ............. 235/472.01 |
| 6,026,397 | A * | 2/2000 | Sheppard ....................... 707/5 |
| 6,027,024 | A | 2/2000 | Knowles |
| 6,045,048 | A | 4/2000 | Wilz, Sr. et al. |
| 6,068,188 | A | 5/2000 | Knowles |
| 6,072,401 | A | 6/2000 | Kumar |
| 6,119,944 | A | 9/2000 | Mulla et al. |
| 6,147,767 | A * | 11/2000 | Petteruti et al. ........... 358/1.18 |
| 6,176,427 | B1 * | 1/2001 | Antognini et al. .......... 235/454 |
| 6,178,426 | B1 | 1/2001 | Klein et al. |
| 6,182,897 | B1 | 2/2001 | Knowles et al. |
| 6,199,044 | B1 | 3/2001 | Ackley et al. |
| 6,208,980 | B1 * | 3/2001 | Kara .......................... 705/408 |
| 6,307,487 | B1 * | 10/2001 | Luby ........................... 341/50 |
| 6,321,989 | B1 | 11/2001 | Wilz, Sr. et al. |
| 6,321,991 | B1 | 11/2001 | Knowles |
| 6,321,992 | B1 | 11/2001 | Knowles et al. |
| 6,343,101 | B1 * | 1/2002 | Dong et al. .................. 375/242 |
| 6,345,764 | B1 | 2/2002 | Knowles |
| 6,347,743 | B2 | 2/2002 | Wilz, Sr. et al. |
| 6,384,744 | B1 | 5/2002 | Philyaw et al. |
| 6,386,453 | B1 | 5/2002 | Russell et al. |
| 6,389,010 | B1 | 5/2002 | Kubler et al. |
| 6,412,699 | B1 | 7/2002 | Russell et al. |
| 6,507,856 | B1 | 1/2003 | Chen et al. |
| 6,507,864 | B1 | 1/2003 | Klein et al. |
| 6,525,835 | B1 * | 2/2003 | Gulati ....................... 358/1.18 |
| 6,529,146 | B1 * | 3/2003 | Kowalski et al. ............. 341/50 |
| 6,535,493 | B1 | 3/2003 | Lee et al. |
| 6,539,360 | B1 | 3/2003 | Kadaba |
| 6,539,422 | B1 | 3/2003 | Hunt et al. |
| 6,540,140 | B1 | 4/2003 | Knowles et al. |
| 6,540,142 | B1 | 4/2003 | Alleshouse |
| 6,568,596 | B1 | 5/2003 | Shaw |
| 6,622,919 | B1 | 9/2003 | Wilz et al. |
| 6,655,593 | B2 | 12/2003 | Alleshouse |
| 6,697,805 | B1 | 2/2004 | Choquier et al. |
| 6,758,403 | B1 | 7/2004 | Keys et al. |
| 6,764,009 | B2 | 7/2004 | Melick et al. |
| 6,764,011 | B2 * | 7/2004 | Entani ................... 235/462.25 |
| 6,772,947 | B2 | 8/2004 | Shaw |
| 6,776,342 | B1 | 8/2004 | Thuries et al. |
| 6,823,388 | B1 | 11/2004 | Philyaw et al. |
| 6,873,435 | B1 * | 3/2005 | Tehranchi et al. ........... 358/1.9 |
| 6,902,114 | B2 * | 6/2005 | Hashimoto et al. ..... 235/462.25 |
| 6,908,034 | B2 | 6/2005 | Alleshouse |
| 6,976,062 | B1 | 12/2005 | Denby et al. |
| 6,987,927 | B1 | 1/2006 | Battaglia et al. |
| 7,075,676 | B2 * | 7/2006 | Owen ....................... 358/1.18 |
| 7,114,021 | B2 | 9/2006 | Seshadri |
| 7,159,214 | B2 | 1/2007 | Rajaram et al. |
| 2001/0043273 | A1 | 11/2001 | Herrod et al. |
| 2002/0066095 | A1 | 5/2002 | Yu |
| 2002/0066788 | A1 | 6/2002 | Knowles |
| 2002/0081038 | A1 * | 6/2002 | Moule ........................ 382/245 |
| 2002/0111924 | A1 | 8/2002 | Lewis |
| 2002/0150245 | A1 | 10/2002 | Sugimoto et al. |
| 2003/0136841 | A1 | 7/2003 | Alleshouse |
| 2003/0197062 | A1 | 10/2003 | Shaw |
| 2003/0228063 | A1 * | 12/2003 | Nakayama et al. ......... 382/251 |
| 2004/0002943 | A1 | 1/2004 | Merrill et al. |
| 2004/0003388 | A1 | 1/2004 | Jacquemot et al. |
| 2004/0149826 | A1 | 8/2004 | Alleshouse |
| 2004/0194081 | A1 | 9/2004 | Qumei et al. |
| 2006/0248524 | A1 | 11/2006 | Seely |

OTHER PUBLICATIONS

Hand Held Products, Screen shots produced using Quick Load For Windows, Program was publicly used more than one year prior to the earliest priority date of Jul. 3, 2003, 7 pgs.

Hand Held Products, Screen shots produced using Quick Load For DOS, Program was publicly used more than one year prior to the earliest priority date of Jul. 3, 2003, 5 pgs.

Hand Held Products, Dolphin™ 7200 Handheld Computer and HomeBase™ User's Guide, 7200/UG Rev. D, Document was published more than one year prior to the earliest priority date of Jul. 3, 2003, 168 pgs.

Notice of Allowance for U.S. Appl. No. 10/669,896 dated Aug. 9, 2007, 4 pages.

* cited by examiner

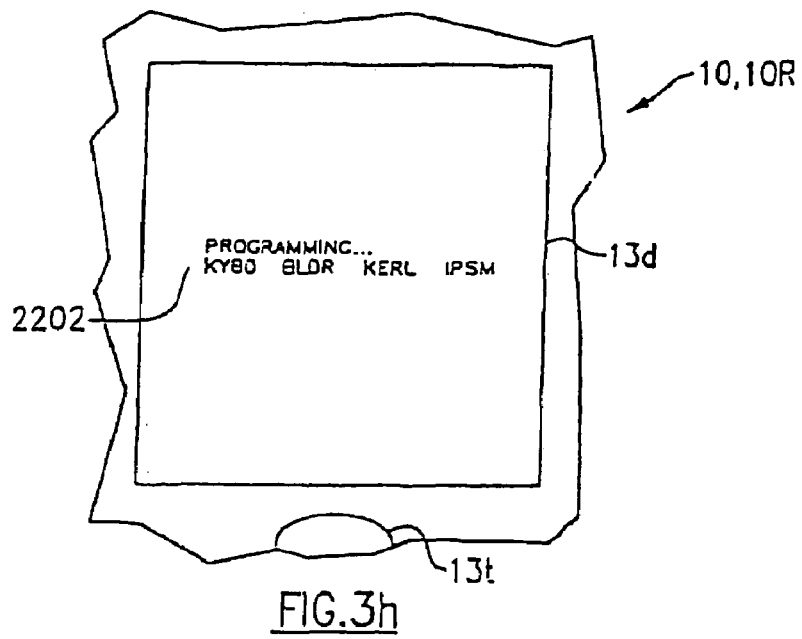
FIG.3h
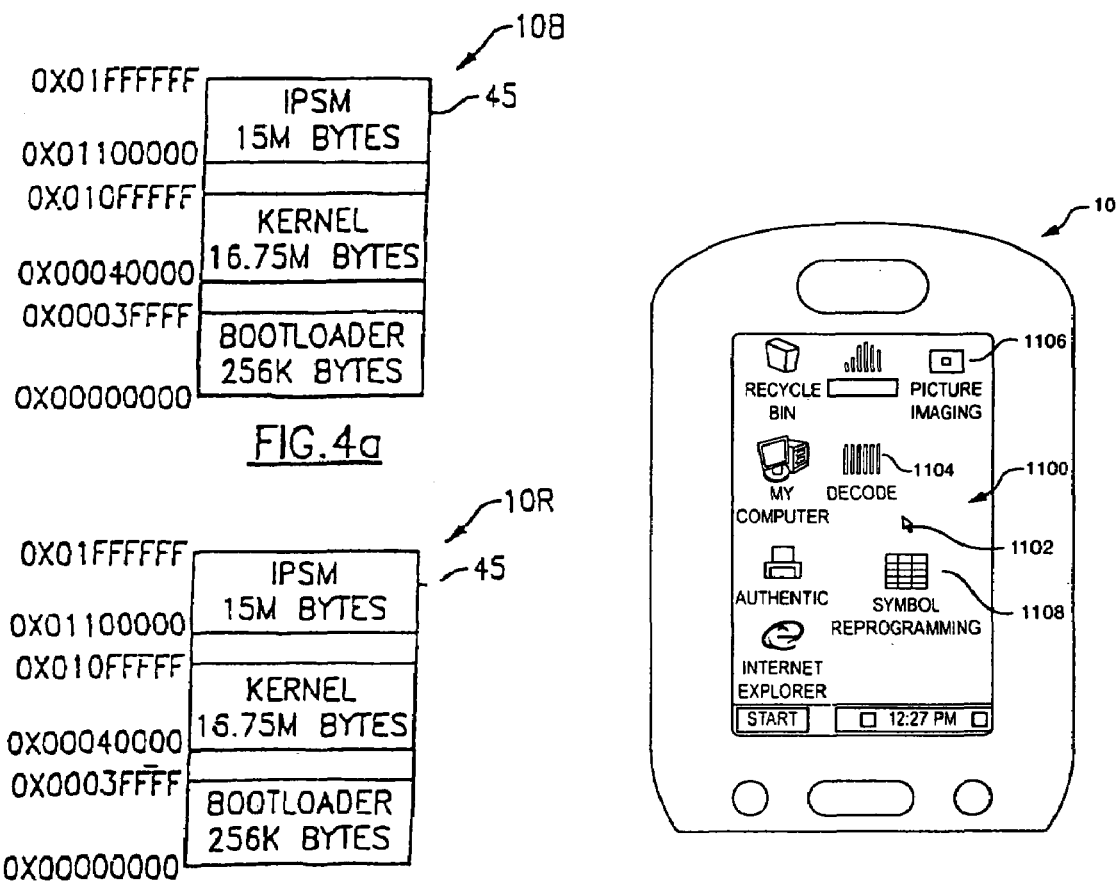
FIG.4a
FIG.4b
FIG. 5

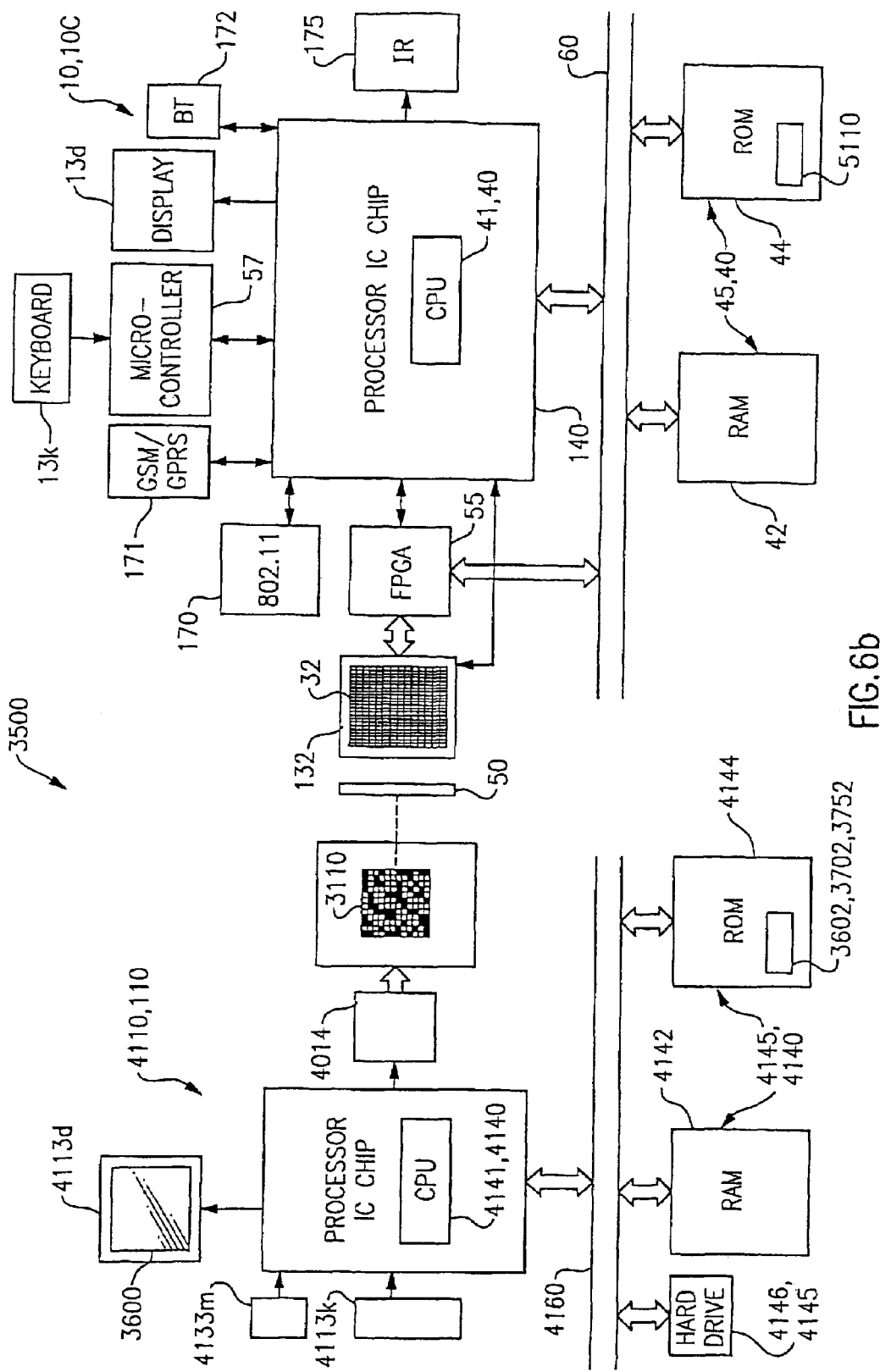

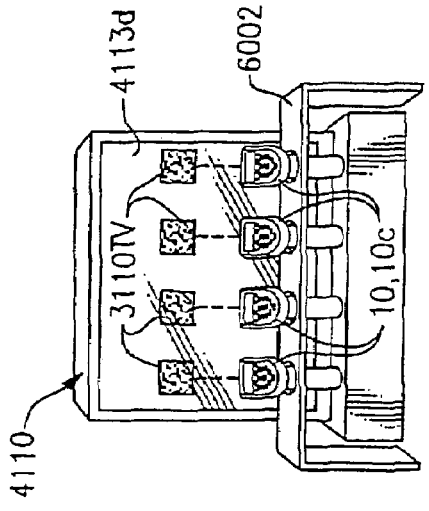
FIG.12B
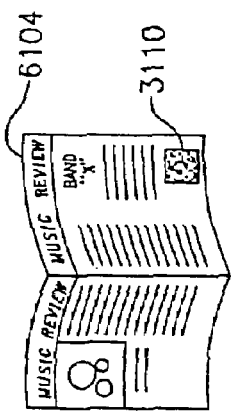
FIG.12C
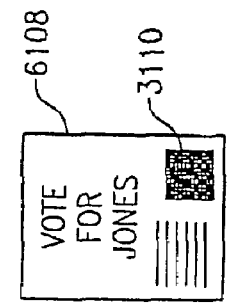
FIG.12D
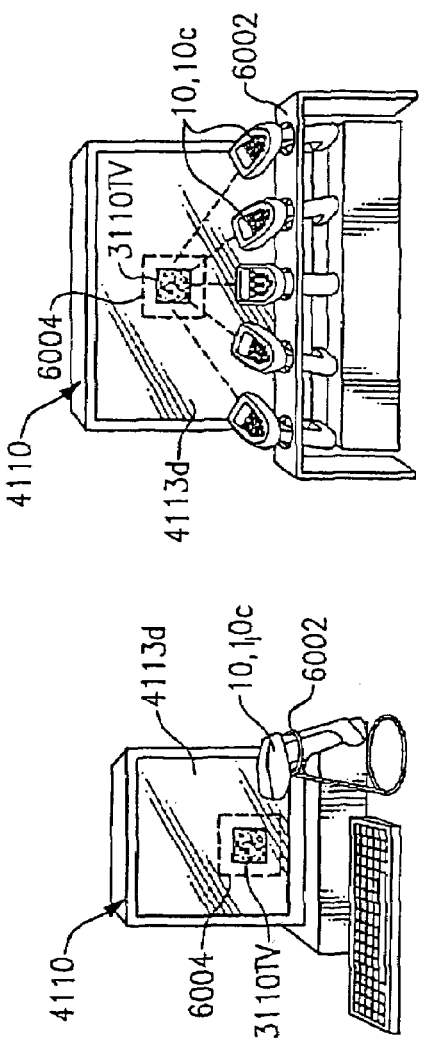
FIG.13A
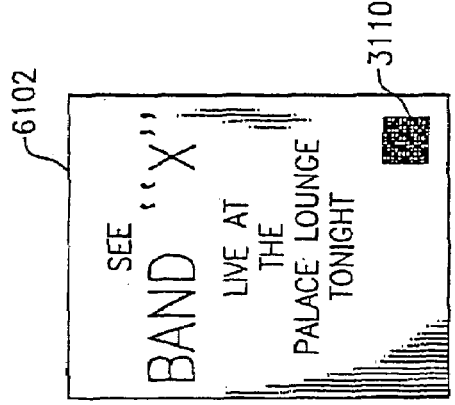
FIG.13B
FIG.13C
FIG.13D
FIG.13E

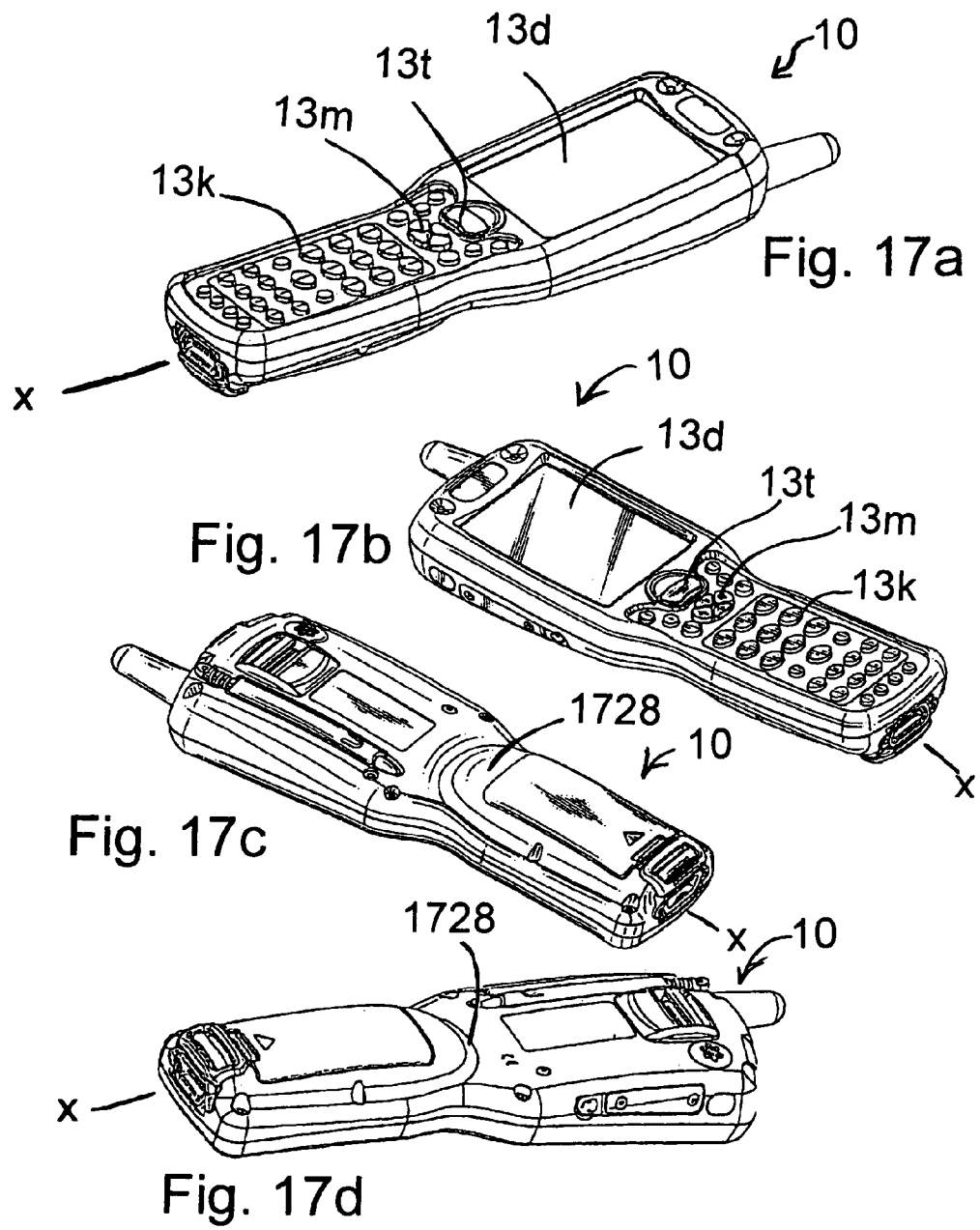

REPROGRAMMING SYSTEM INCLUDING REPROGRAMMING SYMBOL

CROSS REFERENCE TO RELATED APPLICATION

This application claims the priority, under 35 U.S.C. §119, of Provisional Application No. 60,504,557, entitled, "Reprogramming System For Portable Devices, filed Sep. 18, 2003, and Provisional Application No. 60/484,755 entitled, "Memory Content Copying System For Portable Devices," filed Jul. 3, 2003. Both of the above provisional applications are incorporated herein by reference.

FIELD OF THE INVENTION

The invention relates to reprogramming system for devices and particularly to a reprogramming system including a symbol generator for generating programming bar code symbols.

BACKGROUND OF THE INVENTION

With the proliferation of portable devices such as portable data terminals (PDTs), portable data assistants (PDAs) and cellular telephones it has become necessary to share information between portable devices or between a portable device and a host device. In a typical application, a portable device is docked to a docking station in communication with a host such as a PC. The PC is then actuated to transfer a computer file to the portable device, or the portable device is actuated to transmit a computer file to the host.

Formatted computer files or "formatted files" as referred to herein are available in a variety of different file formats. Execution files are available in the .EXE format. "Script files" are available in such formats as .BAT, .JS, and .VB. Text files are available in the format .TXT and image files are available in such formats as .PDF, .TIF, .JPG, .BMP and .PNG. Audio files are available in such formats as .MP3, .WAV and .AVI and .MID .XML is a computer file format that can support execution files, scripts files, text files, image files, audio files, or combinations of the above types of files. These types of files may be stored in a file system such as Intel's Persistent Storage Manager (IPSM) System. Certain types of files including dynamic link libraries (DLLs), executable programs, and critical data files can be stored as part of a devices operating system, also referred to as a kernel.

In portable devices, data is typically transferred from or to a portable device on a "file by file" basis. For example, an execution file (.EXE) may be downloaded from a host to a PDA. An image file (.JPG) may be uploaded from a cellular phone to a host. File by file copying methods utilize the operating systems of both the sending and receiving device.

During copying of a file in one of the above formats from a sending device to a receiving device, an operating system of the sending device must establish contact with the receiving operating system, specify the name and type of the file to be transferred, break the file down into manageable size packets, and transmit the packets across the previously established connection. The operating system of a receiving device accepts identifying information from the sending operating system, assesses available memory space location, and stores the data into such memory location that are otherwise not in use. Thus, while a "file by file" transfer of data allows for a highly selective copy of information from one device to another, the process is time consuming, especially if several files have to be transferred.

"Assembly line" methods for transferring data to portable devices are faster than a file-by-file transfer of data. In a typical back room method for programming a portable processor equipped device, a cable is hooked into a device motherboard and a memory content including a boot loader, an operating system (or "kernel") and a file system is "flashed in" to the device. However, such back room methods of programming require additional expensive hardware (such as a compact flash Ethernet interface), do not offer flexibility of programming options, often require intimate familiarity with proprietary program code, and are not available to a customer who purchases a finished product.

A manager in an application in which several portable devices require a system upgrade (e.g., a kernel upgrade) must send the devices back to the manufacturer for upgrading or must undertake time consuming reprogramming processes.

There is a need for a method transfer of information from and between portable devices, which is high speed, flexible, and which can be utilized by the purchaser of a finished portable device to execute system upgrades including file system and kernel upgrades.

In all of the above reprogramming methods, a set up of a communication device is required. For example, if the reprogramming is to be accomplished via a hard wire connection, a cable such as a USB or Ethernet cable may be interposed between a host and a device, and appropriate communication interfaces utilized. If the reprogramming method is to be accomplished via a wireless connection, a transceiver needs to be configured to be in communication with a specific point of a computer network. The above methods rely on the integrity and proper set up of communication devices to be successful. Reprogramming may fail if there is a problem in a communication device at any of several points of a computer network.

BRIEF DESCRIPTION OF THE DRAWINGS

For a further understanding of these and objects of the invention, reference will be made to the following detailed description of the invention which is to be read in connection with the accompanying drawing, wherein:

FIGS. 3a-h are data copying session menu option user interface screens at various stages of a data copying session;

FIGS. 4a and 4b are memory maps illustrating various aspects of the invention;

FIG. 5 shows an OS display screen of a portable device including icons, which may be selected using a pointer device;

FIG. 6b is a block diagram corresponding to the system of FIG. 6a;

FIGS. 12*a*-12*d* are schematic diagrams illustrating implementations of the invention in which a reprogramming symbol is displayed;

FIGS. 13*a*-13*e* illustrate various substrates on which a reprogramming symbol of the invention may be disposed;

FIGS. 17*a*-17*j* are various views of an exemplary portable device;

DETAILED DESCRIPTION OF THE INVENTION

Figure 1:
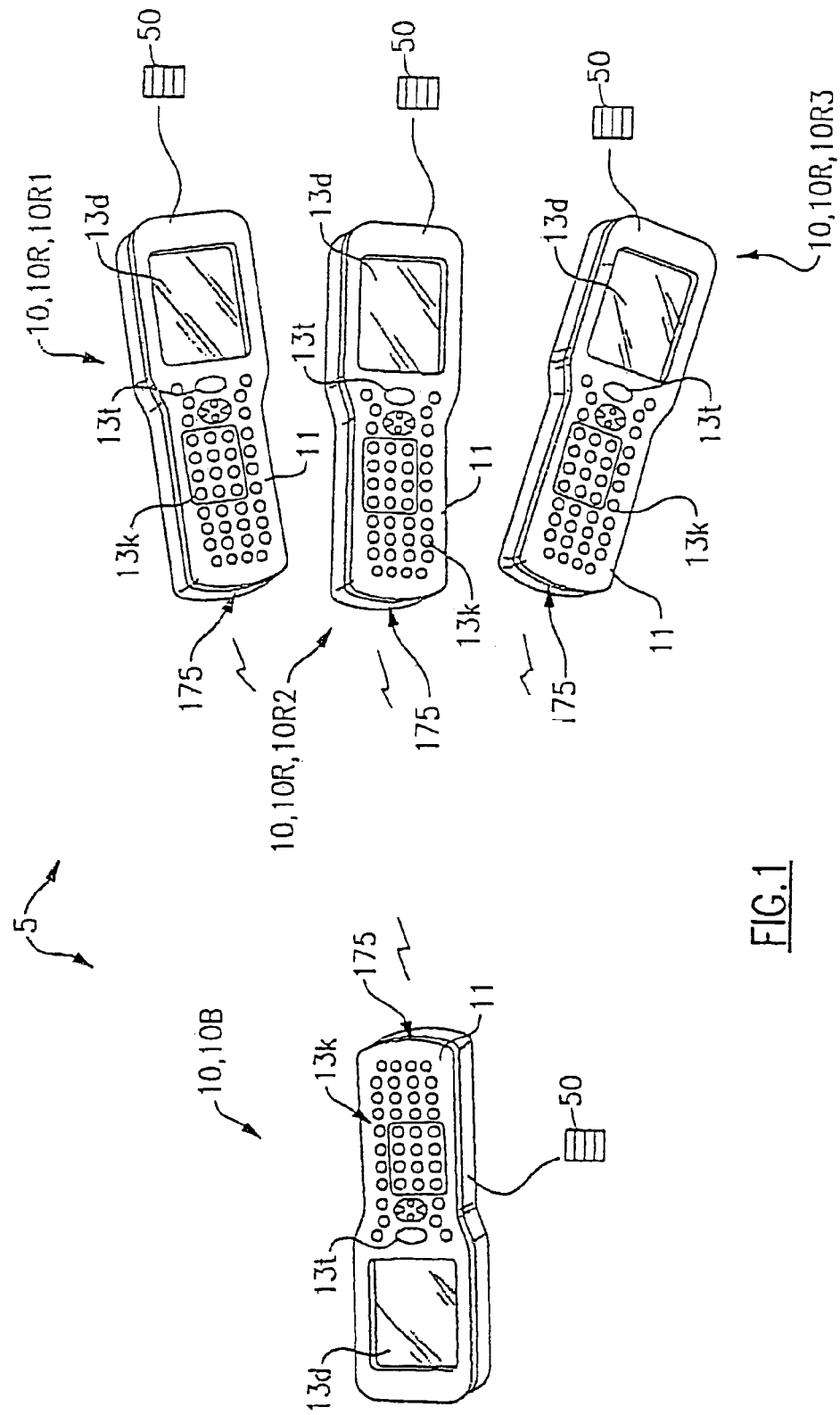
FIG. 1 is a schematic diagram of a system of the invention including a broadcasting device and plurality of receiving devices.

In one aspect, a reprogramming system of the invention can include a symbol generator and a reconfigurable device. The symbol generator may include a GUI development screen and a symbol encoder. The reconfigurable device includes an optical reader unit, which reads a symbol generated by a symbol generator, and a control circuit operating in accordance with a data stream-processing program. The control circuit, in executing the data stream processing program, may store formatted file data into a memory of the reconfigured device in accordance with information input into the GUI development screen.

In one application of a symbol reading reprogramming system, the symbol generator is utilized to make a reprogramming symbol which when read results in a text file being displayed. In another application, the symbol generator is utilized to make a reprogramming symbol which when read results in a song being played. In another application, the symbol generator is utilized to make a reprogramming symbol which when read results in a browser opening a specific web page. In another application, the symbol generator is utilized to make a reprogramming symbol which when read results in a radio being configured. In another application, the symbol generator is utilized to make a reprogramming symbol which when read results in a product being registered with a manufacturer. In another application, the symbol generator is utilized to make a reprogramming symbol which when read results in formatted file being downloaded into the device reading the symbol.

The symbol generator may vary the number of symbols that are produced for accomplishing a reprogramming. If several symbols are required to be generated and then read to accomplish a reprogramming the several symbols may be referred to as a reprogramming symbol set. Reprogramming symbols of a reprogramming symbol set may be printed on different substrates, one of which is a "key" substrate whose distribution is controlled for security purposes. Reprogramming symbols of a reprogramming symbol set may be successively displayed at a fixed point of an electronic display.

In another aspect, the invention is an improved system and method for rapidly copying a memory data image of a portable broadcasting device non-volatile memory to one or a plurality of receiving portable devices.

A portable device is equipped with a broadcasting operating mode in which the broadcasting portable device executes a verbatim memory data image copying to another device or plurality of devices. By verbatim memory data image copying it is meant that the address location of the data copied is retained when copied so that the data has the same address location in the receiving device as in the broadcasting device.

The copying of data from one portable device to another is advantageously carried out utilizing infrared transceivers of a broadcasting device and a receiving device. Infrared transceivers can be operated to transmit data at high speed, do not require a physical connection for operation, and allow several devices to be reprogrammed simply by placing additional receiving devices in the line of sight of the broadcasting device.

According to the invention, a broadcasting device is operated in a broadcast mode and a receiving device is operated in a receive mode. Preferably, a single device is configured to be operated in either a broadcast mode or a receive mode.

During a data copying session, both a broadcasting device and a receiving device may be operated utilizing "single-threaded" commands which do not require a main operating system to be running to be executed. Utilization of such single-threaded OS free commands provides precision control of memory devices (which is necessary for conducting a memory content copying), yet allows the display of useful menu option interface screens, message screens and prompting screens. Utilization of single-threaded OS free commands also optimizes speed of communication links involved in the copy session.

The incorporation of data copy session menu option screens and other display screens into a broadcasting device and a receiving device greatly enhances the flexibility of the data copying system. For example, if first and second receiving devices are programmed utilizing features of the invention to have different receive configurations, they may be programmed differently while simultaneously receiving the same data broadcast.

These and other aspects of the invention will be described with reference to the ensuing drawings and detailed description.

A schematic diagram of a system according to the invention is shown in FIG. 1. FIG. 1 shows a broadcasting portable device 10B and several receiving devices 10R1, 10R2, and 10R3. Devices 10 are incorporated in hand held housings.

According to the invention, broadcasting device 10B may be operated in a broadcasting mode and receiving devices 10R may be operated in a receiving mode of operation.

Broadcasting device 10B may be actuated to execute a verbatim memory content copying to one or several receiving devices 10R. By verbatim memory copying it is meant that the address location of the data copied is retained when copied so that the data copied has the same address location in the receiving device as in the broadcasting device. According to the invention, a memory data image 50 is copied from a broadcasting device 10B to one or more receiving devices 10R. A memory data image 50 herein refers to a memory content of memory 45 between two physical address locations.

Figure 2A:
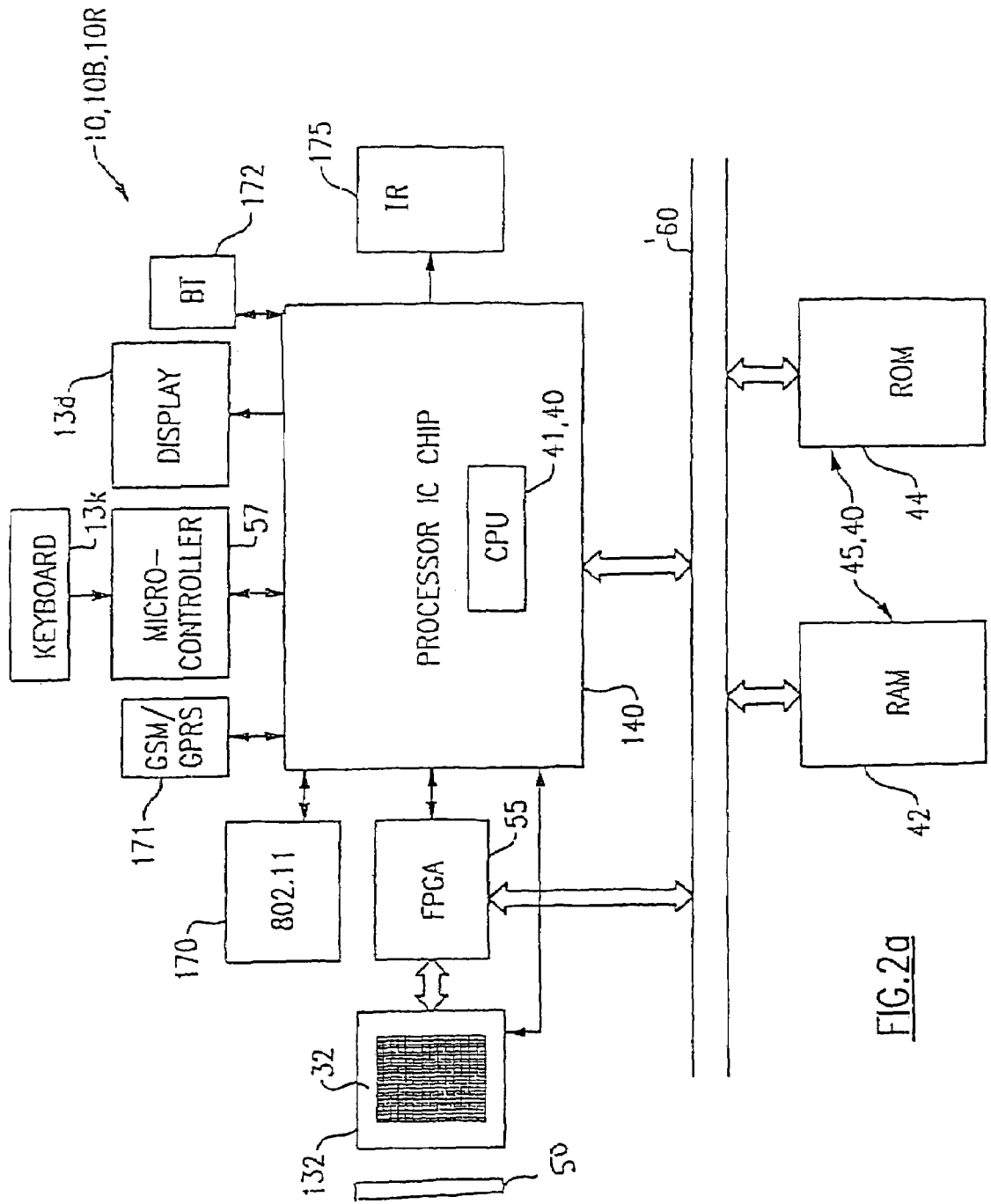
FIG. 2a is an electrical block diagram of a device according to the invention which may be configured either in a broadcast mode or in a receive mode of operation and FIG. 2b is a system electrical block diagram including block diagrams of a broadcaster and a pair of receivers.

An electrical block diagram of a device, which may be utilized as either a broadcasting device or a receiving device is shown in FIG. 2a. Device 10 may be an optical reader having an image engine including two-dimensional image sensor 32 provided on image sensor chip 132 and associated imaging optics 50. Image sensor chip 132 may be provided in an IT4000 or IT4200 image engine of the type available from HHP, Inc. of Skaneateles Falls, N.Y. Device 10 further includes a processor IC chip 140 such as may be provided by e.g., an INTEL Strong ARM RISC processor, or an INTEL PXA255 Processor. Processor IC chip 140 includes a central processing unit (CPU) 40. Referring to further features of device 10, device 10 may include a display 13d, such as a liquid crystal display, a keyboard 13k, a plurality of radio transceivers such as an 802.11 radio communication link, a GSM/GPRS radio communication link 171, a Bluetooth radio communication link 170. Device 10 may further include Infrared (IR) communication link 175. Keyboard 13k may communicate with IC chip 140 via microcontroller chip 57. Device 10 further includes a memory 45 including a volatile memory and a non-volatile memory. The volatile memory of device 10 typically is provided in part by a RAM 42. The non-volatile memory may be provided in part by flash ROM 44. Processor IC chip 140 is in communication with RAM 42 and ROM 44 via system bus 60. Processor IC chip 140 and microcontroller chip 57 also include areas of memory 45, volatile and non-volatile. Control circuit 40 of device 10 includes memory 45 and CPU 41. A non-volatile area of memory 45 within microcontroller chip 57 may store a program for operating keyboard 13k. Microcontroller chip 57 may be termed a "keyboard controller."

Processor IC chip 140 may include a number of I/O interfaces not shown in FIG. 2a including several serial interfaces (e.g., general purpose, Ethernet, Bluetooth), and parallel interfaces (e.g., PCMCIA, Compact Flash).

For capturing images, control circuit 40 sends appropriate control and timing signals to image sensor chip 132 and to FPGA 55 or another programmable logic device (e.g., an ASIC). FPGA 55 operating under the control of control circuit 40 manages the transfer of image data generated by chip 132 into RAM 42. Control circuit 40 processes frames of image data to decode a bar code or a set of OCR characters, for example. Various bar code and OCR decoding algorithms are commercially available, such as by the incorporation of an IT4250 image engine with decoder board, available from HHP, Inc. The IT4250 decoder board decodes symbologies such as MaxiCode, PDF417, MicroPDF417, Aztec, Aztec Mesa, Data Matrix, QR Code, Code 49, UCC Composite, Snowflake, Vericode, Dataglyphs, Code 128, Codabar, UPC/EAN, Interleaved 2 of 5, RSS, BC 412, Code 93, Codablock, Postnet (US), BPO4 State, Canadian 4 State, Japanese Post, KIX (Dutch Post), Planet Code, OCR A, and OCR B.

Infrared transceiver 175 facilitates infrared copying of data, from a portable device in a broadcasting mode to a portable device in a receiving mode. Utilization of infrared transceiver 175 during a data copying session allows data broadcast from a single broadcast device to simultaneously be received by several receiving devices without any of the receiving devices being physically connected to the broadcasting device. Another wireless communication link such as link 170, 171, or 172 may be used, or another wired communication link such as an Ethernet cable or USB cable.

An exemplary portable bar code reading device 10 which may be utilized with the invention is described with reference to FIGS. 17a-17i. Device 10, as shown in FIGS. 17a-17i includes a finger saddle 1728. Finger saddle 1728 is characterized, as best seen from the bottom view FIG. 17g, by a surface having a generally U-shaped configuration in a direction generally parallel to longitudinal axis, x, of device 10. The generally U-shaped surface conforms to the natural contour of an operator's relaxed finger. Further, the generally U-shaped surface of finger saddle 1728 extending in a direction generally parallel to axis, x, encourages an operator to balance device 10 on a side surface of an operator's index finger. It is seen that there is no way a finger can conform to the generally U-shaped surface unless a side surface of the operator's index finger lies in a plane that is generally parallel to longitudinal axis, x. When a side surface of an operator's index finger lies in a plane generally parallel to axis, x, the operator's hand is oriented in such position that the thumb of the operator's hand can readily be maneuvered into a variety of positions on keyboard 13k. Referring to further aspects of device 10 as shown in FIGS. 17a-17i, device 10 includes a stylus 1750, and a built in holder 1752 for holding stylus 1750.

Figure 18:
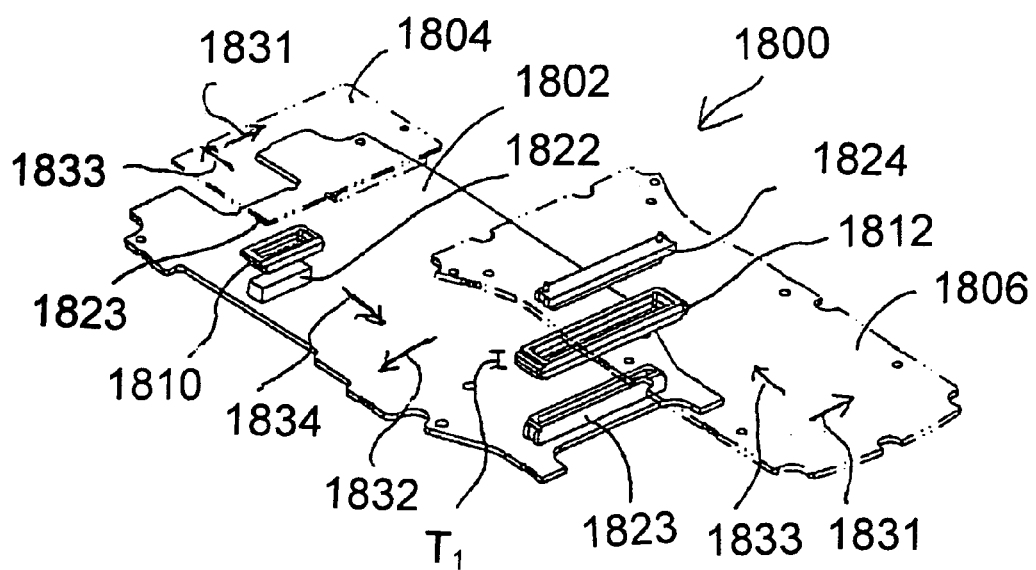
FIG. 18 is an exploded perspective view of a circuit board assembly of the invention facilitating device reconfiguration.

The capacity of device 10 to be reconfigured is enhanced further by the incorporation of certain hardware elements into device 10. A diagram of a circuit board layout of device 10 is shown in FIG. 18. Device 10 includes a motherboard 1802, radio circuit board 1804 and keyboard circuit board 1806. Motherboard 1802 carries certain integrated circuit chip components such as processor IC chip 140. Radio circuit board 1804 includes electrical components corresponding to a radio such as radio 171. Keyboard circuit board 1806 carries electrical components of keyboard 13k.

In prior art systems having multiple circuit board arrangements, circuit boards such as boards 1802, 1804, and 1806 are typically screw mounted onto one another. Screw mounting circuit boards 1802, 1804, and 1806 onto one another improves the durability of the assembly including the multiple circuit boards. However, screw mounting of assembly components also renders the process of disassembling the circuit boards time consuming.

In the present invention as shown in FIG. 18, circuit boards 1802, 1804, and 1806 are snap fit together using standardized circuit board connectors such as MOLEX circuit board connectors. Board connectors 1820 and 1821 connect board 1802 and board 1804. Board connectors 1822 and 1823 connect board 1803 and 1806 further included in the assembly 1800 of the invention are sleeve connectors 1810 and 1812. Sleeve connectors can comprise a rigid or semi-rigid insulating material and may comprise or consist of polycarbonate. Sleeve connectors 1810 and 1812 are configured to be form fit about board connectors 1821-1824. In an assembly process for assembling assembly 1800, sleeve connector 1810 is disposed about board connector 1821 of motherboard 1802 before board connector 1822 of radio board 1804 is snap fit into board connector 1821 of motherboard 1802. Likewise, sleeve connector 1812 is disposed about board connector 1823 of motherboard 1802 before board connector 1824 of keyboard circuit board 1806 is snap fit into board connector 1823 of motherboard.

The inventors found that, in the absence of sleeve connectors 1810 and 1812, a device 10 including a multiple circuit board assembly often fails a drop test wherein device 10 including a multiple circuit board assembly is dropped from several feet onto a hard surface. The inventors found that during impact with a floor during a drop test, shear forces along force lines 1830, 1831, 1833, and 1834 in the plane of circuit boards 1802, 1804, and 1806 often destroy the interconnection between adjoining board connectors. Sleeve connectors 1810 and 1812 interfere with shear forces along force lines 1831 and 1834, and operate to keep the connections between board connectors 1821-1824 in tact when device 10 impacts a floor during a drop.

The thickness, $T_1$, of sleeve connector 1812 can be about the same thickness, $T_2$, of an adjoined pair of board connectors 1823 and 1824 associated with connector 1812. Thickness $T_1$ can also be less than $T_2$ provided sleeve connector 1812 is thick enough so that connector opposes an interface between a pair of connectors. Sleeve connectors 1810 and 1812 are shown as being of a four-sided ring shaped configuration. Sleeve connectors 1810 and 1812 can also comprise U-shape, and L-shape or another shape provided the sleeve connector is configured to oppose a shear force which would otherwise break a connection between a mating pair of board connectors.

With the combination of snap fit board connectors and sleeve connectors, assembly 1800 can be easily and quickly disassembled. Accordingly, it will be seen that, with assembly 1800 and device 10 can readily be reconfigured to include new hardware elements. For example, if keyboard circuit board 1806 includes an alpha based keyboard, assembly 1800 facilitates an easy replacement of the alpha based keyboard circuit board with a numeric based keyboard circuit board. Likewise, assembly 1800 facilitates the easy replacement of radio circuit board 1804 carrying a first type of radio components with another radio circuit board carrying a second type of radio components. A new radio circuit board can be snap fit onto motherboard 1802, and the connection between board and board will be strong enough to withstand a drop test.

Referring again to system 5, system 5 is operable so that a memory data image of broadcasting device 10B is copied to receiving device or devices 10R. Broadcasting device 10B can be configured in a broadcast mode while receiving devices 10R can be configured in a receiving mode. Typically, a single device is capable of being driven into either of a broadcast mode or a receiving mode. Thus, a certain device could be a broadcaster in a first data copying session and a receiver in a next data copying session.

An important aspect of the invention is that, during a data copying session, hardware components of device 10 such as display 13*d*, keyboard 14*k*, and IR interface 175 may be controlled with "single-threaded" commands. Single-threaded commands are commands which follow a single program path. When a single-threaded command is executed, control over CPU 141 is not relinquished until a procedure has been completed. A single-threaded program includes a plurality of single-threaded commands. A single-threaded program does not require a request to an operating system to acquire exclusive control over an area of memory 45 or any peripheral device. Accordingly, single-threaded commands allow precise control over devices that make up memory 45. Using single-threaded commands to control display 13*d*, keyboard 13*k*, memory 45, and interface 175 during a data copying session allows high-speed transmission of data and the presenting of a user-actuatable option menu user interface screen enabling a user to select between data copying options. Preferably, commands used to control memory 45, display 34*d*, keyboard 13*k*, and communication link 170 of both broadcasting device 10B and receiving device 10R during a data copy session are commands which, in addition to being single-threaded, are of a type that are executed without a main operating system running. Commands executed in the absence of a main operating system running may be referred to as "operating system free" ("OS free") commands. With a system main operating system running, commands are often executed in multithreaded fashion in accordance with the OS. Further, memory requirements of an OS render more difficult the controlled copy of data from memory 45 of a broadcaster 10B to another device, and the controlled reception of a memory data image into a receive device 10R.

In the present invention, a replication or data copying utility is conveniently executed as part of a boot loader program. Broadcasting and receiving modes of operation of device 10 are conveniently executed as part of a boot loader program because whereas a boot loader program is a program which must be executed at some point during operation of device 10 which does not require the device's main operating system for execution, the replication utility of the invention is enhanced if implemented within programs of a broadcasting device 10B and receiving device 10R that do not utilize a device main operating system. Further, because the broadcasting and receiving modes of the invention utilize considerable volatile memory during execution, it is useful to power down device 10 in order to clear memory 42 prior to execution of the broadcasting and receiving modes.

A major function of a typical boot loader program in prior art portable devices is to initialize hardware, configure system settings, configure memory, and load a kernel or operating system to transfer control of control circuit 40 to an operating system such as Linux, DOS, pocket PC, Windows CE, WINDOWS, VMS, OS/400, AIX, and X/OS.

More specifically, a typical boot loader program in portable devices (1) performs functions of a BIOS program, as in a PC, (2) initializes system hardware including IO devices; (3) configures memory, timings, interrupts, and CPU speed; (4) arranges blocks of memory for receipt of a kernel and (5) transfers control of control circuit 140 to a kernel (e.g., DOS, pocket PC, WINDOWS). When a prior art boot loader program is executed, a graphical user interface (GUI) is customarily presented to a user. Typically, at the completion of a boot loader program, a user may be presented by a graphical user interface display screen 1100 on display 13*d* as presented in FIG. 5, which allows access to a variety of program execution files. Operating in accordance with a graphical user interface supported by an operating system, a pointer device 1102 is made available to a user. A user moves a pointer over an ICON to actuate a selected execution program. Clicking on decode ICON 1104 commences a bar code/OCR algorithm. Clicking on picture taking ICON 1106 commences a picture taking mode of operation in which device 10, on depression of trigger 13*t* captures an image, and outputs the frame of image data to display 13*d* or another device without attempting to decode decodable symbols therein.

Figure 3A:
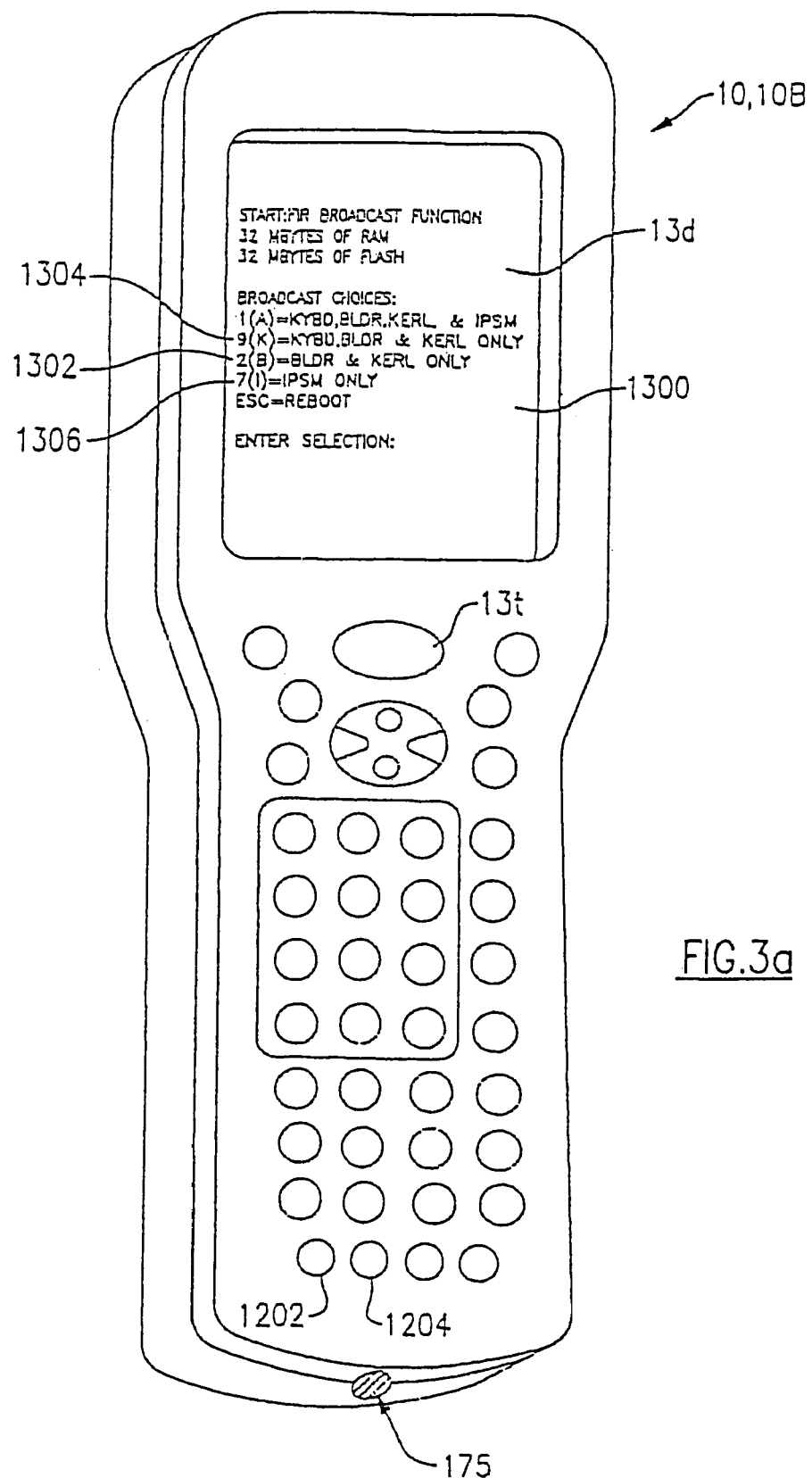

A boot loader program, according to the invention, may be configured so that the boot loader program of a broadcasting device 10B and a receiving device 10R are executed in a coordinated manner to carry out a replication (otherwise termed a memory data image copying) utility according to the invention. Referring to FIG. 3*a*, device 10 may be configured so that if device 10 is powered up without any keys of keyboard 13*k* being depressed, then a "normal" boot up routine is executed. A "normal" boot up routine is characterized by an operating system interface such as interface 1100 being presented to a user at the completion of the routine. If a designated special function key of keyboard 13*k* is depressed when the device 10 is powered up, however, the replication utility boot up routine according to the invention is executed. Device 10 may be configured so that depression of special function key 1202 at power up drives device 10 into a broadcast mode (in addition to the customary hardware initialization and configuration) while depression of key 1204 at power up drives device 10 into a receive mode (in addition to the customary hardware initialization and system configuration).

Referring to more specific advantages of utilizing OS free commands to execute the broadcast mode, utilization of OS free commands assures that specific memory address locations of RAM 42B will be available to facilitate the memory image data copying. By comparison, when a main operating system is running, the OS typically makes demands of RAM 42B in ways that cannot easily be detected or controlled. As part of the memory data copying according to the invention, broadcasting device 10B copies a memory data image from ROM 44B into RAM 42B of a broadcasting device 10B, and then broadcasts the data over a communication link e.g., link 175B to receiving device 10R. When copying data from ROM 44B to RAM 42B (where the data is buffered prior to broadcast) CPU 41B of broadcasting device 10B (a) formats the data by encoding start address data, message length data and checksum data, (b) compresses the data; and (c) establishes synchronization packets. The compression scheme executed by CPU 41B may be, e.g., a run length compression scheme, or a GZIP compression scheme. CPU 41B could, in theory, broadcast data from non-volatile ROM 44B to receiving device 10R without storing the data into RAM 42B of broadcaster 10B. However, the formatting, compressing, and synchronization packet forming would be rendered more difficult.

Referring to more specific advantages of utilizing OS free and preferably single-threaded commands to execute a receive mode of operation, a significant advantage of OS free commands in a receive mode of operation is that receiving device 10R has available to it open blocks of ROM 44R into which receiving device 10R may store a new kernel memory data image, if a new kernel memory data image has been requested. If receiving device 10R is operating in accordance with an operating system stored in ROM 44R, it cannot, at the same time, write a new operating system memory data image to the address locations of ROM 44R at which the memory data image corresponding to the present operating system is stored. Providing a receive mode of operation utilizing OS free commands also lessens demands on RAM 42R, allowing CPU 41R of receiving device 10R to utilize RAM 42R for buffering received data so that received data can be decoded and decompressed prior to being stored in ROM 44R of receiving device 10R.

Regarding both of a broadcasting device 10b and a receiving device 10r, the control of display 13d and keyboard 13k with OS free commands which may be single-threaded commands, allows presenting of broadcast and receiving menu option user interfaces, while maintaining coordinated control over memory devices involved in data copying. The control of IR interface link 175 or another link, e.g., links 170, 171, or 172 with OS free commands, which are executed without a main operating system running, allows the communication link to operate at a highest possible speed.

FIGS. 3a-3h show displayed menu option user interface screens of broadcasting and receiving devices of the invention during various stages of a data copying session of the invention. FIG. 3a shows a broadcasting device 10B displaying a broadcast option user interface menu screen 1200. User interface menu screen 1300 driven with OS free commands displays various options to a user. Options 1302, 1304 are "kernel without file system" options. Option 1306 is a "file system without kernel" option. IPSM, which stands for Intel Persistent Storage Management system is a commercially available file managing system available from Intel Corporation. Option 1310 is a "combined kernel file system" option. When a new kernel is made available, typically a new boot loader will be needed to boot up the new operating system. Therefore, a boot loader copy option is typically associated with a copy option including copying of a kernel. In the option menu user interface screens herein "BLDR" designates a boot loader. A menu option is selected by pressing one of the redundant keys associated with the option (a "7" or "1" key in the care of an IPSM option). A "boot loader only" or a "kernel only" option could also be displayed.

Figure 3B:
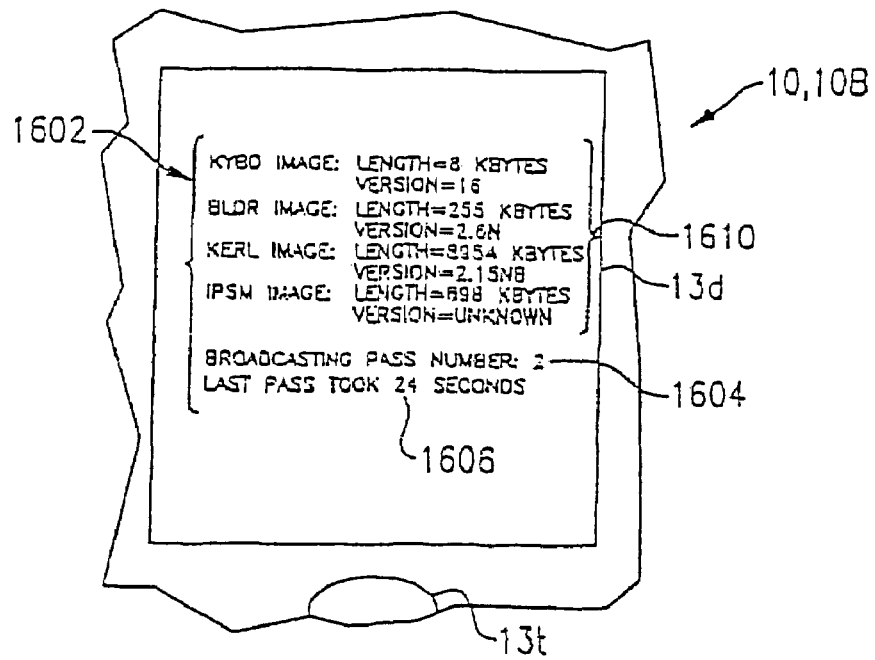
Figure 3C:
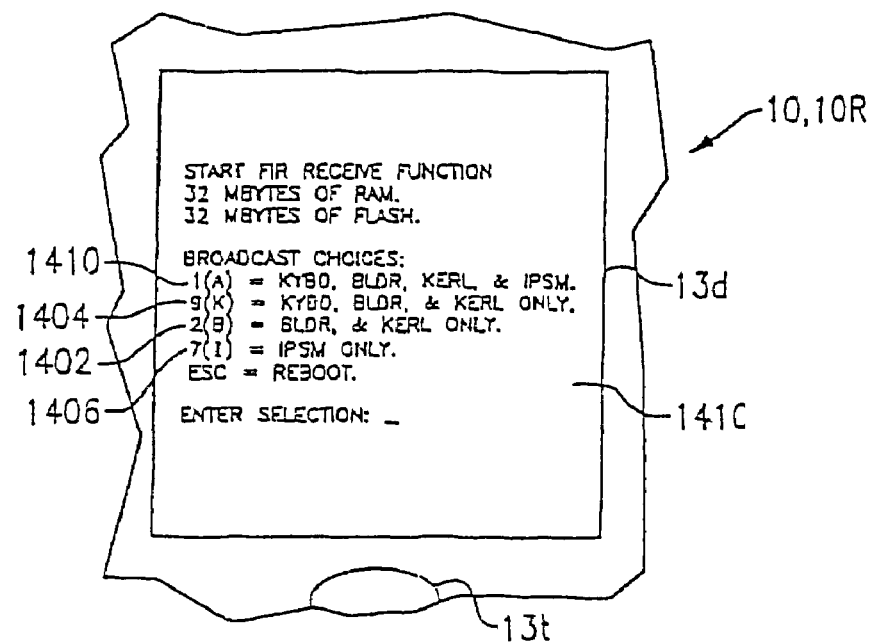

FIG. 3c shows a receiving device 10R displaying a receiving menu option user interface screen 1400 which is also driven by OS free commands. Options 1402, 1404 are "kernel without file system" options. Option 1406 is a "file system without kernel" option. Option 1410 is a "combined kernel and file system" option.

The availability of multiple options greatly improves the flexibility of the data copying system. For example, if a user of a receiving device 10R does not want a file system of a broadcaster but wants to retain all the programs and data presently stored in the IPSM file system, he does not have to receive the file system of the broadcaster 10B. Further, options can be selected for purposes of increasing processing speed. Option 1302 and corresponding option 1402 (instead of option 1402 and 1404) can be selected to increase copying speed if it is not necessary to reconfigure the keyboard program of the receiving device 10R.

In order to execute a data copying session, the menu selection of broadcasting device 10B is coordinated with the menu selections of the receiving or device 10R. Thus, if both the broadcaster and receiver are in a "kernel without file system" operating modes, then a kernel of broadcaster 10B will be copied into receiving device 10R. If both the broadcaster and receiver are in a "file system without kernel" operating modes, then a file system of broadcaster 10B will be copied into receiving device 10R. If both the broadcaster and receiver are in a "combined kernel and file system" operating modes, then both a kernel and file system of broadcaster 10B will be copied into receiving device 10R. Importantly, the data copying will still operate even if broadcaster 10B is configured to broadcast more data than the receiving device is configured to require. Referring to FIG. 1, receiving device 10R1 and receiving device 10R2 may be configured to have different receiving requests, but still be reprogrammed by receipt of the same data copying broadcast of broadcast device 10B. Thus, receiving device 10R1 may require a new file system and a new kernel, receiving device 10R2 may require only a new kernel, and yet both devices 10R1 and device 10R2 may be reprogrammed simultaneously in a single data copying session, with a single broadcast by broadcaster 10B.

During execution of a data copying session, the broadcasting device, via execution of OS free and preferably single-threaded commands stores the selected memory content into a RAM 42 of the broadcasting device. While storing data from ROM 44 to RAM 42, broadcaster device 10B formats and compresses the data, and assembles "synchronization packets" for broadcast. "Synchronization packets" assembled by broadcaster may include: (1) 32-bit flag word that contains a specific bit pattern; (2) version number of replication utility; (3) model number of broadcaster device; (4) size of broadcaster's flash memory in units of megabytes; (5) total data bytes to be broadcast following the sync packet; (6) the number of firmware images contained in the data (1-4); (7) a bit-map of which images are contained in the data; (8) an array of firmware definition structures; (9) spare bytes for future enhancements; and (10) 32-bit checksum word.

Items (1), (2), (3), (4) and (5) are used by receiver 10R to assess its compatibility with the broadcaster 10B. Items (6), (7), and (8) identify which pieces of firmware are being broadcast. Item (10) is used to make sure that the sync packet was correctly received.

A "firmware definition" structure (Item (8) above) may contain: (a) a type flag that identifies the firmware (One of "BLDR," "KERL," "KYBD," IPSM"); (b) the physical address in flash where this firmware starts; (c) the length of the firmware image; (d) the offset from the start of the broadcast data block where this image can be found; (e) the length of this image in the broadcast data block; (f) checksum of the data image; (g) firmware revision; and (h) spare bytes for future enhancements.

A receiving device 10R via OS free single-threaded commands (1) analyzes the broadcast information respecting the memory copying; (2) analyzes broadcast data for checksum errors (3) assesses the adequacy of its own memory; and (4) temporarily buffers received data in its RAM 42 prior to storing the data in flash ROM 44. The receiving device 10R may determine that there is an error in broadcasting and reject a broadcast if: (a) broadcaster 10B is a different model number than receiver 10R; (b) the broadcaster replication version is incompatible with the receiver's version; (c) a broadcaster data block is too large to fit in the receiver's memory; (d) the broadcaster is not sending a required piece of firmware; (e) the broadcaster's IPSM is a different length than the receiver's IPSM allocation; and (i) there is a checksum error in a received data block.

FIGS. 3b-3h show prompting and other messages that may be displayed during a data copying session. Message 1602, FIG. 3b can be displayed by a broadcasting device 10B after one of options 1302, 1304, 1306, and 1310, is selected. Message 1602 includes an indication at 1604 indicating the number of times the broadcast has been executed and at 1606 the duration of the last data copy session. At 1610, the size of the various data of broadcaster 10B is displayed. An important feature of the invention in one embodiment is that the user can be reprompted to reexecute a broadcast after completing a first broadcast. Thereby, several "batches" of receiving devices 10R can be reprogrammed.

Figure 3D:
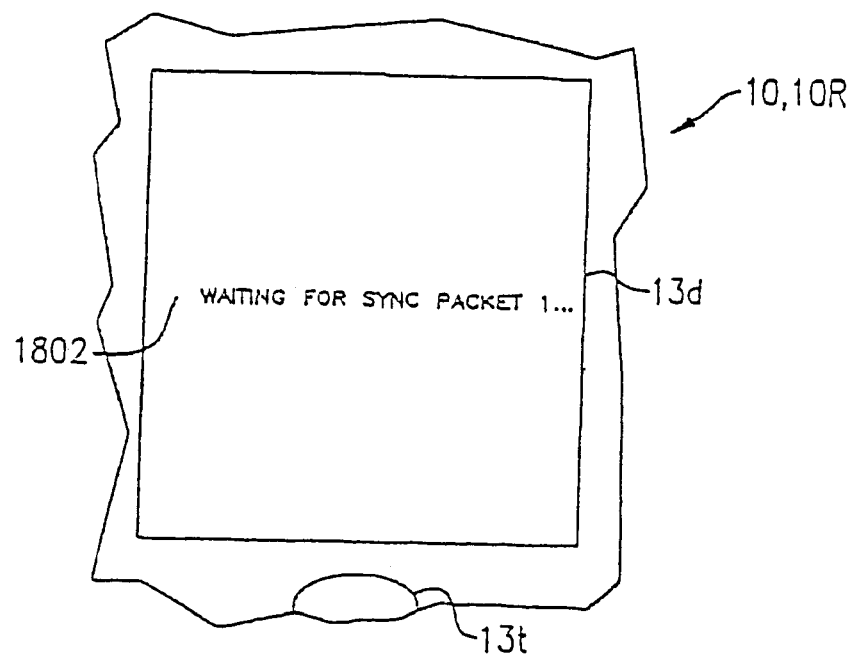
Figure 3E:
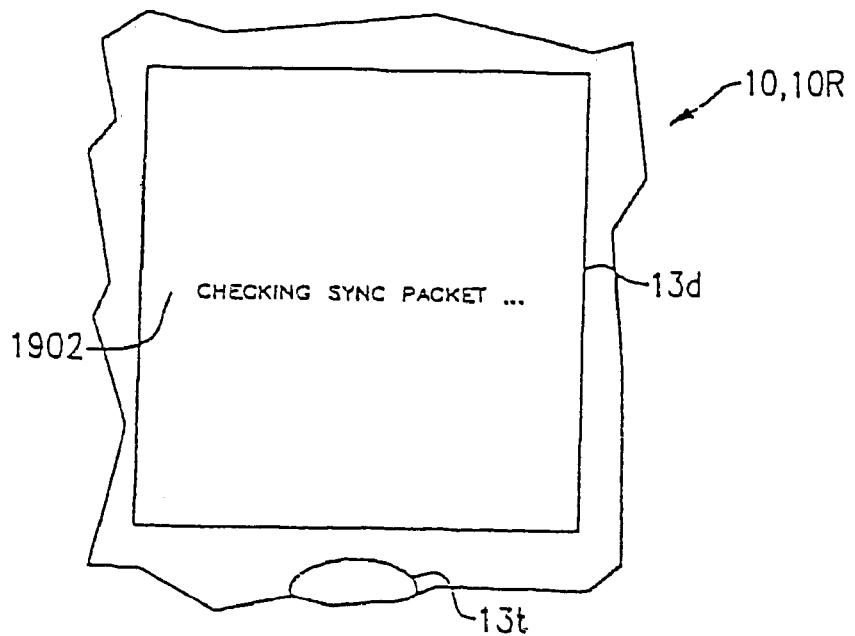
Figure 3F:
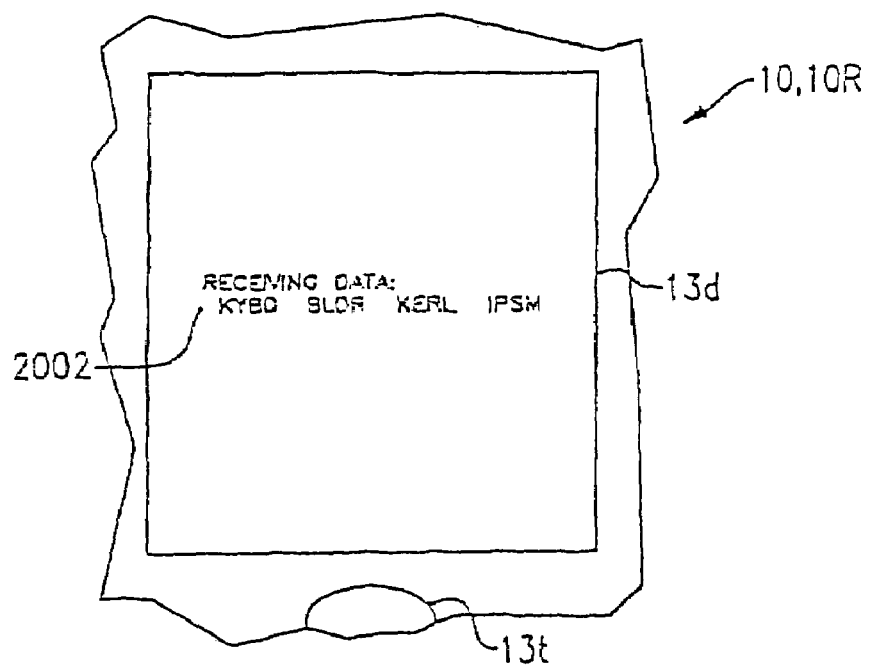
Figure 3G:
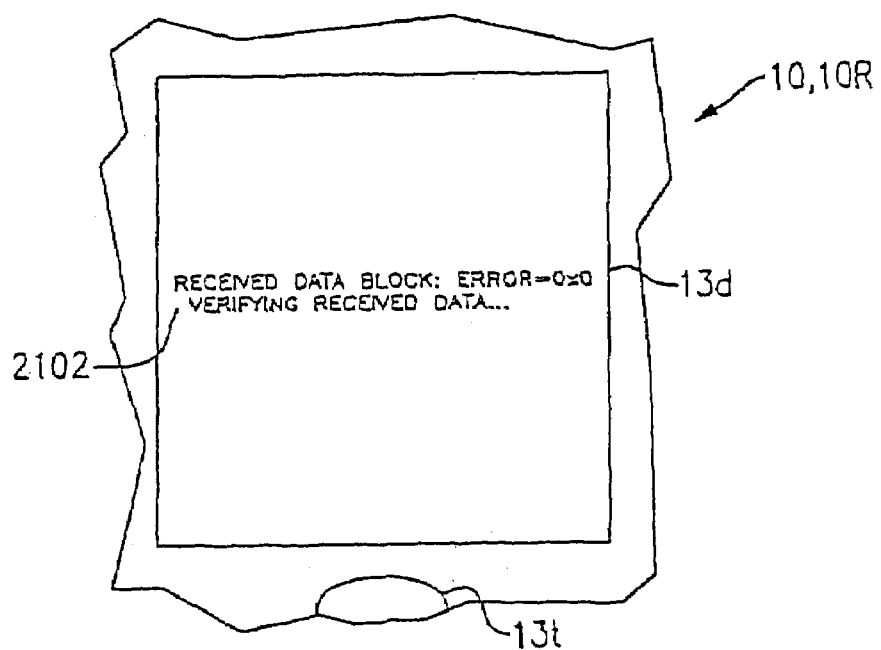

Referring to FIG. 3d, message 1802 is a message that may be displayed by receiving device 10R immediately after one of options 1402, 1404, 1406, or 1410 is selected. Referring to FIGS. 3b-3g, message 1802, message 1902, message 2002, and message 2004 may be displayed by receiving device 10R when receiving device 10R begins receiving a broadcast. Messages 1802, 1902, 2002, and 2102 confirm that data copying is active. If a user sees one of messages 1802, 1902, 2002, or message 2102 being displayed, a user is aware that physical movement of receiving device 10R could interrupt a data copying. Referring to message 1902, "Checking Sync Packet . . . " message 1802 indicates that checking of synchronization packet is occurring. Referring to message 2002, "KYBD, BLDR, KERL, IPSM" message 2002 indicates the type of data that is being received. Referring to message "Receiving Data Block: error=0x0; Verifying received data . . . " message 2102 indicates the type of error if there is an error in the data reception. Receiving device 10R can be configured so that if an error is found, receiving device 10R displays an error message on display 13d indicating an error type and then reverts to a state in which it waits for a data packet in which case it displays message 1802.

When receiving device 10R successfully completes the reception of data, it may display message 2202 as indicated in FIG. 3h. The heading "Programming . . . " of message 2002 indicates that receiving device 10R has successfully received a broadcast from broadcaster 10B and that receiving device 10R may be moved aside to make room for a new receiving device 10R. Receiving device 10R may also display the prompt message "You may move another device into sight of broadcaster" when receiving device 10R has completed the task of receiving data.

When a data copying session is complete, broadcasting device 10B may be configured to automatically reboot to display menu option user interface screen 1300. Configuring broadcasting device 10B to automatically display screen 1300 in a broadcasting mode is advantageous if all of a plurality of devices requiring reprogramming cannot be reprogrammed with a single reprogramming broadcast. Broadcasting device 10B may also be made to automatically reboot to display operating system-drive (OS driven) main menu screen 1100 as shown in FIG. 5 when a data copying session is complete. Similarly, receiving device 10R may be configured to automatically reboot to re-display screen 1400, or else automatically reboot to display OS-driven screen 1100 when a data copying session is complete.

Broadcasting device 10B executes a verbatim memory data image copying to one or several receiving devices 10R. By verbatim data image copying it is meant that the address location of the data copied is retained so that the copied data, regardless of whether it is part of a file system, a kernel, a boot loader, or a keyboard after the copying, has the same address location (and, therefore, size) in the receiving device 10R as in the broadcasting device 10B. Each section (boot loader, kernel, IPSM) of the replicated memory data image of receiver 10R will necessarily have the same size as in broadcaster 10B. Typically, a verbatim memory data image copying is conducted on a bit by bit basis such that data file system image, kernel image, or boot loader image reproduced in a receiving device 10R are located in the same address locations as in the broadcast device 10B. Bit by bit memory copying is several times faster than "file by file" copying coordinated by operating systems of two communicating portable devices. An example memory map of a broadcasting device 10B is shown in FIG. 4a. Broadcasting device 10B may include a memory map as shown in FIG. 4a with code corresponding to boot loader stored at addresses 0x00000000 to 0x0003FFFF, code corresponding the kernel stored at addresses 0x004000 to 0x010FFFFF, and code corresponding to a file system stored at addresses 0x01100000 to 0x01FFFFFF. After a data copying session in which option 1310 of broadcaster menu screen 1300 and option 1410 of the receiving device menu screen 1400 is selected, the memory map of a receiving device 10R will be identical to a memory map of a broadcasting device 10B. The "keyboard" section of memory referred to with reference to FIGS. 3a-3c is contained in address locations of non-volatile memory areas of microcontroller 57, and is not depicted in the memory maps of FIGS. 4a and 4b.

Figure 2B:
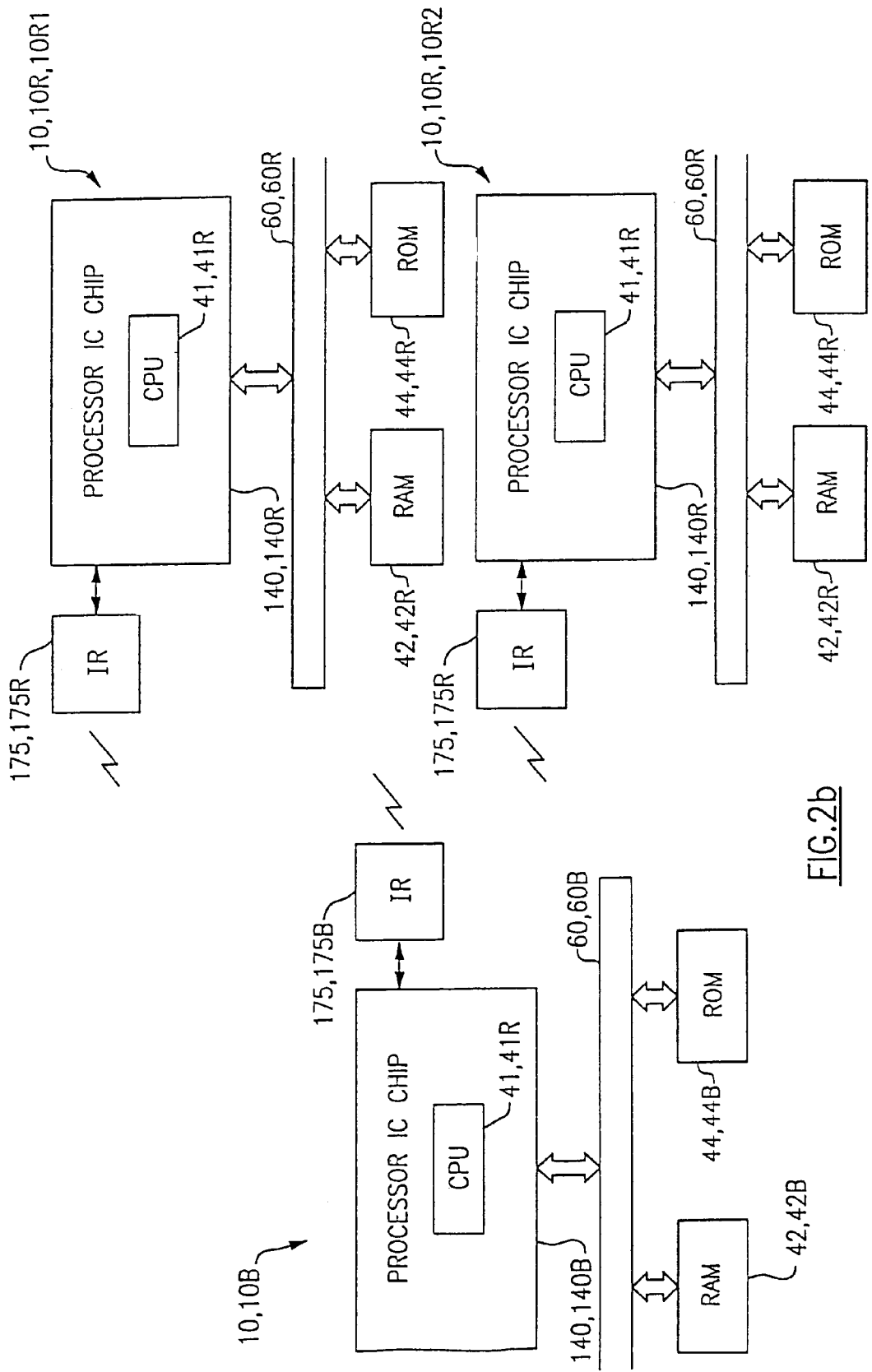

Utilization of an infrared interface 175 during data copying facilitates flexibility in reprogramming. Several receiving devices can be reprogrammed simultaneously provided they are within the "cone" (e.g., a 30 degree cone) of the communication link provided by infrared transceiver 175. Infrared transceivers such as link 175 are relatively inexpensive and widely incorporated as a standard component in many types of portable devices. By controlling infrared line 175 utilizing single-threaded, preferably OS free commands, the speed of an infrared transceiver 175 can be optimized. For example, as of 2002, infrared transceiver 175 could readily be operated at Fast Infrared (FIR) speeds approaching 4.0 Mbits/record of continuous throughput when operated utilizing single-threaded OS free command. Speed of IR transceivers 175B and 175R (FIG. 2b) can be enhanced further if, during a broadcast mode, IR transceiver 17B is controlled to be devoid of data receive functionality and IR transceiver 175R during a receive mode of a receiver device 10R is controlled to be devoid of data broadcast functionality. By comparison, when operating in accordance with a main operating system, IR transceiver 175 is controlled to have continuous transmit and receive functionality, to be responsive to highly layered commands, and to process OS driven acknowledgment packets, all of which limit data throughput.

It will be seen that the invention is highly useful especially when utilized to carry out such application as kernel upgrades or file system upgrades in applications where it is desirable to program each of several portable devices in the same way. The invention is particularly useful in data collection such as shipping or inventory applications. In such applications, each of several data collection devices are commonly rotated among a team of users. Team performance and efficiency is often optimized if each of the several devices is programmed similarly.

Another method for reprogramming a portable device such as device 10c is described with reference to FIG. 6a. Device reprogramming system 3500 includes a symbol generating device 110, typically provided by a PC 4110, a printer 4014, a reprogramming bar code symbol 3110, and reconfigurable device 10c. Symbol generating device 110, 4110 includes a bar code encoder module 3702 (FIG. 6b) for encoding a bar code, and a GUI development screen 3600 (driven by a GUI program module 3602, FIGS. 11a, 11c) for developing reprogramming bar code symbol 3110. Reconfigurable device 10c includes a data stream-processing program module 5110 (FIG. 6b) for processing a data message of symbol 3110 encoded in accordance with the invention. Reprogramming system 5 (FIG. 1) and reprogramming system 3500 (FIG. 6a) can be incorporated together in a mobile computer network to enhance the overall reprogramming functionality of a mobile computer network.

Reconfigurable device 10c, operating in accordance with the data stream processing program module 5110, may process the data message provided by decoding symbol 3110 to store into a memory of device 10c formatted file data included in the data stream. Device 10c, operating in accordance with the processing program, may also execute a command of the data message utilizing a formatted file associated with the encoded message. The file data and command data processed by the reconfigurable device 10c may be input into symbol generator 4110 via GUI development screen 3600 of the symbol generator 4110. In accordance with the input data, symbol-generating device 4110 encodes an appropriate file-encoded symbol, and issues to printer 4014 appropriate instructions to print the encoded symbol onto a substrate 3116. Reconfigurable device 10c reads and processes the printed symbol 3110 and is thereby reprogrammed.

Figure 11A:
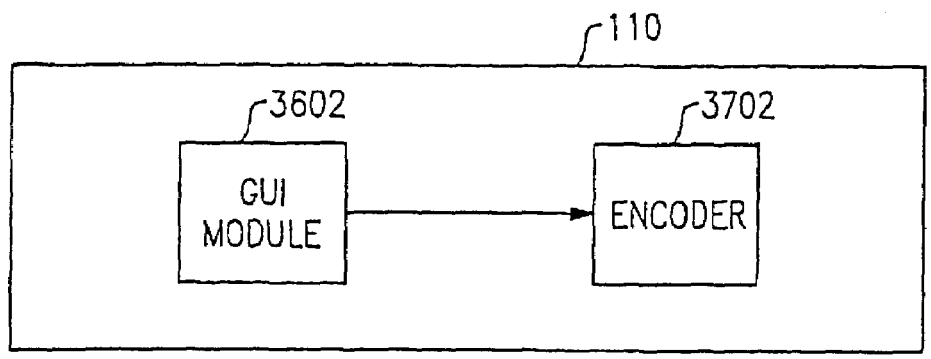
FIGS. 11*a*-11*c* are block diagrams illustrating various implementations of a symbol generator of the invention.
Figure 11B:
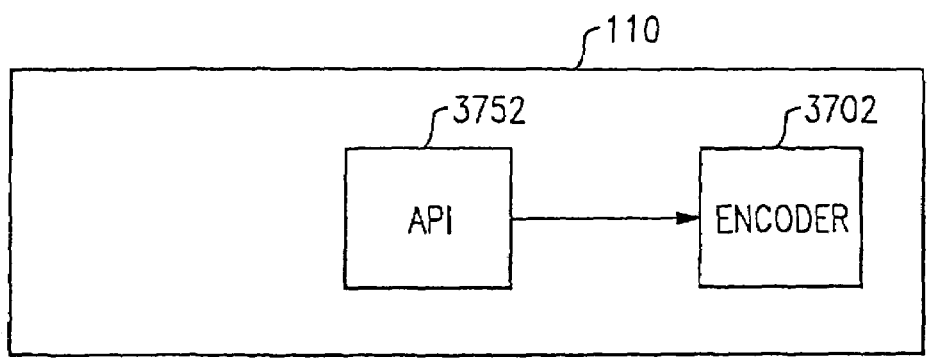
Figure 11C:
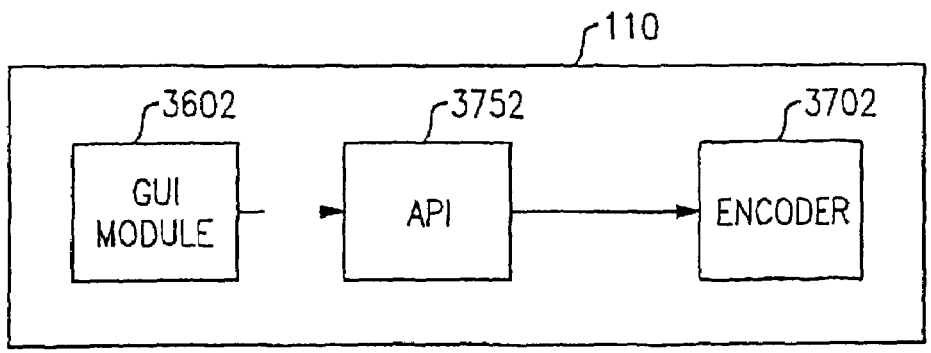

As indicated in the software architecture block diagram of FIG. 11a, GUI program module 3602 may accept data input into screen 3600 by a user, process the input data and present output data for presenting to encoder module 3702. Reconfigurable device 10c may also include application program interface (API) 3752 as is indicated by the block diagram of FIG. 11b. API 3752 provides a programmer with a set of commands and allows a user to designate such information as files to encode and command data via the authoring of program code. Of course, reconfigurable device 10c can be made to include a GUI program module 3602 in combination with API module 3702 in which GUI module 3602 inputs data to API 3752 as shown in FIG. 11c. A manufacturer of device 10c may sell some customers program packages in accordance with the software architecture of FIG. 1b and other customers program packages in accordance with FIG. 11c. Customers purchasing a package in accordance with FIG. 11b will want to have their reconfigurable device 10c reprogrammable by reading bar code symbols 3110, but may wish to restrict the development of reprogramming symbols 3110. Customers purchasing a package according to architecture of FIG. 11b may also wish to develop their own proprietary GUI modules for use in association with AMI module 3702. Customers purchasing software packages in accordance with the block diagram of FIG. 11c will be those desirous of having a manufacturer-prepared GUI module 3602 available to their customers. Of course, the purchaser of a software package in accordance with FIG. 11c may disable GUI module 3602 and author programming code for input into API module 3752 or else replace GUI module 3602 with an independently authored GUI module 3602. Both GUI module 3602 and API module 3702 herein are considered user interfaces. While GUI interface 3600 is a prompting user interface in that it prompts a user to enter information, it is understood that prompting interfaces that are not GUI based can be used in place of GUI interface 3600. For example, GUI interface 3600 can be substituted for by a text based prompting interface, an example of which is shown in FIG. 3a.

Figure 6A:
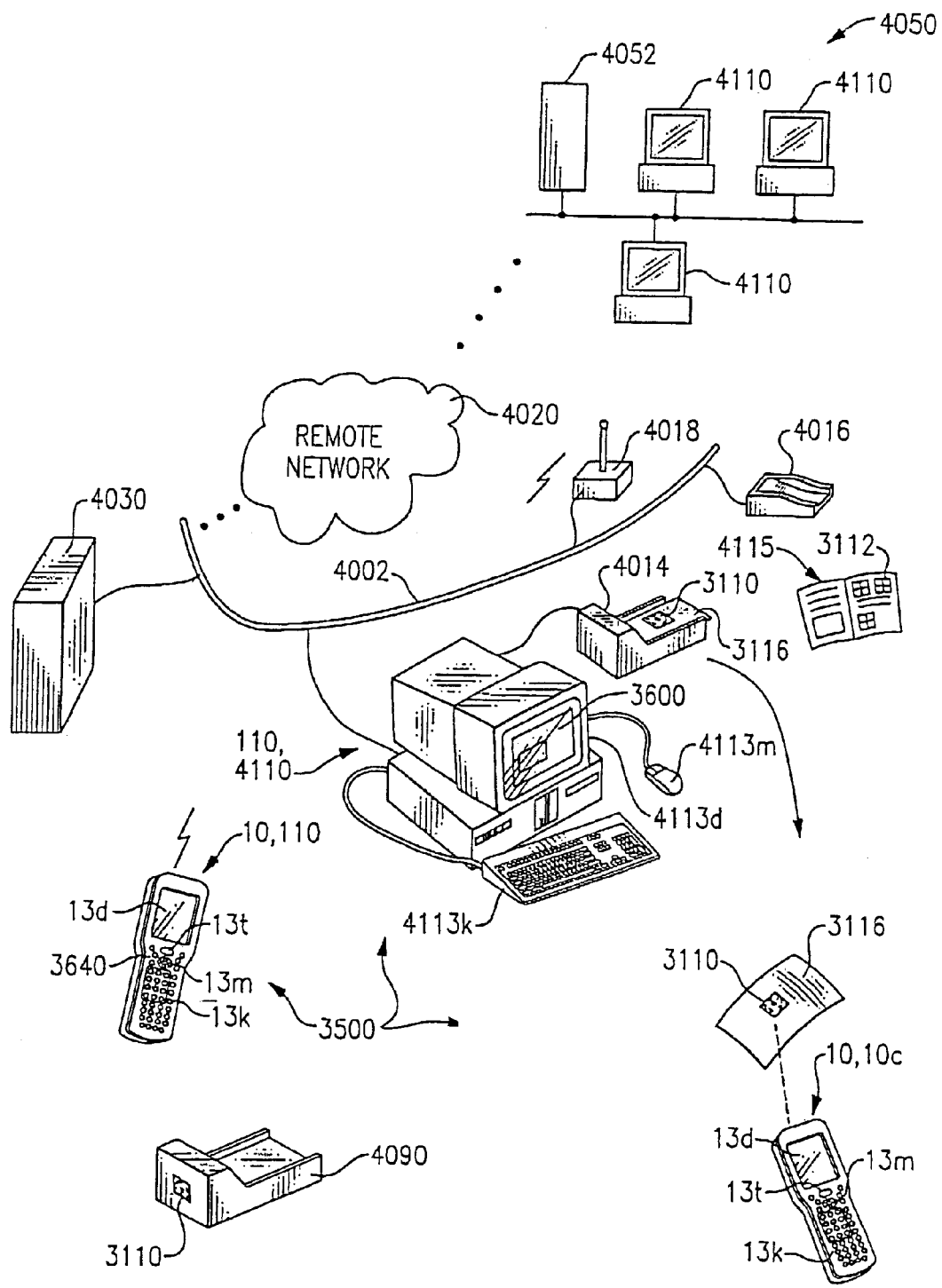
FIG. 6a is a schematic diagram of a reprogramming system including a reprogramming symbol.
Figure 16:
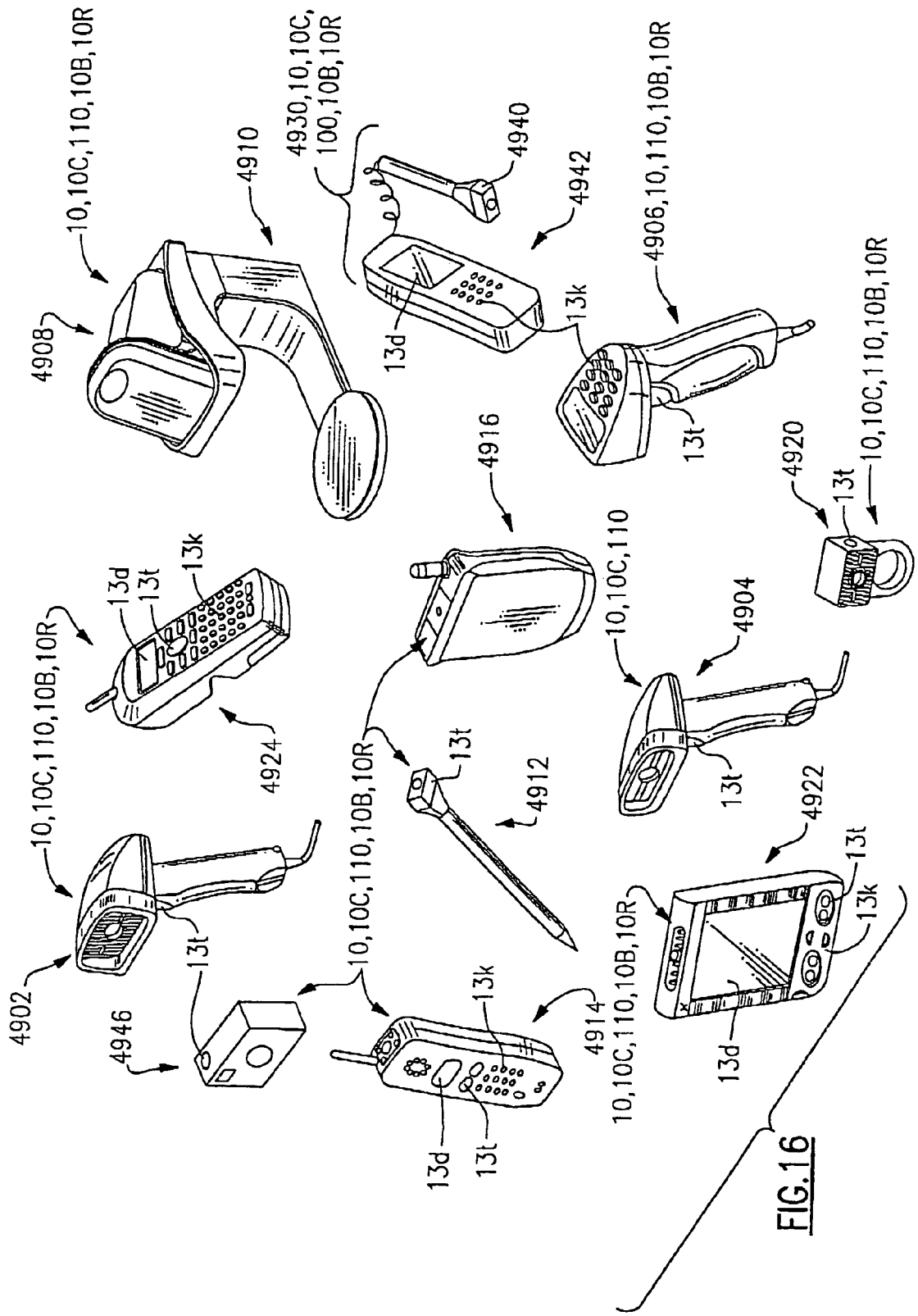
FIG. 16 illustrates various portable devices in which the invention may be incorporated.
Figure 17E:
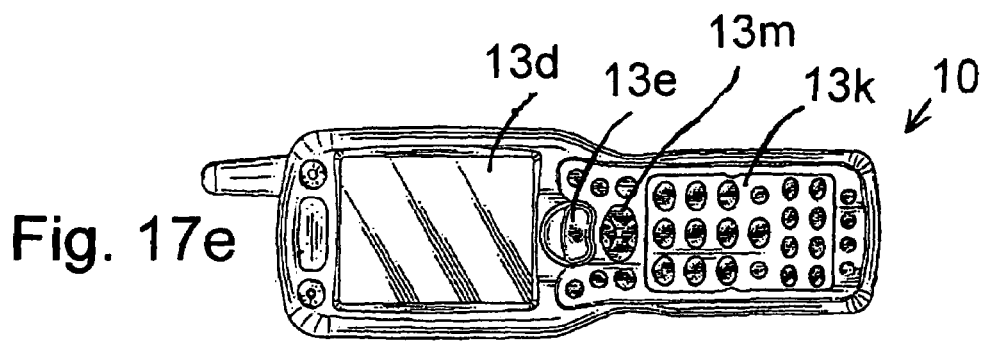
Figure 17F:
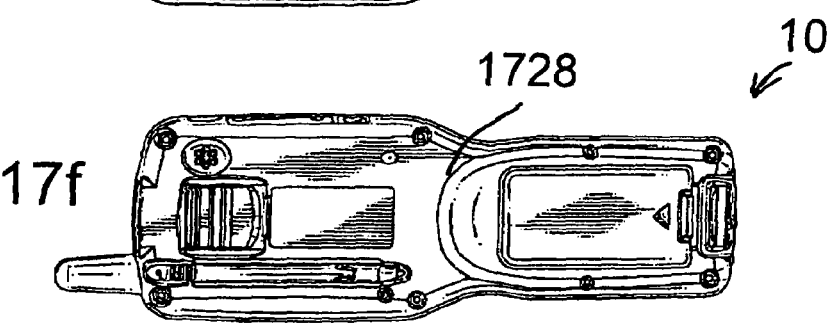
Figure 17G:
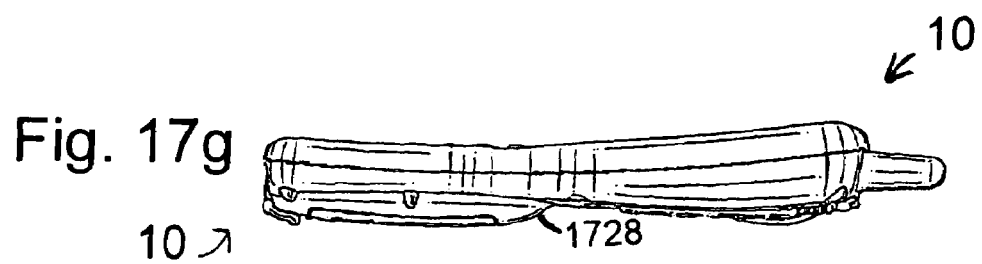
Figure 17H:
Figure 17I:
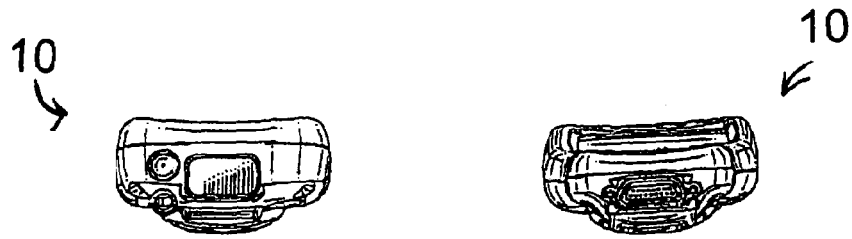
Figure 17J:
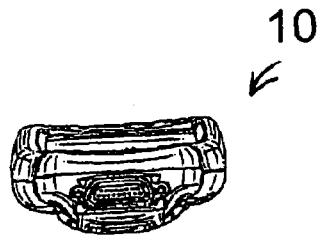

While the symbol generating device 4110 can be provided by a desktop PC, it is understood that the symbol generating device can take on any available packaged computer form, e.g., a notebook computer, a cell phone, a PDA, or another mobile optical reader 10, 110 as is shown in FIG. 6a, or another computer device form factor, some examples of which are shown in FIG. 16.

A block diagram of System 3500 is shown in FIG. 6b. Reconfigurable device 10c includes image sensor 32 and associated imaging optics 50, a control circuit 40 comprising CPU 41, memory 45 and additional components of the portable device 10 previously described with reference to FIG. 2a. Reconfigurable device 10c further includes data stream processing module 5110. Symbol generator 4110 in the example of FIG. 6b, is a personal computer including a control circuit 4140, a memory 4145 including hard drive 4146, and a display 4113d which displays GUI development screen 3600. Symbol generator 4110 may further include a GUI driving module 3602, encoder module 3702, and an API module 3752 as has been described herein. Control circuit 4140 is in communication with printer 4014. While program modules 3602, 3702, 3752, and module 5110 are shown as being incorporated in nonvolatile memory ROM 4144, and ROM 44 respectively, it is understood that such program modules could be incorporated in other memory devices, including long term memory storage devices, in a system firmware memory location including a memory of a processor IC chip, or may be implemented in hardware.

Symbol generating device 4110 can include any commercially available bar code symbol encoder module 3702. Examples of commercially available bar code symbol encoders include BAR CODE ACTNEX version.2.0 ACTNEX PLUS (.NET READY) version and B-CODER 2.0 available from Tal Technology, Inc., various encoding program available from ID Automation.com, Inc., and BARTENDER VERSION 7 by Seagull Scientific. Reprogramming symbol 3110 may be a 1D bar code symbol or a 2D bar code symbol, or another decodable indicia.

Referring to aspects of system 3500 relating to communication options, host computer 4100 may be provided by a PC and may be in communication via system backbone 4002 (which may be provided by such hardware as an Ethernet cable). More particularly, backbone 4002 may be in communication with PC 4100, communication/charging cradle 4016, and access point 4018. Mobile devices 10 may be in communication with PC 4100 wirelessly via access point 4018 and/or nonwirelessly via communication cradle 4016. Backbone 4002 may be further in communication with server 4030 and with a remote network 4020. A network 4050 maintained by a manufacturer or other supplier of device 10 may be in communication with network 4020. Server 4052 or another computer of supplier network 4050 may store the supplier's website from which a user of computer 10 or computer 4110 may view web pages or access files. In one embodiment, network 4020 represents the Internet. In another embodiment, network 4020 represents an Intranet. In another embodiment, the local area network (LAN) including devices 10 and PC 4110 is directly linked to supplier network 4050.

In one embodiment, symbol generator 4110 encodes (1) a formatted file and (2) an OS understandable command into an encoded symbol 4110. For example, in one embodiment, symbol generator 4110 encodes a symbol 3110 which, when read by reconfigurable device 10c, causes a certain text message (e.g., a notice, a help message, a promotional message) to be displayed on display 13d of reconfigurable device 10c. In such an embodiment, symbol generator 4110 may encode; e.g., a WORDPERFECT encoded word processing document (a .WPD file) into a symbol 3110 printed by printer 4014 and a command encoded in symbol 4014 may include a command to automatically open a WordPerfect program to the WordPerfect document encoded into the symbol. Such a command may take the form: "WP.EXE / MESSAGE.WPD."

In another embodiment, symbol generator 4110 encodes a symbol 3110 which when read by reconfigurable device 10c, causes a certain audio file (a song, a voice message) to automatically be played by device 10c after reading of symbol 3110. In such an embodiment, symbol generator 4110 may encode an MP3 file (.MP3) into symbol 3110 (or an audio file in another suitable format such as .WAV or .AVI) and the command may be a command to open an MP3 player and to play the file encode in the symbol. Such a command may take the form: "MP3PLAYER.EXE / SONG.MP3." Numerous other examples of the invention are described herein.

A GUI development screen 3600 which may be used with the invention is described with reference to FIGS. 7a-7j. GUI development screen 3600 and the program module 3602 for driving screen 3600 may be incorporated into PC 4110. GUI development screen 3600 may be displayed on a display 4113d associated with PC 4110 as shown in the embodiment of FIG. 6a. GUI development screen 3600 may also be incorporated in another type of computer device and displayed on a display thereof; e.g., display 13d of mobile computer 10, 110 or 10c (the reconfigurable device 10c can contain the GUI screen 3600 and its associated module 3602 driving program) as shown in FIG. 6a. As has been indicated herein, reconfigurable device 10c as shown in FIG. 6a can further incorporate the functionality of broadcasting device 10, 10B and receiving device 10, 10R as described in connection with FIG. 1.

Referring to GUI development screen 3600, GUI development screen 3600 (which is also referred to herein as an "interface") includes a file selection area 3610 allowing a user to input which of files presently stored on symbol generator 4110 he wishes to have encoded in symbol 3110. In the selection of formatted files to encode, a user may open various windows to view the contents of various files and/or folders stored on a memory; e.g., memory 4145 of the symbol generator using mouse 4113m or another pointer-mover such as mover 13m to move pointer 3630 in the selection of files to be encoded. More than one formatted file may be selected for encoding. Development screen 3600 also includes a command input area 3620 allowing a user to specify a command to be executed by reconfigurable device 10c upon a reading of symbol 3110.

The command that is input into input area 3520 for encoding and eventually executed by reconfigurable device 10c may be an OS understandable command; that is, a command which can be understood and executed by the operating system of reconfigurable device 10c. Providing system 3500 so that symbol generator 4110 encodes easily selected formatted file data and/or encodes an OS understandable command adapts system 3500 for implementation across a variety of different platforms. A data stream processing module 5110 need not include any proprietary instructions for interpreting and processing commands input into input area 3620. Referring further aspects of interface 3600, a user, using area 3650 of screen 3600, may designate the file directory path of stored formatted file data to be stored in memory 45 of device 10c.

Referring to further aspects of interface 3600, a user using area 3672 may designate the number of symbols 3110 he wishes system 3500 to produce in order to facilitate a reconfiguring of reconfigurable device 10c. If a user enters "1" in area 3672, one larger file encoded symbol 3110 will be produced by host 4110. If a user enters "2" in area 3672, symbol generator 4110 will produce two smaller reprogramming symbols for facilitating reconfiguring of reconfigurable device 10c. System 3500 may automatically change the symbol count and the symbol count designated in area 3672 depending on the data requirements. For example, symbol generator 110 can be configured so that if a user selects a larger formatted file using area 3610, larger than a predetermined size, symbol generator 110 automatically increases the number of symbols that are required to be encoded, and automatically adjusts the symbol count reported in area 3672.

Figure 8A:
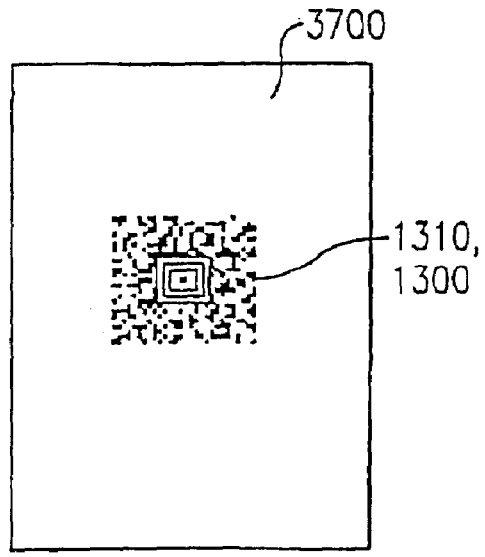
FIGS. 8*a*-8*c* show examples of reprogramming symbols of the invention.
Figure 8B:
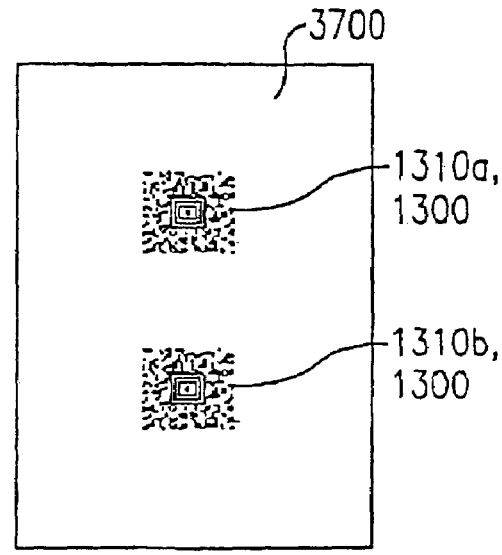
Figure 8C:
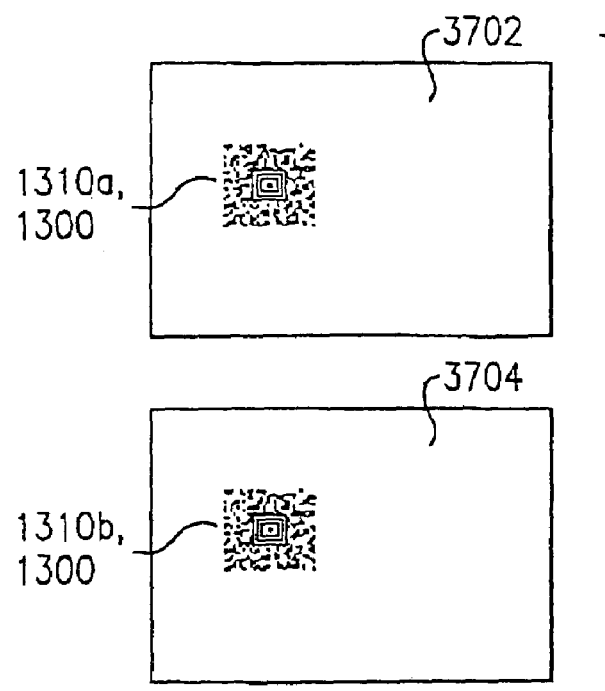

Various examples of "programming sheets" of the invention are shown in FIGS. 8a, 8b and 8c. In the example of FIG. 8a, host encoder 4110 prints a single file encoded symbol 3110 on a single substrate 3700. In the example of FIG. 8b, host encoder 4110 prints two file encoded symbols 3110a and 3110b on a single substrate 3700. In the example of FIG. 8c, host encoder 4100 prints first file encoded symbol 1310a on first substrate 3702 and second file encoded symbol 1310b on second substrate 3704. Device 10c must read both of symbols 1310a and 1310b to be reprogrammed. Access to certain file or files can be controlled by controlling access to one of substrates 3702, 3704. Programming sheets 3700, 3702, 3704 can be provided; e.g., on paper including adhesive backed paper (stickers) and plastic or other rigid or semi rigid identification cards such as drivers licenses, customer loyalty cards, credit cards and debit cards.

It will be seen that the multiple symbol option of the invention facilitates a security application. The symbol encoding system of the invention can be made so that reconfigurable device 10c is reconfigured to include a certain formatted file (e.g., a .XML, a .PDF or a .HTML file), or a command or other data, only after reading all symbols of a multiple symbol reprogramming set. The distribution of a first symbol 3100a and the second symbol 3110b (FIGS. 8b, 8c) can be controlled so that reprogramming of a device 10c by reading of two symbols is limited to those users who have access to both of the reprogramming symbols 3110a and 3110b.

While system 3500 described with reference to FIG. 6a includes printer 4014, a system according to the invention can be devoid of printer 4014.

Figure 12A:
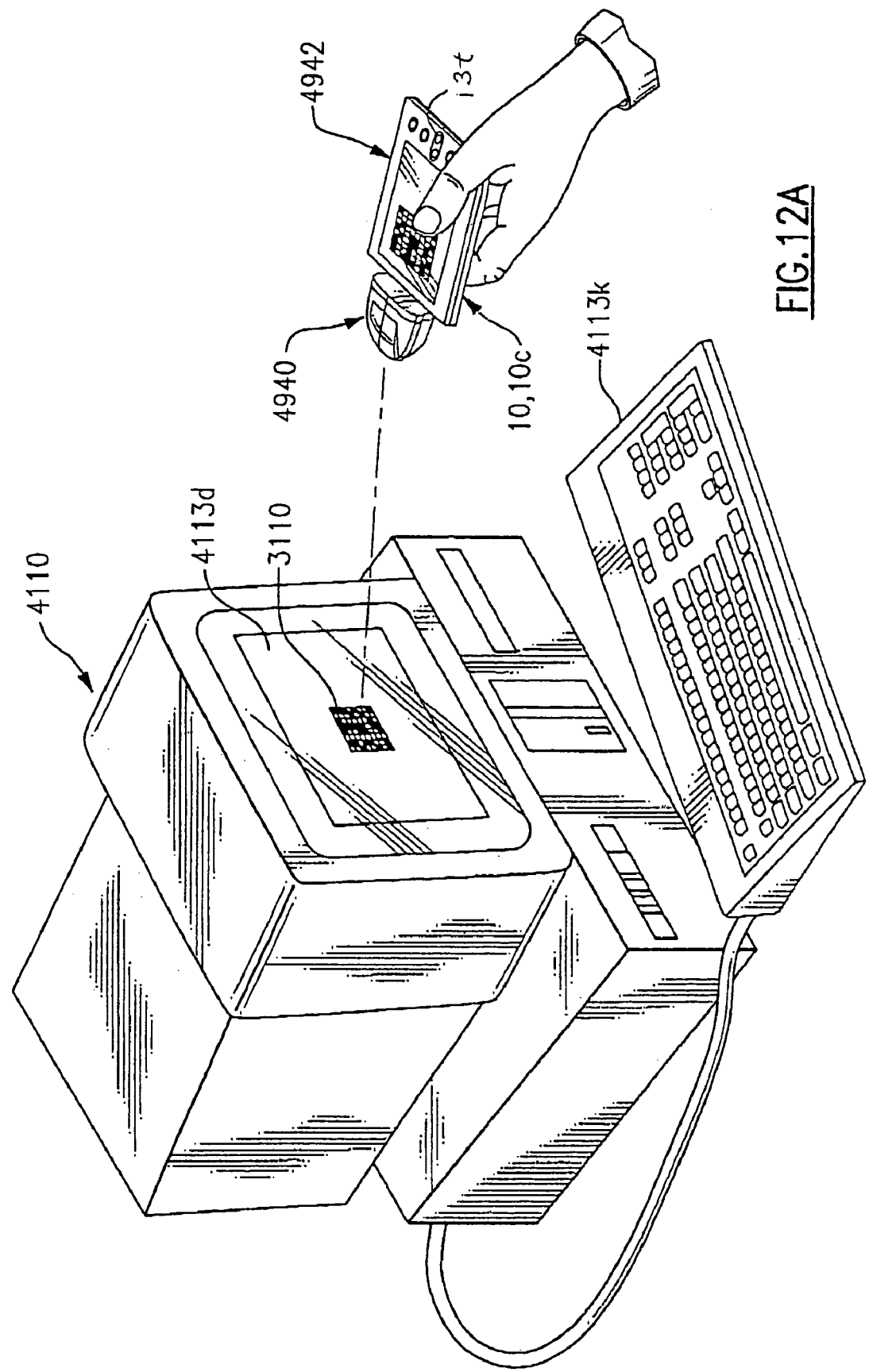

A highly useful alternative embodiment of the invention is described with reference to FIGS. 12a-12d. In the embodiment of FIG. 12a, reprogramming symbol 3110 is not printed, but rather is displayed on electronic display 4113d. Reconfigurable device 10c (shown as being provided by a PDA with a detachable imager module such as an ISC-IMAGER or IT4500 Image Reader available from HHP, Inc. of Skaneateles Falls, N.Y.) reads symbol 3110 displayed on display 4113d and, thereby, is reprogrammed. Symbol generator 4110 may display reprogramming symbol 3110 as part of GUI development screen 3600, as shown in the screen shot example of FIG. 7i.

Utilization of the reprogramming system of FIG. 12a eliminates the need to print symbol 3110 on paper. Utilization of the reprogramming system of FIG. 12a also improves the ease with which symbol 3110 can be made available to a variety of users and with a different one of device 10c. For example, a supplier of reconfigurable device 10c may make symbol 3110 available by accessing a supplier's website stored on network 4050. Symbol 3110 may be stored on a web page of supplier network 4050, or may be included in a formatted file [e.g., .PDF, .WPD, .XML] transferred from supplier's network 4050. Thus, several users at various remote locations, each having a different one of reconfigurable devices 10c can readily access the same symbol 3110. A supplier maintaining network 4050 may configure network 4050 to e-mail each of several customers a reprogramming symbol 3100 on receipt of a command input by a supplier. The e-mailed symbol may be a time-varying symbol 3110TV as will be described herein. The e-mailed tine varying symbol 3110TV can be part of an animation file, conveniently provided in a GIF file format, for example.

Figure 7A:
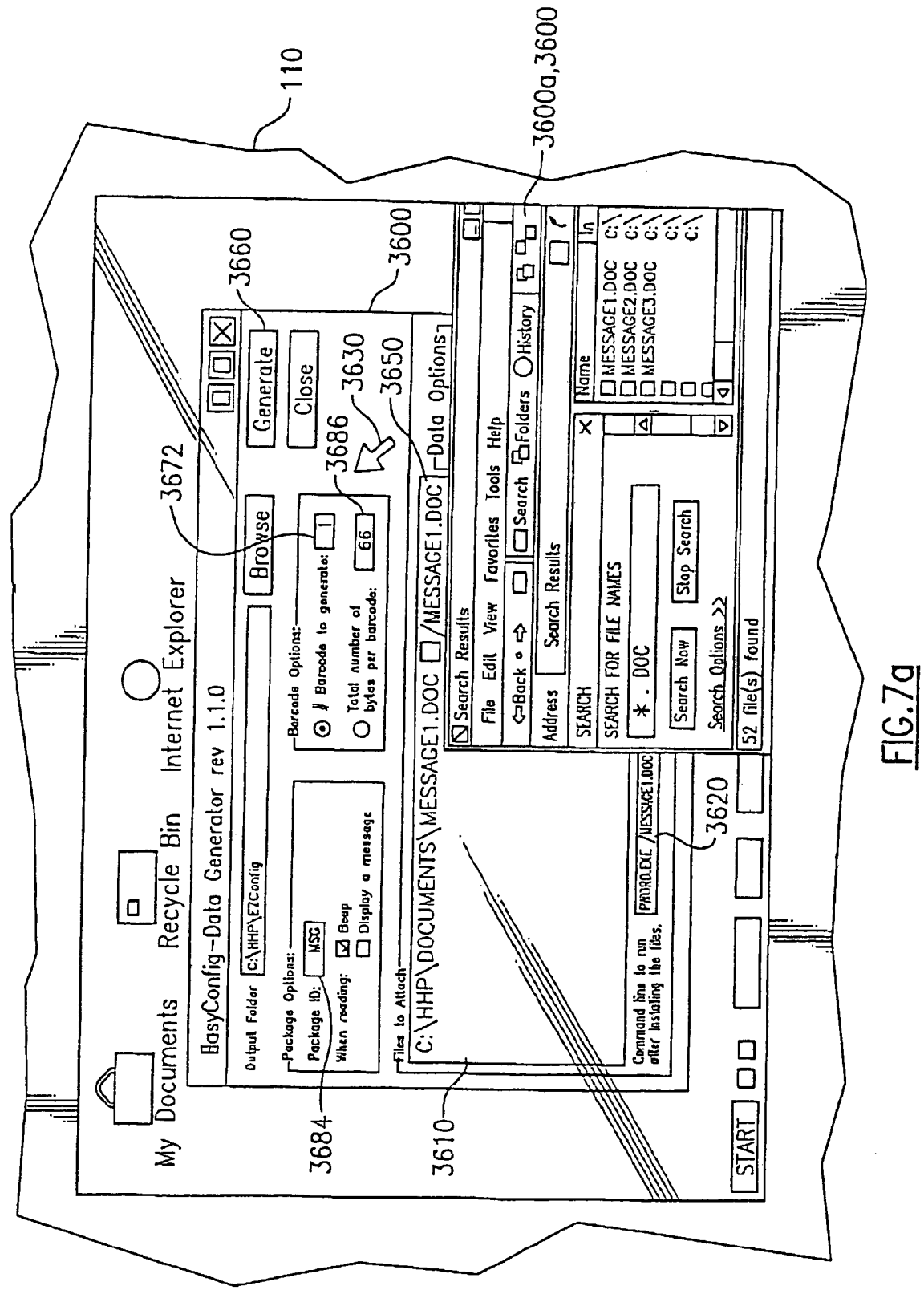
FIGS. 7a-7j are screen shots illustrating use of a GUI development screen incorporated in a symbol generator of the invention.
Figure 7B:
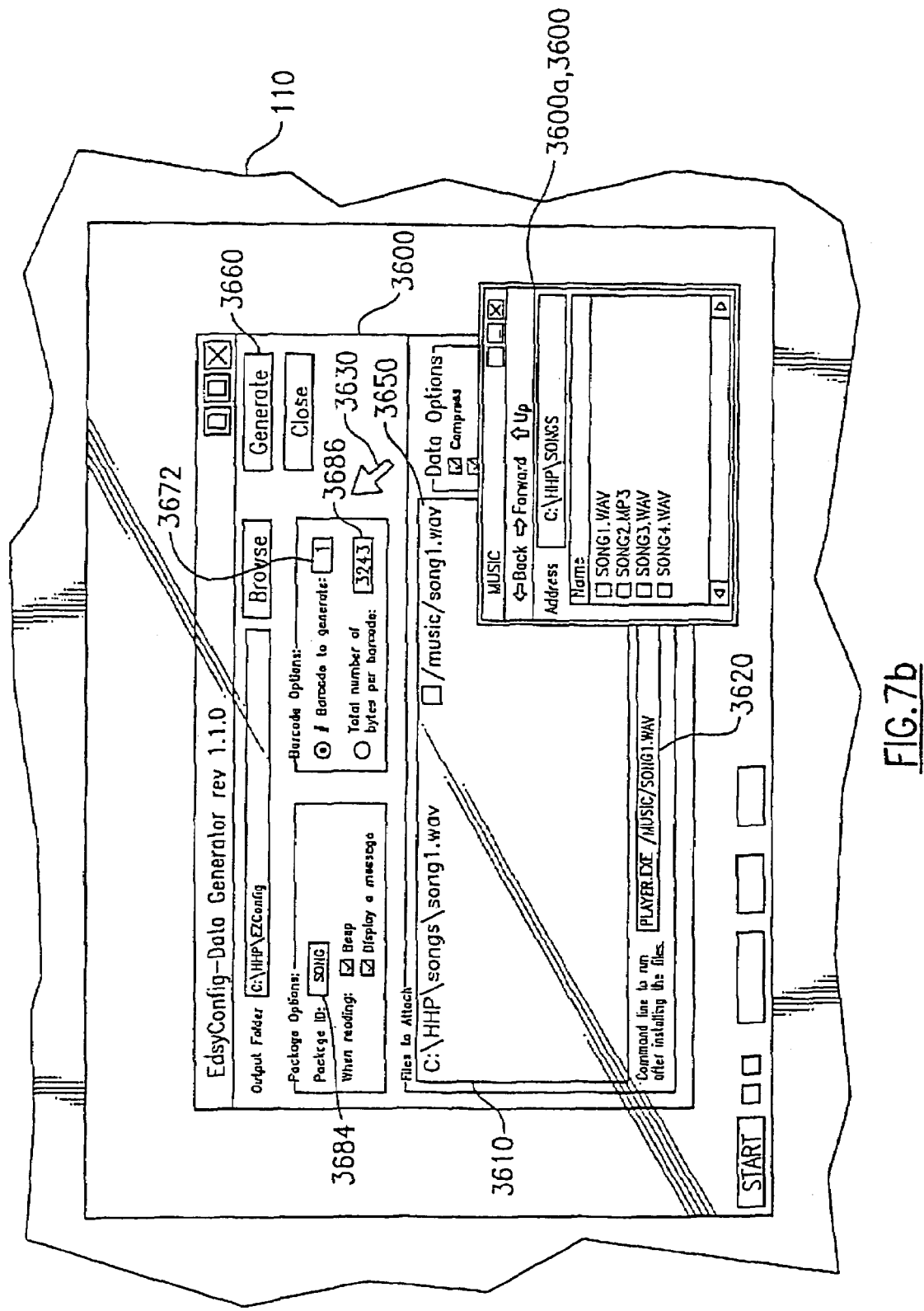
Figure 7C:
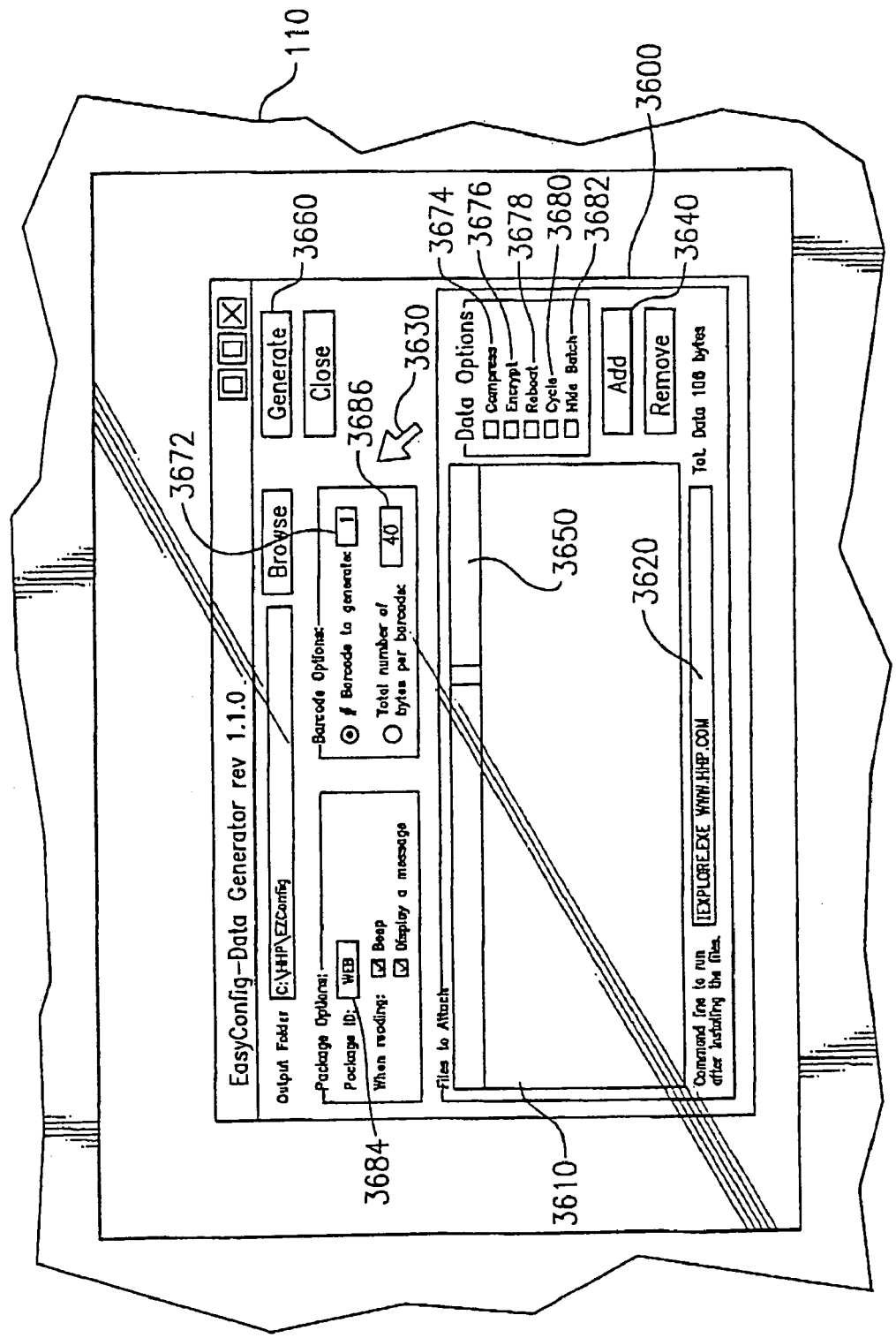
Figure 7D:
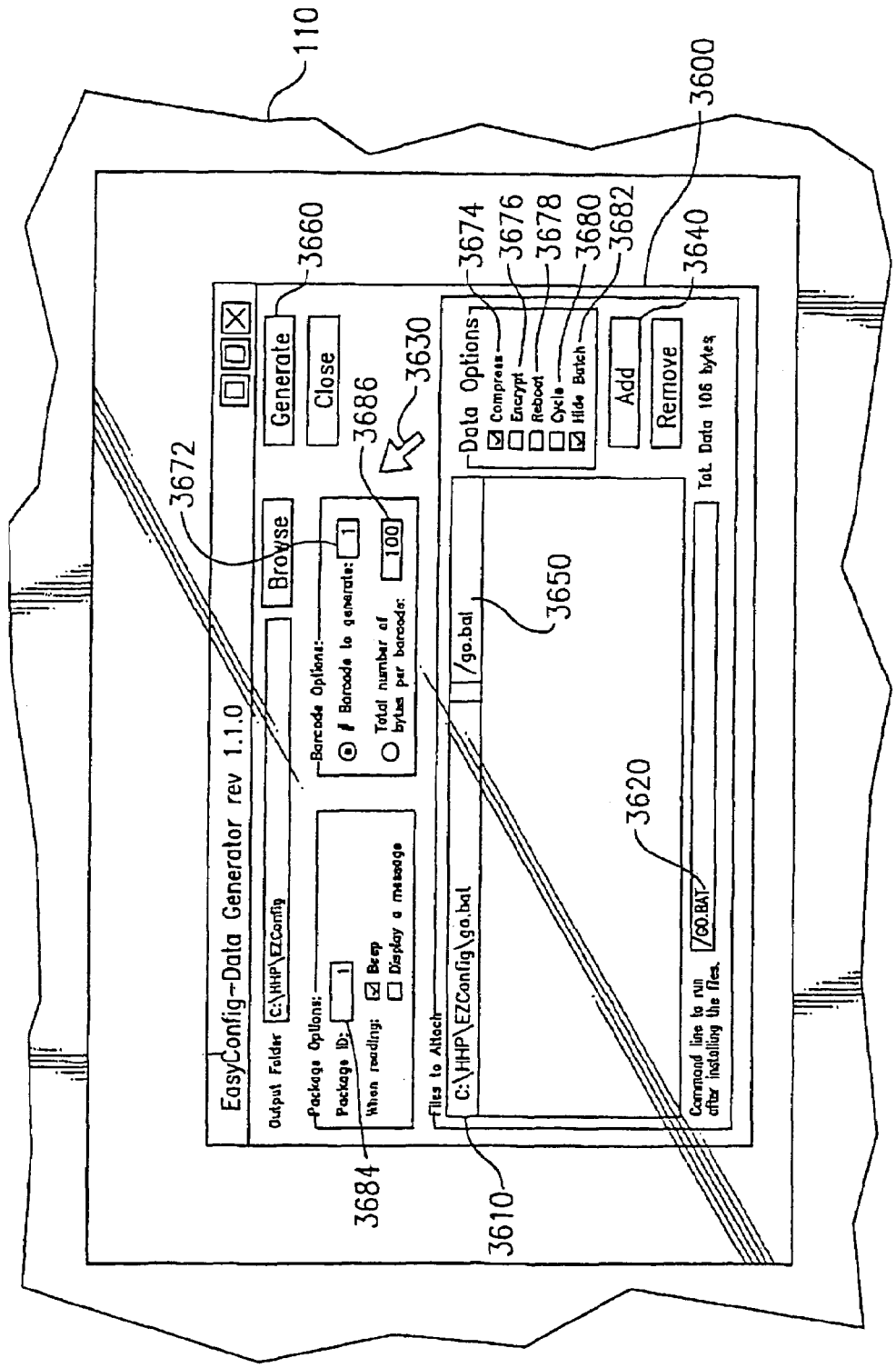
Figure 7E:
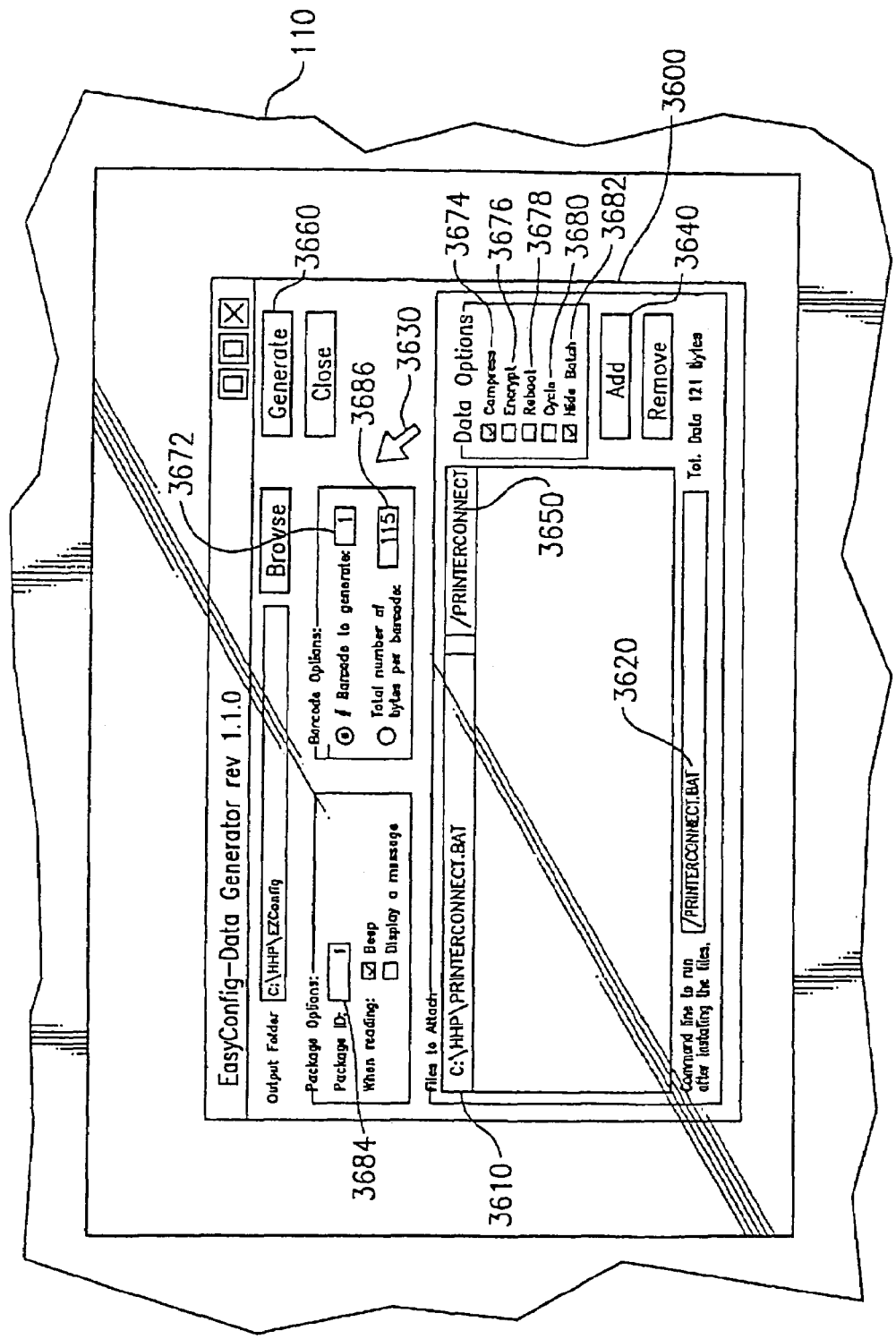
Figure 7F:
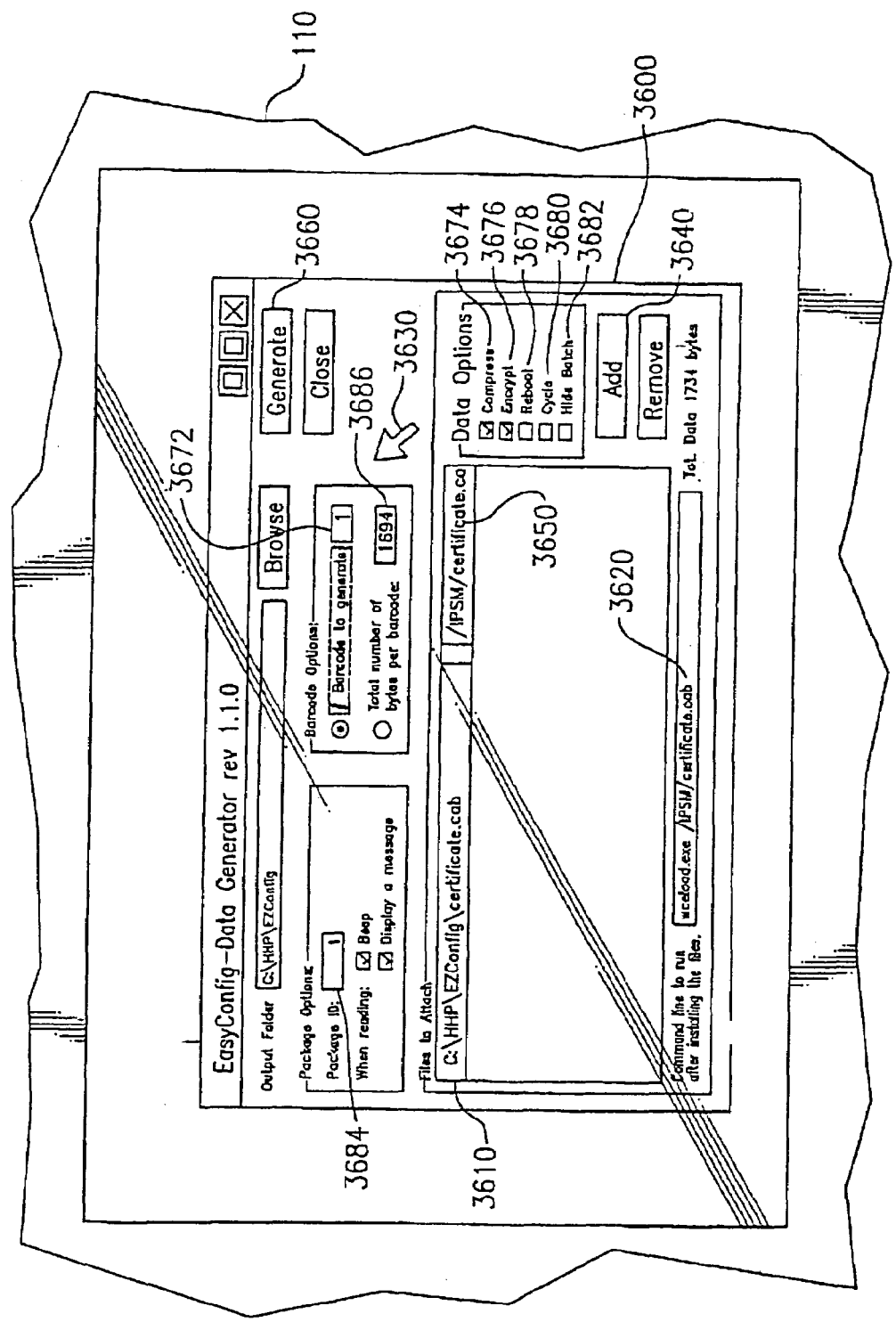
Figure 7G:
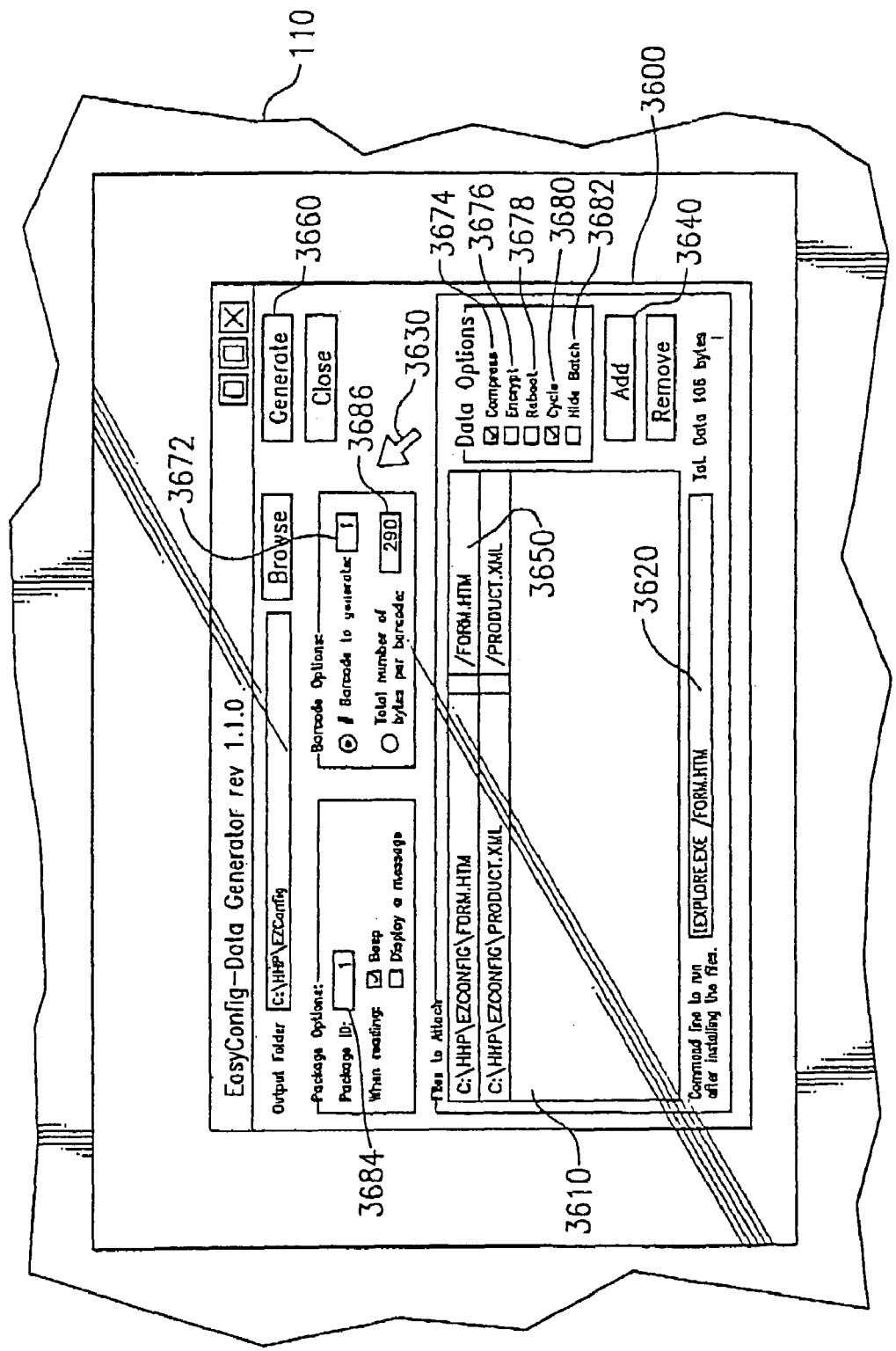
Figure 7H:
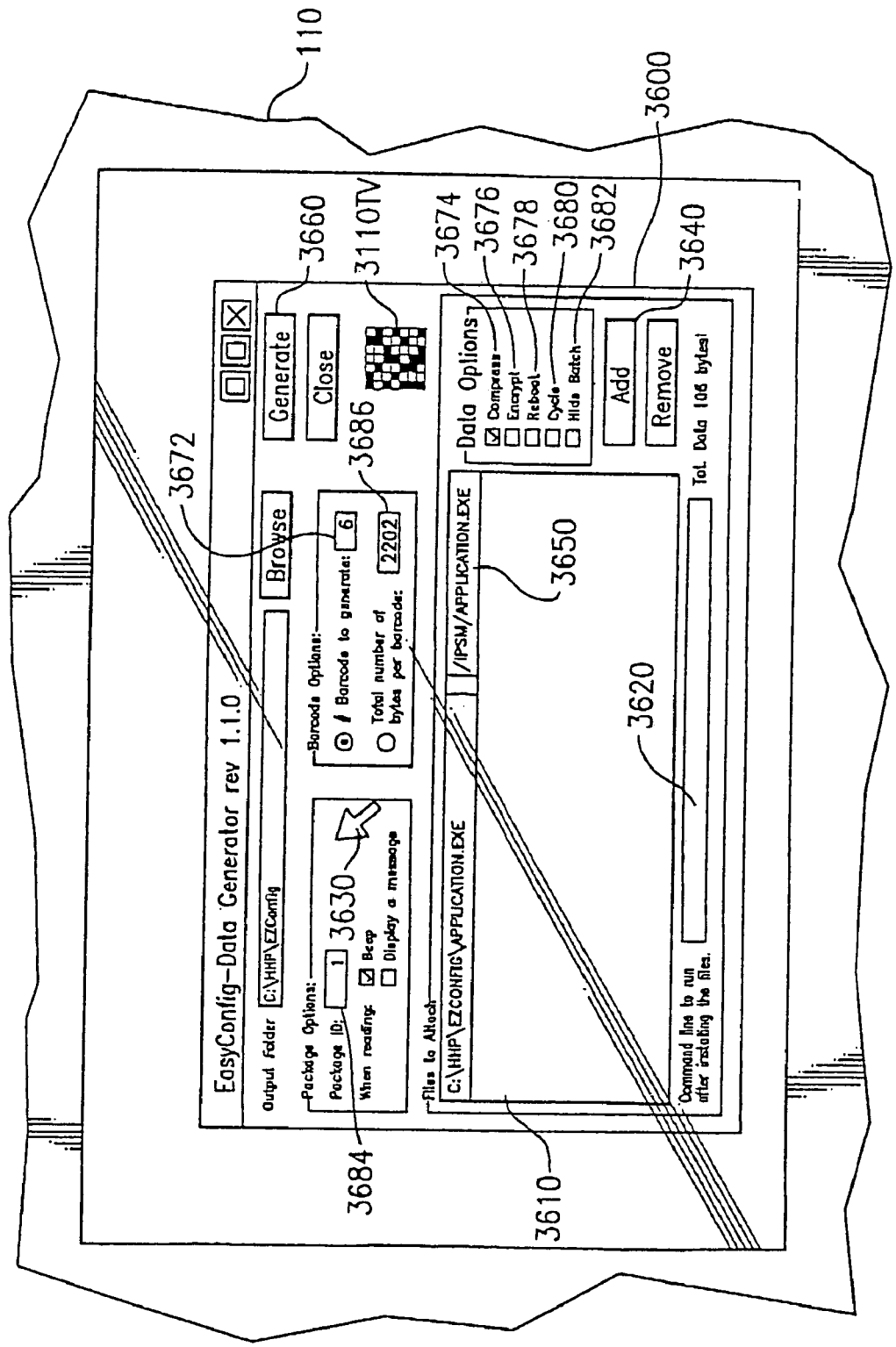
Figure 7I:
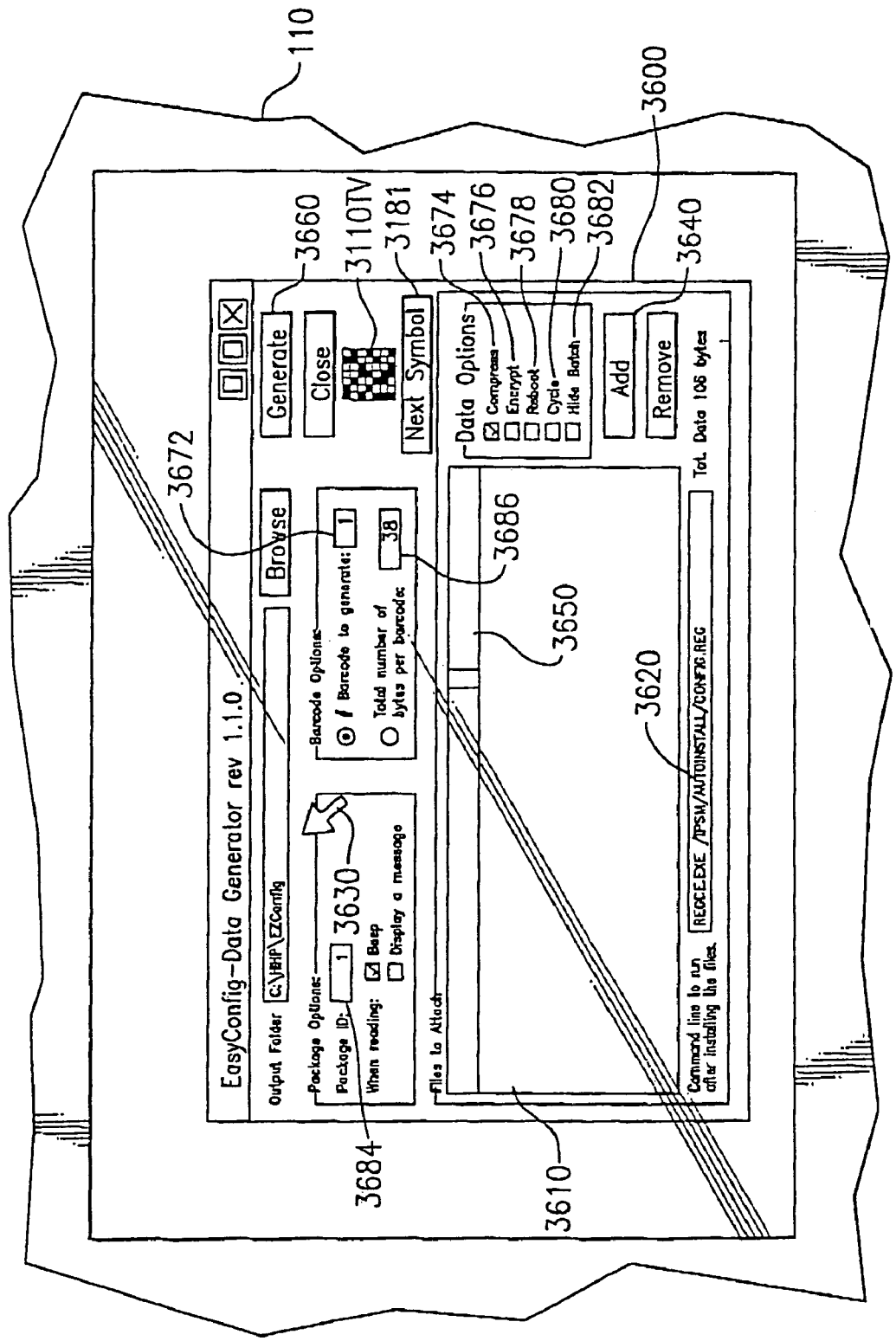
Figure 7J:
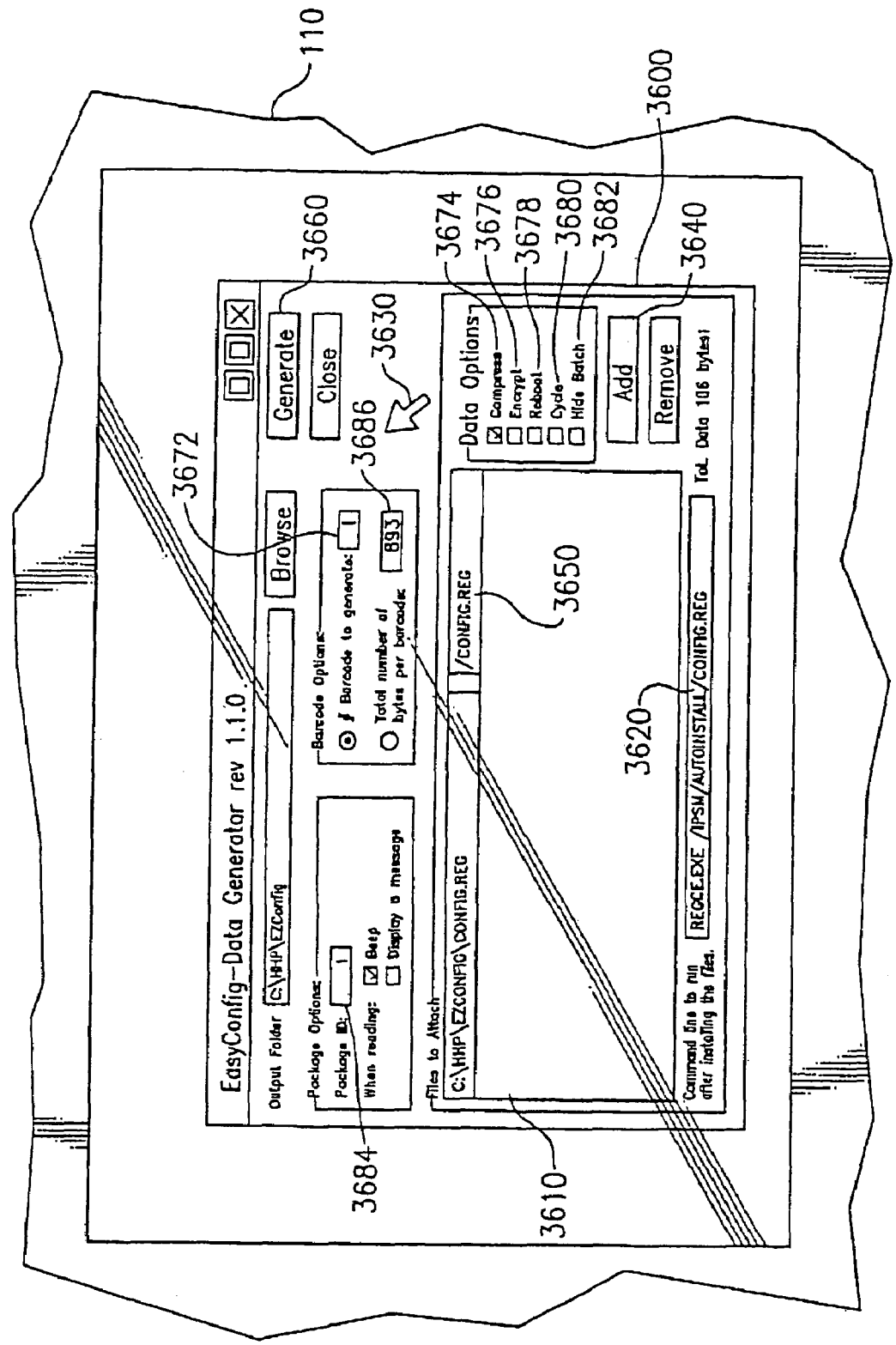

It has been described herein with reference to FIGS. 8a-8c that a reprogramming system according to the invention can include more than one symbol, 3110a and 3110b printed on a substrate. In a variation of the invention, multiple symbols 3110a and 3110b are electronically displayed (e.g., on a display 4113d or by a projection). In another variation, multiple symbols 3110a and 3110b, electronically displayed, are displayed at the same position of a display (e.g., 4113d), but at different times. Symbol 3110a is displayed at a certain position of display 4113d at time $T_1$ and symbol 3110b is also displayed at that same position of display 4113d, but at time $T_2$, some time after $T_1$. Thus, reader 10c can be used to read symbol 3110a and 3110b without being moved. In one example, reader 10c is placed on a stand 6002 at a fixed position relative to display 4113d so that it can read all symbols within the position 6004 of display 4113d. Device 10c is further configured to operate in an automatic reading mode in which it automatically reads symbols and is operated in the automatic reading mode. Display 4113d meanwhile, is operated to display a "time varying bar code symbol" 3100TV. That is, display 4113d is operated to successively display several different symbols 3110 (e.g., 3110a, 3110b, 3110c . . . ) at common position (e.g., position 6004) at display 4113d. The successive display may be automatic or controlled (e.g., with use of a toggle actuator 3181 as shown in FIG. 7i). Utilizing the reprogramming system including a time varying symbol 3110TV, larger amounts of data including larger formatted files can more readily be loaded into reconfigurable device 10c by way of reading reprogramming symbols. The use of time-varying symbol 3110TV to reprogram a device 10c is often more reliable and convenient than other reprogramming methods because it does not rely on the proper configuration of any communication port and does not rely on the integrity of any network connection. In the embodiment of FIG. 12c, several portable reconfigurable symbol reading devices 10c placed on stand 6002 are reprogrammed at once by reading a time varying bar code symbol 3110TV. It is understood that more than one symbol 3110 can be displayed on display 4113D for reading at a given time. In the embodiment of FIG. 12d, time-varying symbol 3110TV is displayed at various positions of display 4110 so as to eliminate the need to orient each device 10 to a common reading point. Referring to FIG. 16, presentation reader 4908 can be reprogrammed by disposing PDA 4922 under presentation reader 4908 and displaying a time varying symbol 3110TV on a display 13d of PDA 4922. While the reprogramming system of FIGS. 12a-12d includes a PC 4110, it is understood that PC 4110 may be a generic PC which does not encode bar code symbols and which is not part of system 3500.

When reading time varying symbols 3110TV, device 10c should be operated to continuously read bar codes. To facilitate reading reader 10c may be operated in a continuous read mode in which the reader automatically and continuously reads bar codes. Also, a trigger 13t of device 10c can be held down, or repetitively actuated. A reprogramming method involving the reading of a time varying symbol 3110TV may be particularly advantageous where reconfigurable device 10c requires installation of a large file but is lacking available communication ports or user interfaces (keyboards, GUIs) for operating/controlling its communication ports.

Referring to other aspects of GUI development screen 3600, area 3674 allows a user to select whether data is to be compressed before being encoded in symbol 3110. Compression schemes which may be launched by a user checking the box of area 3674 include e.g., a run-length compression scheme, a Huffman-coding compression scheme, and a Lempel-Ziv compression scheme. Area 3676 allows a user to select whether data encoded in symbol 3110 is to be encrypted prior to being encoded in symbol 3110. Encryption schemes which may be launched by a user checking the box of area 3674 include e.g., an RC2 block cipher scheme, an RC4 stream cipher scheme, a DES block cipher scheme, and a triple DES block cipher. Area 3678 allows a user to select whether device 10c is to be rebooted after executing a command of command 3620. Area 3680 allows a user to select whether a "cycle" command is to be executed. If cycle area 3680 is checked, reconfigurable device 10c waits to read another reprogramming symbol 3110 after reading a first reprogramming symbol 3110. If cycle input area 3680 is not checked, reconfigurable device 10c reverts to main menu display screen 1100 (FIG. 5) after reading symbol 3110. If reboot input area 3678 is checked, device 10c reboots after successfully processing a bar code symbol data stream. If hide batch area 3682 is not checked, device 10c displays during their execution the various commands that make up a script file, if a multiple command script file is entered as the command in command input area 3620 of screen 3600 (see Examples 4 and 5). Package ID area 3684 allows a user of screen 3600 to input "wild card" data, i.e., any data the user-programmer wishes to enter. Such wild card data may be used for the control of device 10c; that is, processing module 5110 may be made to branch control depending on the content of the data entered in area 3684. When making a reprogramming symbol set as will be described, it is useful to designate each symbol as having the same ID so module 5110 can readily assess whether a decoded symbol is one of a set that is in the process of being read. The package ID data may designate the purpose of a particular symbol 3110, e.g., a song, a printer configuration, a radio configuration, etc. Area 3686 indicates to a user the data (e.g. byte) size of the symbol to be encoded. A user may use area 3686 to reduce a symbol size. Symbol generator 110 may be configured so that if a user uses area 3686 to reduce a symbol size, symbol generator 110 automatically adjusts a symbol count as indicated by area 3672.

Figure 9:
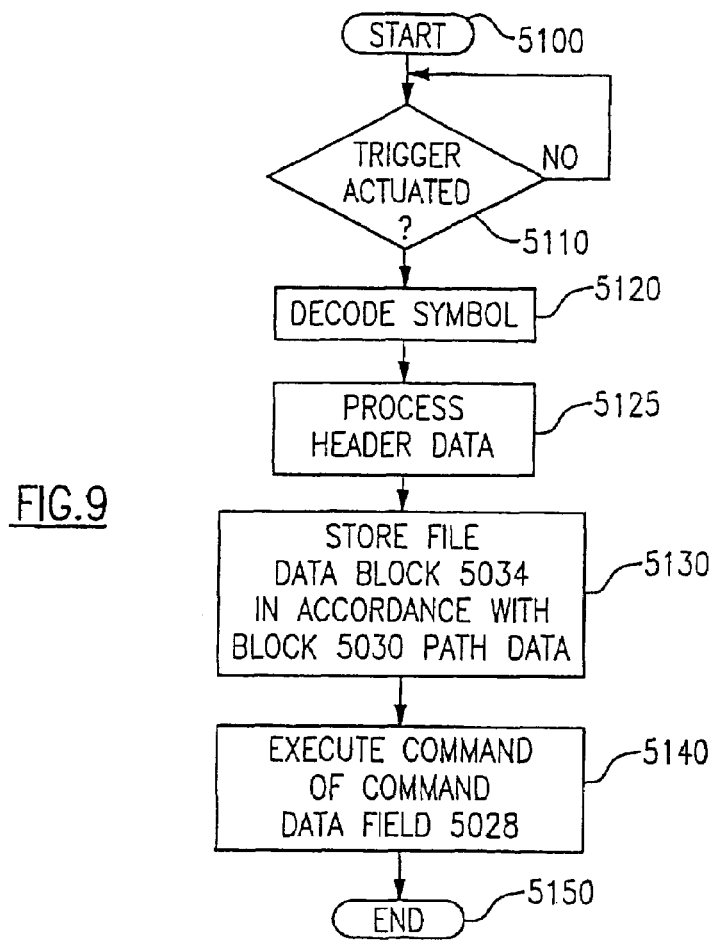
FIG. 9 is a flow diagram illustrating operation of a reconfigurable device operating in a "symbol reading" reprogramming mode.
Figure 10:
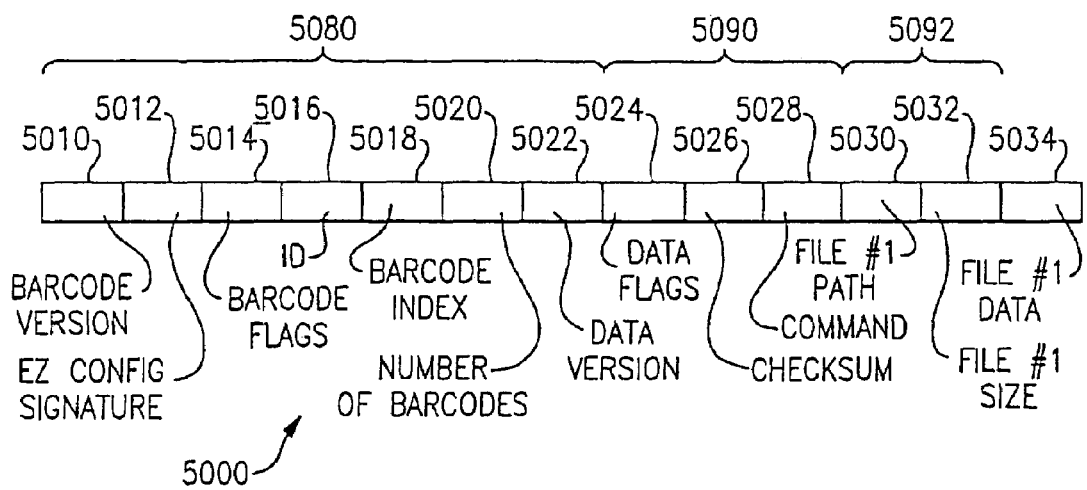
FIG. 10 is an example of a data stream corresponding to an encoded reprogramming symbol constructed by a symbol generator in accordance with the invention.

A data stream of an encoded symbol data message may take the form described with reference to FIG. 10. In one example, data field 5010 may encode data corresponding to the type of bar code symbol. Field 5012 may include data indicating that the symbol is a specially designated symbol for use with system 3500. Field 5014 may encode a barcode flag, such as whether device 10c is to beep when successfully reading a symbol 3110 or completing a block 5130, 5140 (FIG. 9) or display a message after reading symbol 3110, or after completing a block 5130, 5140 (FIG. 9). Field 5016 may include a package ID, which as explained herein, is user-designated data (input into area 3684), allowing a user of GUI screen 3600 to easily encode control or other data into data stream 5000. Field 5020 may encode how many bar codes are encoded. Field 5022 may encode the data version of the data stream. From time to time, a maker of symbol 3110 may wish to change the data format of data stream 5000. Field 5024 may encode whether certain data manipulations have been performed in encoding the data such as compression and encryption. Field 5034 may include file data corresponding to an encoded file selected by a user input into area 3610 of screen 3600. Field 5030 may include data corresponding to the path in which data is to be stored in device 10c. Field 5028 may include command data input into screen 3600 to command area 3620. Fields 5010, 5012, 5014, 5016, 5018, and 5020 can be considered a bar code header 5080. Fields 5022, 5024, 5026, 5028, 5030, and 5032 can be considered a data header 5090 while fields 5030 and 5032 can be considered a file header 5092.

An exemplary sample program highlighting certain features of a processing module 5110 which may be incorporated on reconfigurable device 10C for processing of data stream 5000 is described with reference to the flow diagram of FIG. 9. At block 5120, device 10c in accordance with module 5110 reads a reprogramming bar code symbol 3110 in response to a recognition that trigger 13t has been actuated (block 5110). At block 5125, device 10c processes headers of data stream 5000. Such processing may include e.g. deletion of bar code header data when attaching file data encoded in two separate symbols, reading header control data such as encryption, and compression instructions, and hide batch instructions, determining whether the symbol is part of a reprogramming symbol set, and the number of the symbol in the set. At block 5130, device 10c stores formatted file data as selected using area 3610 of interface screen 3600 into a specific path of a memory of device 10c selected using area 3640 of interface screen 3600. At block 5140, device 10c executes a command in accordance with the command previously input into the symbol generator 4110, using area 3620 of interface screen 3600. An important aspect of the invention, in one embodiment, is that device 10c in accordance with data stream processing module 5110 automatically executes block 5140 (execute command) subsequent to reading symbol (block 5120). Thus, a symbol 3110 can be made which results in e.g., a text message being displayed, a song or movie being played, a file being downloaded, a website opened without there being any user input command input into device 10c other than the commands that are input by the act of reading symbol 3110.

When executing a command at block 5140, device 10c executes an executable program. For example, when opening a document, device 10c may execute a word processing program such as WordPerfect or Microsoft Word. When playing a song, device 10c might execute an audio player such as an MP3 player or a .WAV file player. The command often has a data file associated it. For example, for opening a document, the command may be a command to open a certain document file using a certain program. For playing a song, the command is a command to play a certain music file using a certain music file player. In that a formatted file is stored at block 5130 into memory 45 of device 10c before an execution of an executable file at block 5140, the formatted data (music, text) file associated with command block 5140 can be and is often the encoded file data stored at block 5730. The command may be included in a script file such as a .BAT file, a .JS file or a .VB file.

Portable device 10c may be automatically driven or manually driven into a mode in which it operates in accordance with the flow diagram of FIG. 9. Main menu screen 1100 as shown in FIG. 5 may include "Symbol Reprogramming" icon 1108. Device 10c may be configured so that actuation of icon 1108 results in device 10c operating in a mode, as described in connection with the flow diagram of FIG. 9, in which device 10c is reprogrammed by reading a specifically configured bar code symbol 3110. Device 10c can also be made to be driven into a symbol reprogramming mode by reading a specifically designed reprogramming mode bar code symbol 3112, which, when read, results in device 10c operating in a mode in which it is reprogrammed by reading symbol 3110. Reprogramming mode symbol 3112 may be provided in a user's manual 4115 (FIG. 6a) associated with device 10c. User's manual 4115 can be downloaded from an Internet website of the manufacturer of device 10c. Device 10c can also be programmed so that when in a decode mode (actuated by selection of icon 1104) device 10c recognizes a decoded reprogramming symbol as a reprogramming symbol and commences operation in accordance with a symbol reprogramming mode.

It will be understood that the symbol generator 110, the reconfigurable device 10c, the broadcasting device 10b, and receiving device 10r of the reprogramming system of the invention can be incorporated in any available computer-device form factor. For example, as shown in FIG. 16, any one of the symbol generator 110, the reconfigurable device 10c, the broadcasting device 10b, or the receiving device 10r can be embodied by e.g., a gun style hand-held reader 4902, 4904, 4906, a hand-held reader 4908 in a scan stand 4910, a pen reader 4912, a digital camera 4946, a cellular phone 4914, 4916, a finger worn ring scanner 4920, a PDA 4922 and a PDT 4924. Further, a bar code reading reconfigurable device can have a reading unit tethered to or detachable with a device main body. For example, in FIG. 12, reconfigurable device 10c includes reader unit 4940 detachable with device main body 4942. Device 4930 (FIG. 16) includes a main body 4942 and a tethered reader unit 4940. Several of the form factors shown in FIG. 16 are discussed more extensively in application Ser. No. 10/092,789, filed Mar. 7, 2002, entitled "Optical Reader Imaging Module," incorporated herein by reference.

EXAMPLE 1

System 3500 is used to make a reprogrammable symbol 3110 which, when read, results in a particular text message custom-authored by a user automatically being displayed on display 13d of portable device 10, 10c. In making symbol 3110, one that results in text being displayed on display 13d, a document file is attached in file selection area 3610 of development screen 3600. Formatted document file types include .DOC, .TXT, .WPD (WordPerfect) type formatted files. The making of a reprogramming symbol 3110, which when read, results in customized text being displayed on display 13d is particularly described with reference to FIG. 7a. Auxiliary window 3600a is opened (using the "search" function of Microsoft Windows) and the search query *.DOC is used to locate all formatted files stored on symbol generator 4110 having the formatted file extension .DOC. When opened, auxiliary window 3600a for use in selecting a file for encoding is considered part of symbol generator development screen 3600, and, therefore, is designated with the reference numeral 3600 in addition to being designated with the reference numeral 3600a. A text file stored in generator memory 4145 has been previously custom-authored by a user. The text or document file can contain any message. The message may be a promotional message respecting a product, and symbol 3110, which is created, can be stickered on to the product. The custom-authored message in Example 1 is stored under the file name "MESSAGE1.DOC." In order to select that formatted file, a user accesses window 3600a and highlights the "MESSAGE1.DOC" of window 3600a. Clicking on "add" button 3640 of interface screen 3600 results in the "MESSAGE1.DOC" file being selected (see FIG. 7c, add button 3640 hidden from view in FIG. 7a). Using command 3620 a user using development interface 3600 inputs an appropriate command. An appropriate command when system 3500 is used to generate a text display symbol may be a command to open the selected text document using a particular word processing program (PocketWord, Word, WordPerfect). In the example of FIG. 7a, the command input is the command: "PWORD.EXE /MESSAGE1.DOC." This input command (after being encoded and then decoded) when executed by device 10c results in the "MESSAGE1.DOC" formatted file being opened for viewing using the PocketWord program previously stored on memory 45 of device 10c.

As is illustrated in the example of FIG. 7a, development interface 3600 can be utilized to designate a path of the formatted file to be subject to encoding into a symbol, then decoding and storage onto device 10c. A desired path of the stored data is input into path designation area 3650 of development screen 3600. In the example of FIG. 7a, the path data: "/MESSAGE1.DOC" is entered. Without any folders being specified, e.g., C:/DOCUMENTS/MESSAGE1.DOC., the file data selected for encoding using area 3650 is stored in the root directory of device 10c.

When generate button 3660 is selected (see FIG. 7c, generate button 3660 hidden from view in FIG. 7a) a symbol image file is generated encoding the input information. After symbol generation is complete, the encoded symbol image file can be accessed and printed by actuation of a print button (not shown). It is understood that an encoded symbol image file need not be printed to be read. An encoded symbol image file (stored in an appropriate image file format such as .PDF, .TIF) may be displayed on display 4173d and then read by device 10c. An encoded symbol image file can also be projected by an image projector and the projection can be read by device 10c.

Symbol 3110 may be encoded so that a data stream produced by the decoding of symbol 3110 by device 10c is given by Table 1A below.

TABLE 1A

| Reference No. | Description | Data Content |
|---|---|---|
| 5010 | Barcode Version | B |
| 5012 | EZConfig Signature | ECFG |
| 5014 | Barcode Flags | BEEP | DISPLAY |
| 5016 | Id | MSG |
| 5018 | Barcode Index | 1 |
| 5020 | Number of Barcodes | 1 |
| 5022 | Data Version | 1 |
| 5024 | Data Flags | ENCRYPT|COMPRESS |
| 5026 | Checksum | 0x00003386E |
| 5028 | Command | PWORD.EXE/MESSAGE1.DOC |
| 5030 | File #1 Path | MESSAGE1.DOC |
| 5032 | File #1 Size | 50 |
| 5034 | File #1 Data | -BINARY CONTENTS OF .DOC FILE- |

EXAMPLE 2

System 3500 is utilized to make a symbol 3110 which, when read, results in a certain song automatically being played. In making a symbol 3110 which results in a certain song automatically being played, a selected music file in an appropriate music file format such as .WAV, .MP3 or .MID is attached in area 3610 utilizing interface 3600 as shown in FIG. 7b. A desired song file might have a file name "SONG1.WAV," for example. Folder window 3600a is opened to aid in the selection process. In selection area 3650 a path for the file to be stored on in reconfigurable device 10c is selected. If the input information into path selection area 3650 is "/MUSIC/SONG1.WAV," then the file SONG1.WAV will be stored into the "music" folder of device memory 45 after being decoded by device 10c. In command area 3620 a command such as: PLAYER.EXE / MUSIC/SONG1.WAV" may be input. This command (encoded in symbol 3110 and decoded by reading device 10c) when executed by reading device 10c results in the music file SONG1.WAV stored in the folder "music" being played.

A system facilitating the encoding of song files and other audio files into a bar code symbol such that the audio file is automatically played when symbol 3110 is read has broad practical application. For example, in one application, a symbol 3110 encoded with a music file is placed on promotional advertisement 6102 for a concert as shown in FIG. 13a. By reading symbol 3110, a reader can hear a sample of the music that the performing artist plays in concert. In the example of FIG. 13b, a song playing symbol 3110 is disposed on a book or magazine 6104 describing the work of a musical artist. By reading symbol 3110, a sample of the artist's music is played. In the example of FIG. 13c, a song-playing symbol 3110 is attached to a concert ticket 6106. By reading symbol 3110 a sample of the music or the performing artist to play in concert is played. In the example of FIG. 13*d*, an audio file encoded-symbol is affixed to a campaign promotional ad 6108. By reading symbol 3110, a speech by the candidate is played. In the example of FIG. 13*e*, an audio file encoded symbol is placed on a sell sheet 6110 for a commercial product. Reading symbol 3110 causes a promotional audio message to be played.

Symbol 3110 may be encoded so that a data stream produced by the decoding of symbol 3110 by device 10*c* is given by Table 2A below.

TABLE 2A

| Reference No. | Description | Data Content |
|---|---|---|
| 5010 | Barcode Version | B |
| 5012 | EZConfig Signature | ECFG |
| 5014 | Barcode Flags | BEEP \| DISPLAY |
| 5016 | Id | SONG |
| 5018 | Barcode Index | 1 |
| 5020 | Number of Barcodes | 1 |
| 5022 | Data Version | 1 |
| 5024 | Data Flags | ENCRYPT\| COMPRESS |
| 5026 | Checksum | 0x0003386e |
| 5028 | Command | "PLAYER.EXE/MUSIC/SONG1.WAV" |
| 5030 | File #1 Path | "/MUSIC/SONG1.WAV" |
| 5032 | File #1 Size | 3225 |
| 5034 | File #1 Data | -BINARY CONTENTS OF .WAV FILE |

In certain instances, the audio file desired to be encoded may be too large to be conveniently encoded in a single bar code. In such instances, a multiple symbol reprogramming symbol set may be created. In the alternative, command to transfer a desired song file from a designated location may be encoded. For example, file transfer protocol ("FTP") commands can be used to download an audio file from a remote location, such as a remote website. Use of FTP commands are discussed further in Example 9. In addition, the command "SHELLEXECUTEEX" can be used to play an audio file. "SHELLEXECUTEEX" is a command available on the Pocket PC operating system that results in an appropriate executable program associated with a file extension automatically being executed for processing of a selected file. Examples 4 and 5 discuss use of .BAT files to create reprogramming symbols which encode multiple commands. It will be seen that a .BAT file can be encoded which contains the combination of an FTP command to download a music file from a designated network address and a "SHELLEXECUTEEX" command to automatically play the audio file once it is downloaded. It is also possible to input into area 3620 a command which, when encoded and the decoded, results in an audio file being played which does not require the downloading of a complete audio file into reconfigurable device 10*c*. The command "PLAYER.EXE WWW.MUSIC.COM/MUSIC/SONG1.WAV, input into area 3620 (wherein www.music.com is a website storing music files) will encode a symbol 3110 which, when decoded, results in a music file being played without there being downloaded a complete audio file into reconfigurable device 10*c*. It will be seen that symbol generator 110 can be used to create a symbol 3110 which, when read, results in an image file or a video file automatically being played. The command "PLAYER.EXE WWW.VIDEOFILES.COM/VIDEOS/VIDEO1.MOV" can be input into area 3620 in the making of symbol 3110. When the command "PLAYER.EXE WWW.VIDEOFILES.COM/VIDEOS/VIDEO1.MOV" is executed by reconfigurable device 10*c*, reconfigurable device 10*c* plays the video file "VIDEO1.MOV" located on the video file website "WWW.VIDEOFILES.COM." The video file may be placed on display 13*d* of device 10*c*. The execution of the command IEXPLORE.EXE WWW.PHOTOS.COM/PHOTOS/PHOTO1.JPG by device 10*c* via the reading of symbol 3110 created by inputting that command into area 3620 results in device 10*c* using the Internet Explorer browser to open the image file "PHOTO1.JPG" located on the website WWW.PHOTOS.COM." Video files and image files can also be encoded directly into symbol 3110 (which may be a time varying symbol 3110 TV) as explained with reference to Examples 1 and 2 herein via the encoding of formatted files located on generator 110 using area 3610 of screen 3600. Video files and image files can also be downloaded to device 10*c* using FTP (Example 9).

"SHELLEXECUTEEX" commands may be used to execute numerous types of files (e.g., text, audio, image, video). The command "SHELLEXECUTEEX /MUSIC/SONG1.WAV" in Example 2 might be input into area 3620 instead of 'PLAYER.EXE /MUSIC/SONG1.WAV". This command, when executed by device 10*c* will play the .WAV FILE "SONG1.WAV" Likewise, referring to Example 1, the command "SHELLEXECUTEEX /MESSAGE1.DOC" can be entered into area 3620 to result in the document file "MESSAGE1.DOC" automatically being opened when symbol 3110 is read.

EXAMPLE 3

System 3500 is used to make a symbol 3110 which, when read, results in a browser automatically being opened to a specific web page. In order to make a symbol 3110 which, when read, results in a specific web page automatically being opened, it is not necessary to designate any formatted file for encoding using area 3610. All that is needed to make a browser-opening symbol 3110 is an appropriate command being entered in command 3620. Input into command 3620 may be a command such as: "IEXPLORE.EXE WWW.HHP.COM" as shown in FIG. 7*c*. Execution of the command IEXPLORE.EXE WWW.HHP.COM (after the command is encoded in symbol and then decoded by device 10*c*) results in the web page "WWW.HHP.COM" being opened using the program INTERNET EXPLORER.

Of course, the web page that is opened by device 10*c* in accordance with the command entered in command 3620 may be a command that opens a web page that is stored on device 10*c*. Further, the web page that is stored on device 10*c* may be one previously encoded in symbol 3110. In a variation of the invention, a formatted file that is selected for encoding utilizing file selection area 3610 may be a web page file in e.g., an .HTML format. Other file formats can be used to store web pages including .HTML, .ASP, .DHTML, .VRML, .PDF. A browser can be configured to load nearly any file format, e.g., .GIF, .JPG, .PNG, .PRN, .DIV, .MOV, .WAV, etc.

Symbol 3110 may be encoded so that a data stream produced by the decoding of symbol 3110 by device 10*c* is given by Table 3A below.

TABLE 3A

| Reference No. | Description | Data Content |
|---|---|---|
| 5010 | Barcode Version | 3 |
| 5012 | EZConfig Signature | "ECFG" |

TABLE 3A-continued

| Reference No. | Description | Data Content |
|---|---|---|
| 5014 | Barcode Flags | BEEP | DISPLAY |
| 5016 | Id | WEB |
| 5018 | Barcode Index | 1 |
| 5020 | Number of Barcodes | 1 |
| 5022 | Data Version | 1 |
| 5024 | Data Flags | -NONE- |
| 5026 | Checksum | 0x0000017a |
| 5028 | Command | IEXPLORE.EXE WWW.HHP.COM |

It is noted that because no file is designated in area 3610, the data stream of Example 3 is devoid of file header data 5080 and devoid of encoded file data block 5034.

EXAMPLE 4

System 3500 is used to create a symbol 3110 which when read results in a radio automatically being configured and certain software being downloaded into device 10c. For example, a shipping company might want its proprietary shipping software loaded into device 10c. In making a symbol which is read to automatically configure a radio and download software, a "BATCH FILE" (.BAT) may be selected as the file to encode using selection area. Batch files may be authored to contain a plurality of commands. Other types of script files (e.g., .VB and JS) files can be created which contain a plurality of commands. A batch file stored on symbol generator 4110 may comprise a series of commands such as the series:

TABLE 4A

SAMPLE BATCH FILE

RADIOPOWERUP.EXE/80211B
CFG80211.EXE/SSID MYSSID/DHCP
UPDATE.EXE/P 1557/S/R where "RADIOPOWERUP.EXE /80211B" is a command to power up an 802.11 radio 170 (FIG. 6b) using the executable file "RADIOPOWERUP.EXE" where "CFG80211.EXE /SSID MYSSID /DHCP" is a utility used to configure 802.11 radios and where "UPDATE.EXE /P 1557/S /R" is a command which, when executed by device 10c (after being encoded and decoded), downloads a certain software package (such as a shipping software package) and reboots device 10. The "UPDATE.EXE" command may be substituted for by a file transfer protocol command to transfer a file from a remote location. If the UPDATE.EXE command is deleted, the .BAT file will merely configure a radio.

If the above series of commands is stored in a batch file (.BAT), the file selected as the formatted file to be encoded using file selection area 3610 may be the created batch (.BAT) file. In the example of FIG. 7d, the created batch file is the batch file "GO.BAT" which as indicated by the path data of area 3610 is located in the "EZCONFIG" folder of the "HHP" directory of hard drive 4146. Further, the command entered in command entry area 3620 may be a simple command to execute the batch file. Input into command area 3620 may be the simple command "/GO.BAT" which is executed to execute the Table 4A commands.

Use of a script file to encode a series of commands provides a convenient method for encoding a plurality of commands using a development screen 3600 having a single command input area 3620. The same result could be achieved by configuring screen 3600 to have multiple command input areas 3620. Creating a symbol 3110 which, when read, results in a radio automatically being configured greatly simplifies the configuration process in the case a fleet of devices 10c have to be reprogrammed. Symbol 3110 may be encoded so that a data stream produced by the decoding of symbol 3110 by device is given by Table 4B below.

TABLE 4B

| Reference No. | Description | Data Content |
|---|---|---|
| 5010 | Barcode Version | 2 |
| 5012 | EZConfig Signature | "ECFG" |
| 5014 | Barcode Flags | Beep |
| 5016 | Id | 1 |
| 5018 | Barcode Index | 1 |
| 5020 | Number of Barcodes | 1 |
| 5022 | Data Version | 2 |
| 5024 | Data Flags | COMPRESS |HIDE BATCH |
| 5026 | Checksum | 0xF71E0000 |
| 5028 | Command | "/GO.BAT" |
| 5030 | File #1 Path | "/GO.BAT" |
| 5032 | File #1 Size | 84 |
| 5034 | File #1 Data | "RADIOPOWERUP.EXE/80211B CFG80211.EXE/SSID MYSSID /DHCP UPDATE.EXE/P 15577/S/R" |

EXAMPLE 5

System 3500 may be used to make a symbol 3110 which is affixed on or in proximity with a printer 4090 and which, when read by device 10c, results in device 10c being automatically configured to communicate with printer 4090 such that printer 4090 can be operated by device 10c. In use, portable device 10c may be carried from location to location in a given scanning environment. It would be convenient to provide a scanning environment in which portable device 10c would be able to print a report (or receipt or a document) to print at any printer of a scanning environment, even if the printer is newly added. In performing a data collection task, device 10c may generate a document (a report, a receipt), which would be useful to print. As indicated by the schematic diagram of FIG. 6a, a new printer 3110 may be added in a scanning environment that is not in communication with the network comprising devices 10, and PC 4110.

In making a symbol 3110 facilitating a print application, a batch file (.BAT) can be stored on memory 4145 of symbol generator 4110 including a plurality of commands. Such a plurality of commands may include the commands:

TABLE 5A

SAMPLE BATCH FILE
RADIOPOWERUP.EXE/BLUETOOTH
CFGBLUETOOTH.EXE/PRINTER 00.002.72.B0.20.D9 COM8
PRINTREPORT.EXE COM8

Where "RADIOPOWERUP.EXE /BLUETOOTH" is a command which, when executed by device 10c, causes Bluetooth radio 172 of device 10c (see FIG. 6b) to be powered up (another radio such as radio 170 could be selected); where "CFGBLUETOOTH.EXE /PRINTER 00.002.72.B0.20.D9 COM8" is a command which causes Bluetooth radio 172 to be configured, and where "PRINTREPORT.EXE COM8" is a command which causes printing of a document selected for printing. Referring to the command "CFGBLUETOOTH.EXE /PRINTER 00.0002.72.B0.20.D9COM8, the argument "00.002.72.b0.20.D9" designates the printer address. The command "PRINTREPORT.EXE COM8" is a command to print a report using communication port COM8. Based on the configuration performed by the previously executed "CFGBLUETOOTH.EXE" command, all COM8 print commands will be routed to printer 4090. The document which is selected for printing may be selected before driving device 10c into a reconfiguration mode in accordance with the invention. Symbol 3110 in Example 5 can be made so that a selected report is printed automatically when symbol 3110 is read. The commands of Table 5A can be stored under a batch file "PRINTERCONNECT.BAT."

Referring to inputs input by a user into interface 3600, after file "PRINTERCONNECT.BAT" is authored and stored in symbol generator memory 4145, the batch file "PRINTERCONNECT.BAT" can be selected using area 3610 as a file to encode into symbol 3110. Further, the command "/PRINTERCONNECT.BAT" is selected as the command for execution using command entry area 3620 of interface 3600.

When generate button 3660 is actuated, a symbol 3110 is encoded. If symbol 3110 is then printed on a sticker, the sticker can be affixed to new printer 4090 as shown in FIG. 6a. When device 10c, after having been driven into a configuration mode reads symbol 3110 it is configured to be in communication with printer 4090 and automatically initiates a command to print a selected report-using printer 4090. It will be seen that the method described in Example 5 can be applied to associate other hardware to be associated with the devices of system 3500, e.g., projectors, monitors and communications hardware such as radios. A reprogramming symbol 3110 disposed on a rental car would configure a mobile device to communicate with an onboard computer to configure the car with such things as the driver's radio preferences, or the seat position. Scanning a reprogramming symbol 3110 disposed on a home appliance would allow a user to configure the appliance using a user interface on the mobile device (i.e., program the VCR, the A/C settings, etc.).

Symbol 3110 may be encoded so that a data stream produced by the decoding of symbol 3110 by device 10c is given by Table 5B below.

TABLE 5B

| Reference No. | Description | Data Content |
| --- | --- | --- |
| 5010 | Barcode Version | 2 |
| 5012 | EZ Config Signature | "ECFG" |
| 5014 | Barcode Flags | Beep |
| 5016 | Id | 1 |
| 5018 | Barcode Index | 1 |
| 5020 | Number of Barcodes | 1 |
| 5022 | Data Version | 2 |
| 5024 | Data Flags | COMPRESS| HIDE BATCH |
| 5026 | Checksum | 0x000025AD |
| 5028 | Command | "/PRINTERCONNECT.BAT" |
| 5030 | File #1 Path | "/PRINTERCONNECT.BAT" |
| 5032 | File #1 Size | 99 |
| 5034 | File #1 Data | "RADIOPOWERUP.EXE /BLUETOOTH CFGBLUETOOTH.EXE /PRINTER 00.02.72.B0.20.D9 COM8 PRINTREPORT.EXE COM8" |

TABLE 5B-continued

| Reference No. | Description | Data Content |
| --- | --- | --- |

EXAMPLE 6

System 3500 is used to make a symbol 3110 which when read by device 10c automatically installs a digital certificate onto device 10c.

Digital certificates often provide a greater level of security than passwords, but are impractical to manually enter. In Example 6, a reprogramming symbol 3110 is created which encodes a digital certificate. When bar code symbol 3110 is read, the certificate is installed on the device 10c. Digital certificates can be used to restrict access to certain files, including program (executable) files of portable device 10c. Firmware of device 10c can be established so that certain files cannot be opened, executed or otherwise accessed unless a certain digital certificate is installed on device 10c.

In making a symbol which when read results in a digital certificate being installed on portable device 10c, a digital certificate file stored in a memory 4145 of symbol generator 4410 is selected for encoding along with an appropriate command. A .CAB file is a single file created to hold a number of files. Digital certificates are conveniently stored as .CAB files. Digital certificates are also conveniently stored as .CER or .CRT files. Accordingly, using file selection area 3110 an appropriate digital certificate may be selected for encoding by selecting an appropriate .CAB file. In the example given, the selected .CAB file is the file "CERTIFICATE.CAB." In the path selection area 3650 of screen 3600 "/IPSM/CERTIFICATE.CAB" is entered to designate that the selected .CAB file, (after being encoded and then decoded by device 10c) is stored in the IPSM folder of device 10c. In command entry area 3620 the command "WCELOAD.EXE /IPSM/CERTIFICATE.CAB" is entered. When executed by device 10c, the command entered at area 3620 causes the selected "CERTIFIED.CAB" file to be installed using the installation utility WCELOAD.EXE.

Symbol 3110 may be encoded so that a data stream produced by the decoding of symbol 3110 by device 10c is given by Table 6A below.

TABLE 6A

| Reference No. | Description | Data Content |
| --- | --- | --- |
| 5010 | Barcode Version | 2 |
| 5012 | EZConfig Signature | "ECFG" |
| 5014 | Barcode Flags | Beep| Display |
| 5016 | Id | 1 |
| 5018 | Barcode Index | 1 |
| 5020 | Number of Barcodes | 1 |
| 5022 | Data Version | 2 |
| 5024 | Data Flags | COMPRESS| ENCRYPT| HIDE BATCH |
| 5026 | Checksum | 0x00003386E |
| 5028 | Command | "WCELOAD.EXE/IPSM/CERTIFICATE.CAB" |
| 5030 | File #1 Path | "/IPSM/CERTIFICATE.CAB" |
| 5032 | File #1 Size | 1670 |
| 5034 | File #1 Data | -BINARY CONTENTS OF CERTIFICATE.CAB |

EXAMPLE 7

System 3500 is used to make a symbol which, when read, results in a product being registered with a manufacturer. In order to make a symbol 3110, which when read, results in a product being registered with a manufacturer, two files stored on symbol generator 4110 are selected for encoding, as shown in the screenshot of FIG. 7g. The two files are "FORM.HTM" and "PRODUCT.XML." FORM.HTM is an .HTM file which presents a user information input screen (a data input screen which facilitates entry of data such as purchaser name, address, phone number, and email, and other information typically associated with registering a product). PRODUCT.XML is an .XML formatted file which stores information about the product being purchased (the product model information and other information). The user registration form 3700 (FIG. 14) generated by the file FORM.HTM also contains a submit button 3722. The to-be-encoded FORM.HTM file is configured so that when the submit button 3722 (FIG. 14) is clicked on, the user input information along with the product information of the PRODUCT.XML file is automatically sent to a manufacturer.

Referring to the development screen shown in FIG. 7g, the files FORM.HTM and PRODUCT.XML are selected using file selection area 3610. No path is selected in area 3650. Thus, decoded data corresponding to the selected filed will be stored to the root directory of device 10c. In command entry area 3620, the command "IEXPLORE.EXE /FORM.HTM" is entered. The command IEXPLORE.EXE /FORM.HTM, when executed by device 10c after being decoded, will result in the FORM.HTM file being opened using the browser application program IEXPLORE.EXE.

Figure 14:
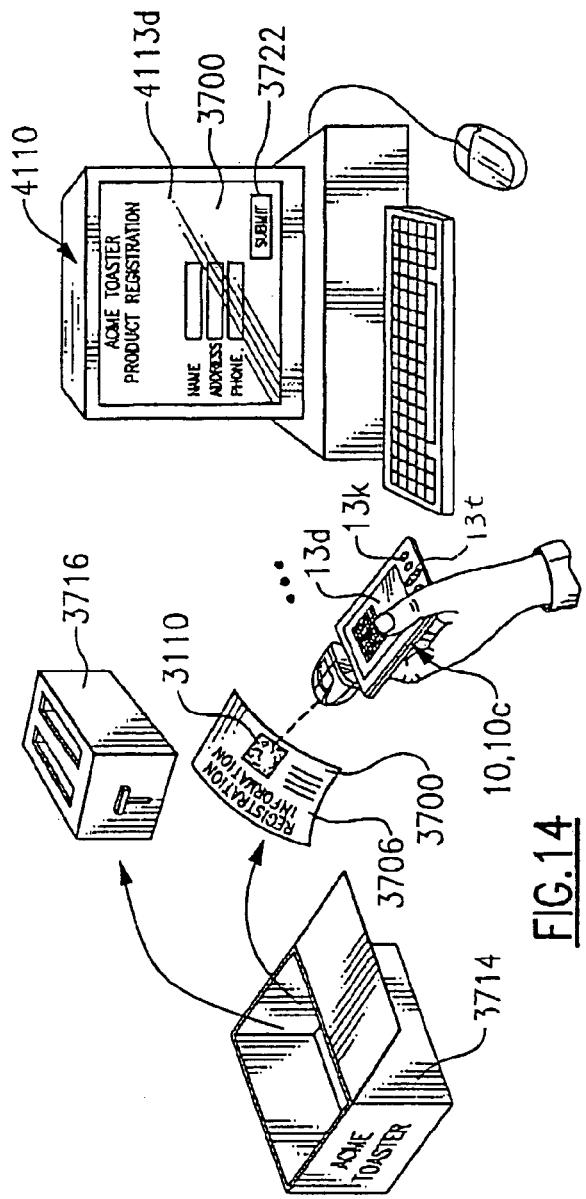
FIG. 14 illustrates an implementation of the invention in which a reprogramming symbol is encoded to facilitate product registration.

Generate button 3600 is clicked on and a programming symbol 3110 is encoded. The encoded symbol may be printed. The encoded symbol 3110 may be printed on a paper substrate 3700 including product literature 3706 (FIG. 14). The product literature including symbol 3110 may be packaged in a package 3714 including a consumer product 3716 (e.g., a toaster as shown in FIG. 14). When a purchaser of a consumer product finds the paper including product registration symbol 3110, he reads the symbol 3110 using a bar code reader such as device 10c as shown in FIG. 14. When product registration symbol 3110 is read, a product registration form 3720 is automatically displayed on the display 4113d of PC 4110 in communication with device 10c or a display 13d of the reading device used to read the symbol 3110. The user fills out the form, clicks on submit button 3722 of the form 3700 and both user and product information are sent to the manufacturer's web server. System 3500 can be made so that reconfigurable device 10c displays form 3700 on display 13d of device 10c. Also, system 3500 can be made to display form 3700 on a PC 4110 in network communication with device 10c as is illustrated in FIG. 14. In order to configure PC 4110 to display form 3700, a program module may be incorporated in PC 4110 which causes PC 4110 to listen for a command broadcast by device 10c to open file "FORM.HTM" stored on device 10c utilizing a suitable browser application.

Data stream data generated by decoding of a symbol generated according to Example 7 is presented herein below in Table 7A.

TABLE 7A

| Reference No. | Description | Data Content |
|---|---|---|
| 5010 | Barcode Version | 2 |
| 5012 | EZConfig Signature | "ECFG" |
| 5014 | Barcode Flags | Beep |
| 5016 | Id | 1 |
| 5018 | Barcode Index | 1 |
| 5020 | Number of Barcodes | 1 |
| 5022 | Data Version | 2 |
| 5024 | Data Flags | COMPRESS | CYCLE |
| 5026 | Checksum | 0x00273F6E |
| 5028 | Command | "IEXPLORE.EXE/FORM.HTM" |
| 5030 | File #1 Path | "/FORM.HTM" |
| 5032 | File #1 Size | 1872 |
| 5034 | File #1 Data | -CONTENTS OF FORM.HTM- |
| 5030 | File #2 Path | "/PRODUCT.XML" |
| 5032 | File #2 Size | 272 |
| 5034 | File #2 Data | -CONTENTS OF PRODUCT.XML- |

EXAMPLE 8

System 3500 is used to generate a series of symbols 3110a, 3110b, 3110c, 3110d, 3110e, and 3110f which, when read, result in an executable (.EXE) application file being stored onto reconfigurable device 10c. Executable (.EXE) files may be too large to be encoded in a single bar code. In many cases, however, an application file may be stored on a single bar code symbol. AZTEC symbols are useful in that they can be readily made of any size. Thus, larger files can readily be encoded by increasing the symbol size. In order to make a set of symbols 3100 which when read results in an application file being stored in device 10c, the file APPLICATION.EXE is selected for encoding using area 3610. The path data "/IPSM/APPLICATION.EXE" is entered in area 3650 so the application file will be stored into the IPSM directory of device 10c. In area 3672 the number of symbols to be created in order to encode the file selected is specified. In the example given, a six symbol reprogramming symbol set is selected.

Figure 15:
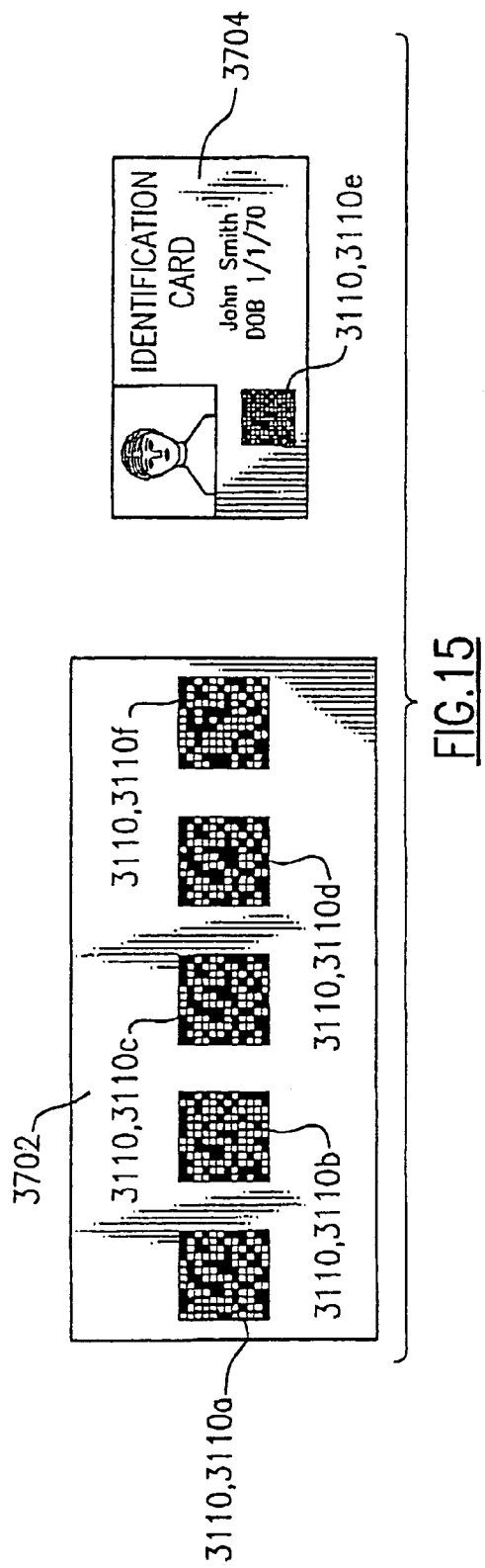
FIG. 15 illustrates an implementation of the invention in which symbols of a reprogramming symbol set are disposed on different substrates.

When generate button 3660 is clicked, a six symbol reprogramming symbol set 3110 is encoded. The six symbol reprogramming symbol set 3110a, 3110b, 3110c, 3110d, 3110e, and 3110f as shown in FIG. 15 may be printed using a printer. One of the symbols, e.g., symbol 3110a or 3110e as shown in FIG. 15 may be considered a "key" symbol. A key symbol may be printed on a different substrate 3704 than the remaining symbols printed on substrate 3702. Distribution of the substrate containing the "key" symbol 3110e may be controlled so that a user cannot store a controlled formatted file to device 10c unless he possesses the substrate including the "key" symbol 3110. The "key" symbol 3110e may be printed on an identification card, a coupon, an entertainment event ticket, for example. Whereas substrate 3702 may be made generally available (e.g., posted on a website), access to substrate 3704 may be controlled. For example, substrate 3704 including symbol 3110e may be postal carrier-mailed only to select users.

Data stream processing program module 5110 of reconfigurable device 10C executes certain additional steps when processing data generated by decoding a multiple reprogramming symbol set. Data stream processing module 5110 reads fields 5018, 5020 to determine which order to assemble the various data streams corresponding each of the several data streams. Because device 10c operating in accordance with module 5110 reads field 5020 to determine the number of symbols in a symbol set and field 5018 to determine the symbol number of the present data steam, it is seen that the various symbol of a symbol set can be read in any order. Further, reconfigurable device 10*c* operating in accordance with module 5110 may be made to display feedback messages on display 13*d* if certain symbols of reprogramming symbol set is not read. For example, device 10*c* can be made to display the message "SYMBOL 5 of 6 NOT READ YET" if the reprogramming symbol set includes six symbols and symbol 5 is not yet read. In a further aspect of module 5110 in its processing of data streams of a multiple symbol reprogramming symbol set, module 5110 strips off symbol header 5080 when piecing together file data of consecutive symbols in a reprogramming step. For example, in a two symbol reprogramming symbol set which encodes file data of a single file, a first symbol 3110*a* may encode bar code symbol header 5080, file data header 5090, and block 5034 corresponding to a first part of file data. A second symbol of that symbol set, meanwhile, may encode bar code header 5080 and a second part of the file data but no data header 5090 and no file header 5092. In processing data streams generated by decoding the symbols, module 5110 discards bar code header 5080 of both symbols before attaching the file data of the second symbol to the file data of the first symbol.

While multiple symbols can be printed on a paper, plastic or another substrate, it is also convenient to non-permanently generate symbols of reprogramming symbol set by projecting or displaying the symbols on a display such as a display of a PC 4110 or a portable device 10*c*. All of the symbols of a multiple symbol reprogramming symbol set can be displayed on display 4113*d*. All of the symbols further can be displayed at a common position such as position 6004 described in connection with FIG. 12*b* of a display e.g., display 4113*d*. It will be seen, therefore, that device 10*c* does not have to be moved to read several symbols of a reprogramming symbol set. Device 10*c* can be "docked" on a stand 6002 in a fixed position relative to a display 4113*d* and oriented to read bar code data or other symbol data at a certain position of display as described with reference to FIGS. 12*b*-12*d*. Display 4113*d* meanwhile can be made to successively display at certain position 6004 each of several symbols of a reprogramming symbol set so that a large amount of data (which may include formatted application file data) is rapidly stored into device 10*c* without moving device 10*c* without physically connecting device 10*c* to any other device, and without configuring any radio or other standard communication port of device. A series of symbols non-permanently and successively produced at a fixed location is herein referred to as "a time-varying symbol." A time varying symbol 3110TV is displayed on interface 3600 in the example of FIG. 7*h*. Time varying symbol 3110TV comprises the series of symbols 3110*a*, 3110*b*, 3110*c*, 3110*d*, and 3110*e* consecutively displayed.

Data stream data generated by decoding the symbols of the symbol set produced according to Example 8 is presented in Table 8A herein below:

TABLE 8A

| Reference No. | Description | Data Content |
|---|---|---|
| | Barcode 1 of 6: | |
| 5010 | Barcode Version | 2 |
| 5012 | EZConfig Signature | "ECFG" |

TABLE 8A-continued

| Reference No. | Description | Data Content |
|---|---|---|
| 5014 | Barcode Flags | Beep |
| 5016 | Id | 1 |
| 5018 | Barcode Index | 1 |
| 5020 | Number of Barcodes | 6 |
| 5022 | Data Version | 2 |
| 5024 | Data Flags | COMPRESS |
| 5026 | Checksum | 0x0511822 |
| 5028 | Command | "" |
| 5030 | File #1 Path | "/IPSM/APPLICATION.EXE" |
| 5032 | File #1 Size | 13129 |
| 5034 | File #1 Data | -FIRST PORTION OF APPLICATION.EXE- |
| | Barcode 2 of 6: | |
| 5010 | Barcode Version | 2 |
| 5012 | EZConfig Signature | "ECFG" |
| 5014 | Barcode Flags | Beep |
| 5016 | Id | 1 |
| 5018 | Barcode Index | 2 |
| 5020 | Number of Barcodes | 6 |
| 5034 | File #1 Data | -SECOND PORTION OF APPLICATION.EXE- |
| | Barcode 6 of 6: | |
| 5010 | Barcode Version | 2 |
| 5012 | EZConfig Signature | "ECFG" |
| 5014 | Barcode Flags | Beep |
| 5016 | Id | 1 |
| 5018 | Barcode Index | 6 |
| 5020 | Number of Barcodes | 6 |
| 5034 | File #1 Data | -FINAL PORTION OF APPLICATION.EXE- |

Each of the six symbols include a barcode header 5080. However, only first symbol 3110*a* includes data header 5090, and file header 5092. All of the symbols are devoid of encoded command data field 5028. Interface 3600 in Example 8 includes a displayed time-varying symbol 3100TV

EXAMPLE 9

A symbol 3110 is made which when read by device 10*c* results in a formatted file being downloaded from a nonintegrated computer device which remote computer (e.g., driver 4052, FIG. 6*a*) may be a using File Transfer Protocol (FTP). In order to make a symbol 3110 which when read results in a file being downloaded into device 10*c* using FTP, there is no need to encode any formatted file data into symbol 3110. Therefore, no selection need be made in area 3610 of screen 3600. In area 3620, a user inputs a command for encoding into symbol 3110. Referring to screenshot FIG. 7*i*, the command "TFTP.EXE FTP.HHP.COM/UTILS/UTILS.CAB/IPSM/AUTOINSTALL" is entered in area 3620. Decoding of and execution of the above command by reconfigurable device 10*c* causes reconfigurable device 10*c* to install the formatted file UTILS.CAB on device 10*c* in directory "/IPSM/AUTOINSTALL" using FTP. Interface 3600 in the example of FIG. 7*i* includes a displayed time-varying reprogramming symbol 3110TV. In the specific example, the TFTP.EXE utility (Trivial File Transfer Protocol) is used to download the .CAB file UTILS.CAB to the "IPSM/AUTOINSTALL" directory of device 10*c* from the "/UTILS" directory of the FTP server FTP.HHP.COM. Formatted files can also, in accordance with the invention, be downloaded from remote (possibly Internet) directories using Hyper Transfer (HTTP) (see Example 2) or another appropriate protocol in the Transmission Control Protocol/internet Protocol (TCP/IP) suite of protocol (e.g., FTP, HTTP, TELNET, SMTP, SLIP, PPP). Skilled artisans will recognize that protocols in the TCP/IP suite can be utilized to download files to portable device 10c from a nonintegrated device that is a common LAN with device 10c (e.g., PC 4110, FIG. 6a), or a device in communication with device 10c via an Intranet or the Internet.

Data stream data generated by decoding a symbol made in accordance with Example 9 is presented in Table 9A:

TABLE 9A

| Reference No. | Description | Data Content |
| --- | --- | --- |
| 5010 | Barcode Version | 2 |
| 5012 | EZConfig Signature | "ECFG" |
| 5014 | Barcode Flags | Beep |
| 5016 | Id | 1 |
| 5018 | Barcode Index | 1 |
| 5020 | Number Barcodes | 1 |
| 5022 | Data Version | 2 |
| 5024 | Data Flags | -none- |
| 5026 | Checksum | 0x00001F27 |
| 5028 | Command | "TFTP.EXE FTP.HHP.COM/UTILS/ UTILS.CAB/IPSM/ AUTOINSTALL" |

EXAMPLE 10

Symbol 3110 is made which when read by device 10c results in a Windows Registry File (.REG file format) being installed on reconfigurable device 10c. In making a symbol 3110 which, when read, results in a .REG file being installed in device 10c, a user may input into area 3020 in the screenshot example of FIG. 7j the command "REGCE.EXE /IPSM/AUTOINSTALL/CONFIG.REG" Execution of the above command by reconfigurable device 10c results in the REG file CONFIG.REG being installed on device 10c using the utility "REGCE.EXE." In Example 10, file data corresponding to file "REGCE.EXE is encoded into symbol 3110. To the end that file data is encoded into symbol 3110, the file "CONFIG.REG" in directory "C:\HHP\EZCONFIG\" is selected using file selection area 3110. For the path "C:\ HHP\EZCONFIG\" to be selected, the designated file "\CONFIG.REG" must first be stored onto symbol generator 110. Symbol generator 110 can be configured so that a path other than a path of symbol generator 110 can be designated using area 3610. Symbol generator 110 can be configured so that a path designating a local area network directory or Internet directory can be designated. The WINDOWS registry represents a common area to save configuration information for any WINDOWS program. .REG files can be used to change such configuration information (which may include such information as key repeat delays, user preferences, and other behavioral settings). It is useful to create a symbol 3110 which may be used to configure each of several devices similarly.

Data stream data generated by decoding a symbol 3600 made in accordance with Example 9 is presented in Table 10A:

TABLE 10A

| Reference No. | Description | Data Content |
| --- | --- | --- |
| 5010 | Barcode Version | 2 |
| 5012 | EZConfig Signature | "ECFG" |
| 5014 | Barcode Flags | Beep |
| 5016 | Id | 1 |

TABLE 10A-continued

| Reference No. | Description | Data Content |
| --- | --- | --- |
| 5018 | Barcode Index | 1 |
| 5020 | Number of Barcodes | 1 |
| 5022 | Data Version | 2 |
| 5024 | Data Flags | -COMPRESS-- |
| 5026 | Checksum | 0x000003DC |
| 5028 | Command | "REGCE.EXE/ IPSM/AUTOINSTALL/ CONFIG.REG" |
| 5030 | File #1 Path | "/IPSM/AUTOINSTALL/ CONFIG.REG" |
| 5032 | File #1 Size | 877 |
| 5034 | File #1 Data | "-BINARY CONTENTS OF REGCE.EXE-" |

A number of possible apparatuses, methods and systems are described herein, including:

(A) A system for reprogramming a mobile optical reader, said system comprising: a symbol generator generating at least one reprogramming symbol, said reprogramming symbol generator including a user interface utilized to select information to encode in said symbol; a reconfigurable device reading said at least one reprogramming symbol to produce a data stream corresponding to said at least one reprogramming symbol, said reconfigurable device including a program processing said reprogramming symbol data stream, wherein said data stream encodes formatted file data, and wherein said program decodes said formatted file data and stores said formatted file data into a memory of said reconfigurable device. There is also described (B) The system of (A), wherein said data stream further encodes a command encoding a command to execute an executable program. There is also described (C) The system of (A), wherein said user interface is a graphical user interface (GUI).

There is also described herein: (D) A system for reprogramming a mobile optical reader, said system comprising: a symbol generator generating at least one reprogramming symbol, said reprogramming symbol generator including a user interface utilized to select information to encode in said symbol; a reconfigurable device reading said at least one reprogramming symbol to produce a data stream corresponding to said at least one reprogramming symbol, said reconfigurable device including a program processing said reprogramming symbol data stream, wherein said data stream encodes a command to execute an executable program.

There is also described herein: (E) A system for reprogramming a mobile optical reader, said system comprising: a symbol generator generating at least one reprogramming symbol, said reprogramming symbol generator including a user interface utilized to select information to encode in said symbol; a reconfigurable device reading said symbol to produce a data stream corresponding to said reprogramming symbol, said reconfigurable device including a program processing said reprogramming symbol data stream, wherein said user interface allowed a user to select a formatted file stored on said symbol generator for encoding into said reprogramming symbol. (F) The system of (E), wherein said user interface further allows a user to input a command for causing execution of an executable program stored on said reconfigurable device.

There is also described herein: (G) A system for programming a portable device, said system comprising: a symbol generator encoding a formatted file on at least one symbol;

an optical reader incorporated in said portable device wherein said portable device actuates said reader to decode said at least one symbol to generate a data stream, and process said data stream to store said formatted file in a memory of said portable device. (H) The system of (G), wherein said symbol generator includes a user interface, allowing a user to select a formatted file to encode. (I) The system of (G), wherein said symbol generator further encodes path data determining a path in a memory of said portable device in which to store a formatted file. (J) The system of (G), wherein said formatted file data is a text file. (K) The system of claim (G), wherein said, formatted file is an audio file. (L) The system of (G), wherein said formatted file is an .XML file.

There is also described herein: (M) A symbol generator including: a graphical user interface including a first data input area facilitating entry of formatted file data, and a second data input area facilitating entry of command data; an encoder encoding into at least one symbol a formatted file in accordance with said input formatted file data, and a command in accordance with said input command data. (N) The generator of (M), wherein said graphical user interface further includes a data input area facilitating input of path data involving a storage location for storing a formatted file onto a portable device. (O) The generator of (M), wherein said generator automatically changes a number of symbols to encode depending. (P) The generator of (M), wherein said graphical user interface includes a data input area allowing a user to indicate a number of symbols to be encoded. (Q) The generator of (M), wherein said graphical user interface further includes a data entry area facilitating entry of data indicating whether encoded symbol data is to be compressed. (R)

The generator of (M), wherein said graphical user interface further includes a data entry area facilitating entry of data indicating whether encoded symbol data is to be encrypted prior to being encoded into a symbol.

There is also described herein: (S) A portable device comprising: a memory; a reading unit decoding a symbol to generate a data stream; a control circuit executing a data stream processing program processing said data stream, wherein said control circuit when executing said data stream processing program locates formatted file data in said data stream, and stores said formatted file data into said memory. (T) The portable device of (S), wherein said formatted file data is .XML formatted file data. (U) The portable device of(S), comprising a display and keyboard, wherein said control circuit in one mode of operation utilizes at least one of OS Free or single-threaded commands to display a broadcast option menu interface. (V) The portable device, of (S), wherein said formatted file data is audio file data selected from the group consisting of .WAV, .MP3, and .MID. (W) The portable device of (S), wherein said formatted file data is web page formatted file data selected from the group consisting of .HTML, .ASP, .DHTML, AND .VRML formatted file data.

There is also described herein: (X) A portable device comprising: a memory; a reading unit decoding a symbol to generate a data stream; a control circuit executing a data stream processing program processing said data stream, wherein said control circuit when executing said data stream processing program locates path data in said data stream, and stores formatted file data into said memory in accordance with said path data.

There is also described herein: (Y) A portable device comprising: a memory; a reading unit decoding a symbol to generate a data stream; a control circuit executing a data stream processing program processing said data stream, wherein said control circuit when executing said data stream processing program locates command data in said data stream, and executes a command in accordance with said command data. (Z) The portable device of (Y), wherein said command is a command to store a digital certificate on said memory. (AA) The portable device of (Y), wherein said command is a command to automatically execute an audio player executable file. (BB) The portable device of (Y), comprising a display and keyboard, wherein said control circuit in one mode of operation utilizes at least one of OS free or single-threaded commands to display on said display at least one of a broadcast option menu interface, and a receive option menu interface. (CC) The portable device of (AA), wherein said command is a command to execute a word processing program executable file. (DD) The portable device of (AA), wherein said command is a File Transfer Protocol (FTP) command. (EE) The portable device of (AA), wherein said command is a command to configure a radio. (FF) The portable device of (AA), wherein said command is a command to configure a printer. (GG) The portable device of (Y), wherein said command is part of a batch file. (HH) The portable device of (Y), wherein said portable device operates in a reprogramming mode in which OS free commands are utilized for control of a communication link.

There is also described herein: (II) A method for inputting data into a device which reads bar codes, said method comprising: successively generating a plurality of bar codes at a fixed position; orienting a bar code reading device to read indicia at said fixed position; and operating said device to continuously read bar codes, so that said device reads each of said plurality of successively generated bar codes. (JJ) The method of (II), wherein said operating step includes the step of holding down a trigger. (KK) The method of (II), wherein said operating step includes the step of repetitively actuating a trigger. (LL) The method of (II), further including the step of placing said reader on a stand. (MM) The method of (II), wherein said successively generated bar codes are electronically displayed on a display. (NN) The method of (II), wherein said successively generated bar codes are projected.

There is also described herein: (OO) A bar code data reading system comprising: a display operated to successively display a plurality of bar codes at a fixed position on said display and at least one reader oriented at a location so that said reader can read bar codes at said fixed position, wherein said reader is operated to continuously read bar codes at said fixed position. (PP) The system of (OO), wherein said at least one reader is a plurality of readers, each being oriented at said fixed position. (QQ) The system of (OO), wherein said at least one reader is configured to operate in a continuous scan mode, and is operated in said continuous scan mode. (RR) The system of (OO), wherein said at least one reader is operated to continuously read bar codes at said fixed position by holding down a trigger. (SS) The system of (OO), wherein said at least one reader is operated to continuously read bar codes at said fixed position by repetitively actuating a trigger. (TT) The system of (OO), wherein said system includes a stand holding said reader.

There is also described herein: (UU) A symbol generator including: a prompting user interface including a first data input area and a second data input area, said first data input area receiving information pertaining to a formatted file to encode, said second data input area receiving information pertaining to a number of bar codes to encode; wherein said symbol generator encodes formatted file data in accordance with information input into said first data input area and encodes a number of bar codes in accordance with information input into said second data input area. (VV) The symbol generator of (UU), wherein said user interface includes a feedback information area indicating a number of bytes of data into a to-be-encoded bar code. (WW) The symbol generator of (UU), wherein said user interface is a GUI. (XX) The symbol generator of (UU), wherein said user interface includes a third data input area receiving data corresponding to a desired number of bytes of a to-be-encoded bar code. (YY) The symbol generator of (UU), wherein formatted file designation input into said first data input area is a designation corresponding to an .EXE file.

There is also described herein: (ZZ) A symbol generator comprising: a user interface allowing a user to input information respecting data to encode; an encoder encoding a set of bar codes in accordance with aid input information; wherein said encoder, in encoding said bar code symbol set encodes in each symbol of said set a field indicating a total number of symbols of said set and a filed indicating the number in said set of said present field. (AAA) The symbol generator of (ZZ), wherein said user interface allows a user to designated a formatted file to encode. (BBB) The symbol generator of (ZZ), wherein said user interface allows a user to designate a number of symbols to encode.

There is also described herein: (CCC) A system initiating a communication, said system comprising: a network; a bar code reading portable device having a radio; a bar code symbol encoding information instructing a configuration of said radio; wherein said portable device is operated to read said bar code symbol so that said radio is configured to communicate with said network.

There is also described herein: (DDD) A system comprising: a printer having an associated first radio; a bar code reading portable device having a second radio; a bar code symbol encoding a command; wherein said portable device is configured, and said command is authored so that when said portable device reads said symbol, said portable device is configured to be in communication with said printer.

(EEE) The system of (DDD), wherein said bar code symbol is disposed on said printer. (FFF) The system of (DDD), wherein said portable device includes a motherboard and a radio circuit board, and an interconnection assembly connecting said motherboard and said radio circuit board, said interconnection assembly including a pair of snap fitting board connectors, and a connector sleeve disposed about said board connectors to oppose shear forces relative to said board connectors.

There is also described herein: (GGG) A reprogramming system comprising: a bar code reading portable device; a nonintegrated computer device in communication with said portable device; at least one reprogramming symbol encoding a command to download into said portable device a formatted file located on said nonintegrated computer device; a data stream processing a module incorporated in said portable device; wherein said portable device is operable to read said at least one reprogramming symbol and in accordance with said data stream processing module, execute said command encoded in said bar code symbol to download formatted file data from said nonintegrated computer device. (HHH) The system of (GGG), wherein said command is an OS understandable command. (III) The system of (GGG), wherein said command utilizes file transfer protocol. (JJJ) The system of (GGG), wherein said command utilizes a command of the TCP/IP protocol suite. (KKK) The system of (GGG), wherein said portable device and said nonintegrated computer device are part of a common LAN. (LLL) The system of (GGG), wherein said nonintegrated computer device is a device remote relative to said portable device. (MMM) The system of (GGG), wherein said portable device and said nonintegrated computer device are in communication via the Internet.

(NNN) The system of (GGG), wherein said portable device and said nonintegrated computer device are in communication via an Intranet.

(OOO) The system of (GGG), wherein said nonintegrated computer device is a personal computer. (PPP) The system of (GGG), wherein said portable device includes a connector sleeve aiding a connection between a motherboard and a radio circuit board therein.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A symbol generator including:
a graphical user interface including a first data input area facilitating entry of a designator for a formatted file, and a second data input area facilitating entry of command data;
an encoder encoding into at least one symbol a formatted file in accordance with said designator, encoding into said at least one symbol a command in accordance with said input command data.

2. The generator of claim 1, wherein said graphical user interface further includes a data input area facilitating input of path data designating a storage location for storing a formatted file onto a portable device.

3. The generator of claim 1, wherein said generator automatically changes a number of symbols to encode depending on a size of a file selected for encoding.

4. The generator of claim 1, wherein said graphical user interface includes a data input area allowing a user to indicate a number of symbols to be encoded.

5. The generator of claim 1, wherein said graphical user interface further includes a data input area facilitating entry of data indicating whether encoded symbol data is to be compressed.

6. The generator of claim 1, wherein said graphical user interface further includes a data entry area facilitating entry of data indicating whether encoded symbol data is to be encrypted prior to being encoded into a symbol.

7. The symbol generator of claim 1, wherein said graphical user interface is displayed on a display of a portable reconfigurable device that is configured to read and process symbols of the type that are generated by said symbol generator.

8. The symbol generator of claim 7, wherein said portable reconfigurable device displaying said graphical user interface includes a mode of operation in which said portable reconfigurable device utilizes one of OS free or single-threaded commands to display on said display at least one of a broadcast menu interface, and a receive menu interface.

9. The symbol generator of claim 7, wherein said portable reconfigurable device displaying said graphical user interface includes a motherboard and a radio circuit board, and an interconnection assembly connecting said motherboard and said radio circuit board, said interconnection assembly including a pair of snap fitting board connectors, and a connector sleeve disposed about said board connectors to oppose shear forces relative to said board connectors.

10. The symbol generator of claim 9, wherein said portable reconfigurable device displaying said graphical user interface includes a motherboard and a radio circuit board, and an interconnection assembly connecting said motherboard and said radio circuit board, said interconnection assembly including a pair of snap fitting board connectors, and a connector sleeve disposed about said board connectors to oppose shear forces relative to said board connectors.

11. The symbol generator of claim 7, wherein a software module driving said graphical user interface and said encoder are incorporated in a common computer.

12. The symbol generator of claim 1, wherein said symbol generator is configured so that there can be designated in said first data input area a designator for a directory stored formatted file.

13. The symbol generator of claim 1, wherein said symbol generator is configured so that said first data input area and said second data input area are displayed in different boxes.

14. A symbol generator including:
a prompting user interface including a first data input area and a second data input area, said first data input area receiving from a user information pertaining to a formatted file to encode, said second data input area receiving from a user information pertaining to a number of bar codes to encode;
wherein said symbol generator encodes formatted file data in accordance with information input into said first data input area and encodes a number of bar codes in accordance with information input into said second data input area.

15. The symbol generator of claim 14, wherein said user interface includes a feedback information area indicating a number of bytes of data into a to-be-encoded bar code.

16. The symbol generator of claim 14, wherein said user interface is a GUI.

17. The symbol generator of claim 14, wherein said user interface includes a third data input area receiving data corresponding to a desired number of bytes of a to-be-encoded bar code.

18. The symbol generator of claim 14, wherein formatted file designation input into said first data input area is a designation corresponding to an .EXE file.

19. The symbol generator of claim 14, wherein said symbol generator is configured so that there can be designated in said first data input area information pertaining to a directory stored formatted file.

20. A symbol generator comprising:
a user interface allowing a user to input information respecting data to encode, the user interface including a data input area for designating a destination directory, the destination directory designating a storage location for data produced by decoding of symbol encoded by said symbol generator;
an encoder encoding said input information including said destination directory into a set of bar codes;
wherein said encoder, in encoding said bar code symbol set encodes in each symbol of said set a field indicating a total number of symbols of said set and a field indicating the number in said set of said present bar code symbol set.

21. The symbol generator of claim 20, wherein said user interface allows a user to designate a formatted file to encode.

22. The symbol generator of claim 20, wherein said user interface allows a user to designate a number of symbols to encode.

23. A symbol generator comprising:
a graphical user interface including a first data input area facilitating designation of at least one file available for encoding, the symbol generator being configured so that types of files available for encoding by said symbol generator include at least one of document files, image files, and video files, the graphical user interface including a second data input area facilitating entry of command data, the second data input area enabling a user to designate whether a file designated for encoding in said first data input area will be displayed at the time when a symbol encoding the file is read; and
an encoder encoding into at least one symbol at least one of a document file, an image file, and a video file in accordance with designating information input into said first data input area, and further encoding into said at least one symbol command data, if any, input into said second data input area.

24. The symbol generator of claim 23, wherein said plurality of viewable files available for encoding are stored at a memory location of a computer that presents said graphical user interface.

25. The symbol generator of claim 23, wherein said encoder encodes a document file.

26. The symbol generator of claim 23, wherein said encoder encodes an image file.

27. The symbol generator of claim 23, wherein said symbol generator is configured so that there can be designated in said first data input area a designator for a directory stored file.

28. A symbol generator comprising:
a graphical user interface including a first data input area facilitating designation of one or more files available for encoding, the symbol generator being configured so that types of files available for encoding by said symbol generator include at least one of a document file, an image file, and a video file, the graphical user interface including a second data input area facilitating entry of command data, the second data input area enabling a user to input a command for encoding which when decoded and run by a reader causes a reader to download from a server a file of a type selected from the group consisting of document files, image files, and video files; and
an encoder encoding into at least one symbol at least one of the following: (a) a file of a file type selected from the group consisting of a document file, an image file, and a video file; and (b) a command to download from a server a file of a file type selected from the group consisting of a document file, an image file, and a video file.

29. The symbol generator of claim 28, wherein said plurality of files available for encoding are stored at a memory location of a computer that presents said graphical user interface.

30. The symbol generator of claim 28, wherein said encoder encodes a document file.

31. The symbol generator of claim 28, wherein said encoder encodes an image file.

32. The symbol generator of claim 28, wherein said symbol generator is configured so that there can be designated in said first data input area a designator for a directory stored file.

33. A symbol generator comprising:
a graphical user interface including a first data input area facilitating designation of at least one file available for encoding, the symbol generator being configured so that available for encoding by said symbol generator are files of first, second and third different file types; and an encoder encoding into at least one symbol a file in accordance with designating information input into said first data input area, and further encoding into said at least one symbol a command which when run by a reader that reads said at least one symbol causes said reader to execute one of a plurality of file opening programs, the one file opening program which is executing being responsive to a determination of a file type of said file that is encoded into said symbol.

34. The symbol generator of claim 33, wherein said files available for encoding are stored at a memory location of a computer that presents said graphical user interface.

35. The symbol generator of claim 33, wherein said file that is encoded into said at least one symbol is a document file and wherein said program that is executed is a word processing program.

36. The symbol generator of claim 35, wherein said symbol generator is configured so that there can be designated in said first data input area a designator for a directory stored file.

37. The symbol generator of claim 33, wherein said command that is encoded is a SHELLEXECUTEX command of the type that can be run by a mobile computer incorporating the POCKETPC operating system.

* * * * *